US011516780B2

(12) United States Patent
Takano

(10) Patent No.: US 11,516,780 B2
(45) Date of Patent: Nov. 29, 2022

(54) TERMINAL DEVICE, BASE STATION, METHODS, AND RECORDING MEDIUMS

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 184 days.

(21) Appl. No.: 16/762,509

(22) PCT Filed: Oct. 16, 2018

(86) PCT No.: PCT/JP2018/038386
§ 371 (c)(1),
(2) Date: May 8, 2020

(87) PCT Pub. No.: WO2019/097929
PCT Pub. Date: May 23, 2019

(65) Prior Publication Data
US 2021/0195582 A1 Jun. 24, 2021

(30) Foreign Application Priority Data

Nov. 15, 2017 (JP) .............................. JP2017-220050

(51) Int. Cl.
*H04W 72/04* (2009.01)
*H04L 5/14* (2006.01)
*H04L 5/00* (2006.01)

(52) U.S. Cl.
CPC ........... *H04W 72/0413* (2013.01); *H04L 5/14* (2013.01); *H04L 5/0048* (2013.01); *H04W 72/044* (2013.01)

(58) Field of Classification Search
None
See application file for complete search history.

(56) References Cited

U.S. PATENT DOCUMENTS

2013/0195045 A1 8/2013 Papasakellariou et al.
2014/0369244 A1 12/2014 Han
(Continued)

FOREIGN PATENT DOCUMENTS

JP 2017-11714 A 1/2017
RU 2606967 C1 1/2017
(Continued)

OTHER PUBLICATIONS

"Evolved Universal Terrestrial Radio Access (E-UTRA); Physical Layer Procedures", 3rd Generation Partnership Project, Technical Specification Group Radio Access Network, 3GPP TS 36.213, V14.4.0, Sep. 2017.

(Continued)

*Primary Examiner* — Basil Ma
(74) *Attorney, Agent, or Firm* — Xsensus LLP

(57) ABSTRACT

[Problem] Provided is a mechanism for enabling periodic transmission and reception of the UL control signal in the NR in a more appropriate manner.
[Solution] A terminal device communicates with a base station according to the TDD (Time Division Duplex) method. The terminal device includes a control unit that transmits uplink control signals based on the setting information indicating a first resource which is periodically placed in each of a plurality of bandwidth parts included in a component carrier and which is to be used in the transmission of the uplink control signals.

22 Claims, 32 Drawing Sheets

(56) References Cited

U.S. PATENT DOCUMENTS

| | | | |
|---|---|---|---|
| 2017/0034808 A1 | 2/2017 | Ouchi | |
| 2017/0055242 A1 | 2/2017 | Kusashima | |
| 2017/0302419 A1* | 10/2017 | Liu | H04L 5/0082 |
| 2018/0083752 A1* | 3/2018 | Kim | H04W 72/0453 |
| 2018/0279229 A1* | 9/2018 | Dinan | H04W 52/367 |

FOREIGN PATENT DOCUMENTS

| | | |
|---|---|---|
| WO | 2016/163805 A1 | 10/2016 |
| WO | WO-2016206472 A1 | 12/2016 |

OTHER PUBLICATIONS

International Search Report and Written Opinion dated Jan. 15, 2019 for PCT/JP2018/038386 filed on Oct. 16, 2018, 10 pages including English Translation of the International Search Report.

3GPP, NR;Physical layer procedures for data, 3rd Generation Partnership Project, Technical Specification Group Radio Access Network, 38.214 version 1.1.1, Release 15, Oct. 2017, pp. 1-7.

Media Tek Inc., "SRS design in NR," 3GPP TSG RAN WG1 Meeting#89, R1-1707836, Hangzhou, China, May 15-19, 2017, pp. 1-7.

Guangdong Oppo Mobile Telecom, "On SRS design for NR," 3GPP TSG RAN WG1 NR Ad-Hoc#2, R1-1710147, Qingdao, P.R. China, Jun. 27-30, 2017, 5 pages.

Samsung, "SRS design for NR," 3GPP TSG RAN WG1 NR Ad-Hoc#2, R1-1710688, Qingdao, China, Jun. 27-30, 2017, 5 pages.

CATT, "Outstanding aspects of slot format indication," 3GPP TSG RAN WG1 Meeting AH_#NR3, R1-1715815, Nagoya, Japan, Sep. 18-21, 2017, 10 pages.

Extended European Search Report dated Nov. 16, 2020 in European Patent Application No. 18878709.7, 15 pages.

Ericsson, "Power headroom report in NR", 3GPP TSG-RAN WG2 #99, Tdoc R2-1708199, Berlin, Germany, Aug. 21-25, 2017, XP051318102, 6 pages.

NTT Docomo, Inc. (Rapporteur), "RAN WG's progress on NR WI in the June AH meeting 2017", 3GPP TSG-RAN WG2 #99, R2-1707772, Berlin, Germany, Aug. 21-25, 2017, XP051317732, 57 pages.

MCC Support, "Final Report of 3GPP TSG RAN WG1 #AH_NR3 v1.0.0", 3GPP TSG RAN WG1 Meeting #90bis, R1-1716942, Prague, Czech Rep, Oct. 9-13, 2017, XP051354030, 104 pages.

Wilus Inc., "Remaining issues on pre-emption indication and UE behavior", 3GPP TSG RAN WG1 Meeting 90bis, R1-1718281, Prague, CZ, Oct. 9-13, 2017, XP051341463, 7 pages.

Huawei, HiSilicon, "UL SRS design for beam management and CSI acquisition", 3GPP TSG RAN WG1 Meeting #90, R1-1712238, Prague, Czech Republic, Aug. 21-25, 2017, XP051315055, 12 pages.

* cited by examiner

FIG.2

| | #0 | #1 | #2 | #3 | #4 | #5 | #6 | #7 | #8 | #9 |
|---|---|---|---|---|---|---|---|---|---|---|
| Configuration 0 | D | S | U | U | U | D | S | U | U | U |
| Configuration 1 | D | S | U | U | D | D | S | U | U | D |
| Configuration 2 | D | S | U | D | D | D | S | U | D | D |
| Configuration 3 | D | S | U | U | U | D | D | D | D | D |
| Configuration 4 | D | S | U | U | D | D | D | D | D | D |
| Configuration 5 | D | S | U | D | D | D | D | D | D | D |
| Configuration 6 | D | S | U | U | U | D | S | U | U | D |

1 radio frame

FIG.18

| Slot number | #0 | #1 | #2 | #3 | #4 | #5 | #6 | #7 | #8 | #9 | #10 | |
|---|---|---|---|---|---|---|---|---|---|---|---|---|
| Semi-static UL/DL configuration | UL | DL | DL | DL-UL | DL | UL | DL | unknown | DL | DL | UL | |
| SRS time periodicity configuration=e.g. 5 slot | SRS | - | - | - | - | SRS | - | - | - | - | SRS | |
| Actual SRS transmission | SRS | - | - | - | - | SRS | - | - | - | - | SRS | |

FIG.19

| Slot number | #0 | #1 | #2 | #3 | #4 | #5 | #6 | #7 | #8 | #9 | #10 |
|---|---|---|---|---|---|---|---|---|---|---|---|
| Semi-static UL/DL configuration | UL | DL | DL | DL-UL | DL | DL | DL | unknown | UL | DL | UL |
| SRS time periodicity configuration=e.g. 5 slot | SRS | - | - | - | - | SRS | - | - | - | - | SRS |
| Actual SRS transmission | SRS | - | - | - | - | - | - | - | - | - | SRS |

FIG.20

| Slot number | #0 | #1 | #2 | #3 | #4 | #5 | #6 | #7 | #8 | #9 | #10 |
|---|---|---|---|---|---|---|---|---|---|---|---|
| Semi-static UL/DL configuration | UL | DL | DL | DL-UL | DL | DL | DL | unknown | UL | DL | UL |
| SRS time periodicity configuration=e.g. 5 slot | SRS | - | - | - | - | SRS | - | - | - | - | SRS |
| Actual SRS transmission | SRS | - | - | - | - | - | - | - | SRS | - | SRS |

TERMINAL DEVICE, BASE STATION, METHODS, AND RECORDING MEDIUMS

CROSS-REFERENCE TO RELATED APPLICATIONS

The present application is based on PCT filing PCT/JP2018/038386, filed Oct. 16, 2018, which claims priority to JP 2017-220050, filed Nov. 15, 2017, the entire contents of each are incorporated herein by reference.

FIELD

The application concerned is related to a terminal device, a base station, methods, and recording mediums.

BACKGROUND

The radio access system and the radio network for cellular mobile communication (hereinafter, also referred to as "Long Term Evolution (LTE)", "LTE-Advanced (LTE-A)", "LTE-Advanced Pro (LTE-A Pro)", "5G (5th generation)", "New Radio (NR)", "New Radio Access Technology (NRAT)", "Evolved Universal Terrestrial Radio Access (EUTRA)", or "Further EUTRA (FEUTRA)") are being studied in the 3rd Generation Partnership Project (3GPP). In the following explanation, the term LTE covers LTE-A, LTE-A Pro, and EUTRA; and the term NR covers NRAT and FEUTRA. As far as the LTE and the NR are concerned, a base station device (a base station) is also referred to as eNodeB (evolved NodeB) in the LTE and is also referred to as gNodeB in the NR; while a terminal device (a mobile station, a mobile station device, or a terminal) is also referred to as UE (User Equipment). The LTE and the NR are cellular communication systems in which a plurality of areas covered by a base station is arranged in a cellular manner. A single base station can be configured to manage a plurality of cells.

In the NR, various specifications are being studied regarding the uplink (UL) communication as well as the downlink (DL) communication. Particularly, in the NR, introduction of a UL control signal, which is referred to as SRS (Sounding Reference Symbol or Sounding Reference Signal), is being studied. The SRS is measured by a base station, and the measurement result is used in beam management and CSI acquisition (Channel Station Information-Acquisition). In Non Patent Literature 1 mentioned below, the description about the standard specification of the SRS is given in the section 8.2 of the technical specification document of the 3GPP.

CITATION LIST

Patent Literature

Non Patent Literature 1: 3GPP TS 36.213 V14.4.0 (2017 September), "Evolved Universal Terrestrial Radio Access (EUTRA); Physical layer procedures," Release 14

SUMMARY

Technical Problem

In the NR, the frequency resources and the time resources can be set in a variable manner unlike in the LTE. More specifically, in the NR, the subcarrier spacing and the slot count can be set in a variable manner. Since a UL control signal is transmitted using a UL resource, there is an impact of the resource configuration having such a high degree of freedom. In Non Patent Literature 1 mentioned above, although there is description about the periodic SRS transmission, a sufficient consideration is not given to dealing with flexible resource setting in the NR.

In that regard, in the application concerned, a mechanism is provided for enabling periodic transmission and reception of the UL control signal in the NR in a more appropriate manner.

Solution to Problem

According to the present disclosure, a terminal device that communicates with a base station using TDD (Time Division Duplex) method is provided that includes: a control unit that transmits uplink control signal based on setting information indicating a first resource which is periodically placed in each of a plurality of bandwidth parts included in a component carrier and which is to be used in transmission of the uplink control signal.

Moreover, according to the present disclosure, a base station that communicates with a terminal device using TDD method is provided that includes: a control unit that sends, to the terminal device, setting information indicating a first resource which is periodically placed in each of a plurality of bandwidth parts included in a component carrier and which is to be used in transmission of uplink control signal.

Moreover, according to the present disclosure, a method implemented in a terminal device that communicates with a base station using TDD method is provided that includes: sending uplink control signal based on setting information indicating a first resource which is periodically placed in each of a plurality of bandwidth parts included in a component carrier and which is to be used in transmission of the uplink control signal.

Moreover, according to the present disclosure, a method implemented in a base station that communicates with a terminal device using TDD method is provided that includes: sending, to the terminal device, setting information indicating a first resource which is periodically placed in each of a plurality of bandwidth parts included in a component carrier and which is to be used in transmission of uplink control signal.

Moreover, according to the present disclosure, a recording medium having a program recorded therein is provided, wherein the program causing a computer to function as: a control unit that communicates with a base station using TDD method, and transmits uplink control signal based on setting information indicating a first resource which is periodically placed in each of a plurality of bandwidth parts included in a component carrier and which is to be used in transmission of the uplink control signal.

Moreover, according to the present disclosure, a recording medium having a program recorded therein is provided, wherein the program causing a computer to function as: a control unit that communicates with a terminal device using TDD method, and sends, to the terminal device, setting information indicating a first resource which is periodically placed in each of a plurality of bandwidth parts included in a component carrier and which is to be used in transmission of uplink control signal.

Advantageous Effects of Invention

As described above, according to the application concerned, a mechanism is provided for enabling periodic transmission and reception of the UL control signal in the NR in a more appropriate manner. Meanwhile, the abovementioned effect is not necessarily limited in scope and, in place of or in addition to the abovementioned effect, any other effect indicated in the present written description or any other effect that may occur from the present written description can also be achieved.

BRIEF DESCRIPTION OF DRAWINGS

FIG. 2 is a diagram illustrating the standard specification of the link direction configurations in the LTE.

FIG. 18 is a diagram for explaining an example of setting the first resource according to the present embodiment.

FIG. 19 is a diagram for explaining an example of an adaptive operation based on the setting of the first resource according to the present embodiment.

FIG. 20 is a diagram for explaining an example of the adaptive operation based on the setting of the first resource according to the present embodiment.

DESCRIPTION OF EMBODIMENTS

Figure 1:
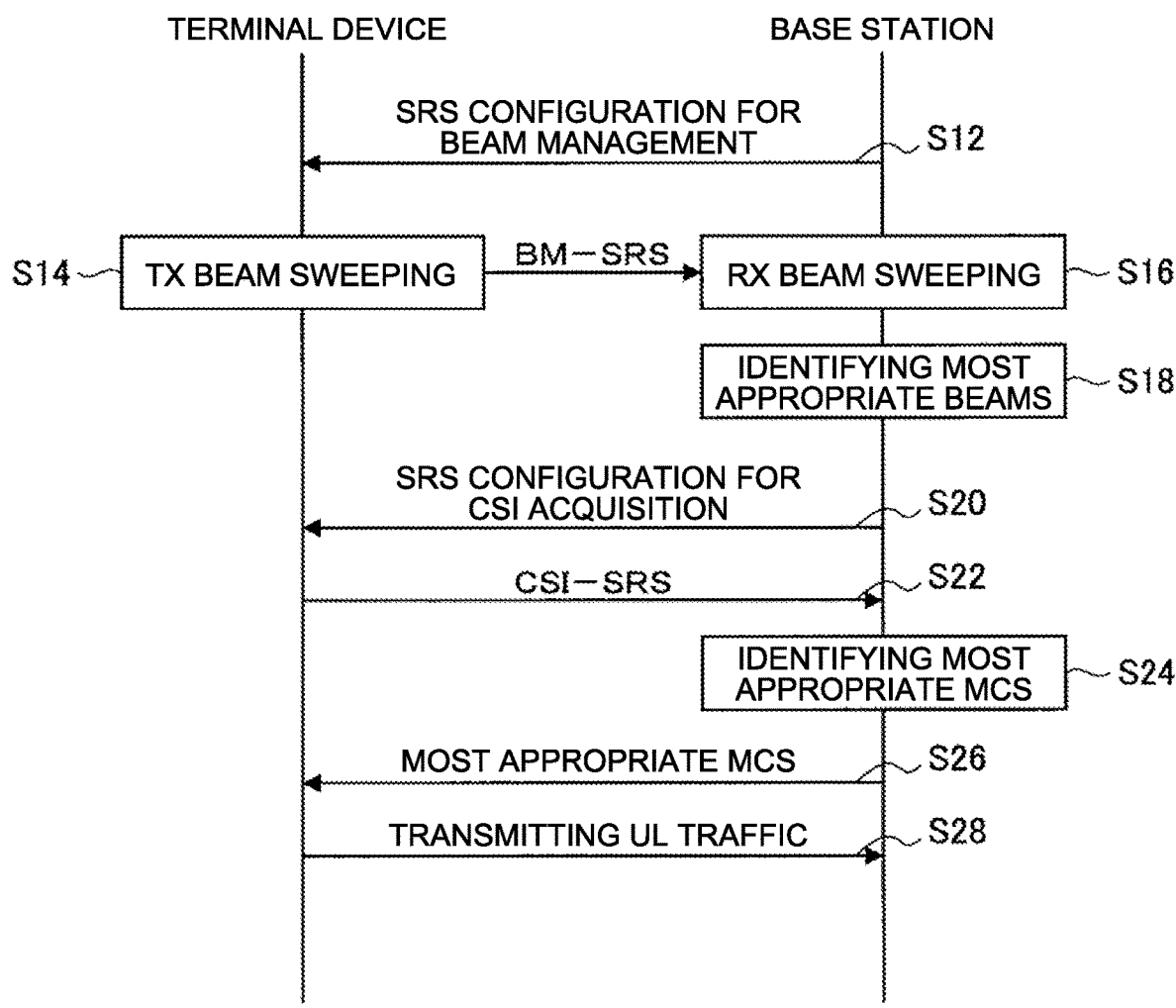
FIG. 1 is a sequence diagram illustrating an exemplary flow of operations regarding the SRS in the NR.

A preferred embodiment of the application concerned is described below in detail with reference to the accompanying drawings. In the present written description and the drawings, the constituent elements having practically identical functional configuration are referred to by the same reference numerals, and the explanation is not given repeatedly.

The explanation is given in the following sequence.
1. To get started
2. Configuration example
3. Technical features
4. Application examples
5. Summary 1. To Get Started (1) Usage of SRS The SRS represents a UL control signal. The SRS can also be treated as a reference signal. Examples of the purpose of using the SRS include beam management and CSI acquisition.

Beam Management

The beam management is a procedure for identifying appropriate beams to be used between a base station and a terminal device. Particularly, in the SRS-based UL beam management, appropriate beams are identified in regard to UL transmission. More specifically, in the UL beam management, an appropriate combination of transmission beams (TX beams), which are used by the terminal device for the transmission of UL signals, and reception beams (RX beams), which are used by the based station for the reception of UL signals. Herein, appropriate beams imply the beams because of which the signals transmitted by the terminal device can be received by the base station at the maximum received power.

The UL beam management includes a procedure called beam sweeping in which transmission and reception of the SRS is performed while setting the directivity of the TX beams and the RX beams in different directions. The terminal device performs the SRS transmission while sweeping the TX beams, and the base station receives the SRS while sweeping the RX beams. Then, the combination of beams that enables the base station to receive the SRS, which has been transmitted by the terminal device, at the maximum received power is identified as the appropriate combination of beams. Herein, the SRS is a known signal.

CSI Acquisition

The CSI acquisition is performed for the purpose of communication control according to the channel state. Particularly, the CSI acquisition of an SRS-based UL is performed for the purpose of controlling the UL communication according to the channel state. For example, the base station measures the state of the UL channel based on the received SRS, and decides on the MCS (Modulation Coding Scheme) according to the channel state. When the SRS is transmitted and received using the beams identified in the beam management, the base station can decide on the appropriate MCS in regard to the communication performed using those beams. Herein, the MCS implies a combination of the modulation method and the encoding rate.

Meanwhile, since the beam management is a procedure for getting to know the directions of beams, it is sufficient to have one or two antenna ports (i.e., one or two virtual antennas) to be used in the SRS transmission. On the other hand, as far as the CSI acquisition in the UL is concerned, for example, at the time of performing 4-layered MIMO (multiple-input and multiple-output), it is desirable that the SRS is transmitted using four antenna ports. That is because, in practice, it is desirable that the channel state is measured in the same environment as the environment in which the user data is transmitted.

Flow of Operations Regarding SRS

FIG. 1 is a sequence diagram illustrating an exemplary flow of operations regarding the SRS in the NR. As illustrated in FIG. 1, a base station and a terminal device are involved in the present sequence. In the following explanation, for the purpose of illustration, the SRS that is transmitted and received for the purpose of beam management is also referred to as BM-SRS. Moreover, the SRS that is transmitted and received for the purpose of CSI acquisition is also referred to as CSI-SRS.

Firstly, the base station sends an SRS configuration, which is meant for beam management, to the terminal device (Step S12). The SRS configuration meant for beam management represents the setting information related to the BM-SRS. Based on the SRS configuration meant for beam management, the terminal device transmits the BM-SRS while performing TX beam sweeping (Step S14). On the other hand, the base station receives the BM-SRS while performing RX beam sweeping (Step S16). Then, the base station identifies the most appropriate TX beams and the most appropriate RX beams (Step S18).

Then, the base station sends an SRS configuration, which is meant for CSI acquisition, to the terminal device (Step S20). The SRS configuration meant for CSI acquisition represents the setting information related to the CSI-SRS. Subsequently, based on the SRS configuration meant for CSI acquisition, the terminal device transmits the CSI-SRS (Step S22). Then, the base station measures the channel state based on the received CSI-SRS, and identifies the most appropriate MCS (Step S24). Subsequently, the base station transmits information indicating the most appropriate MCS to the terminal device (Step S26). Then, using the most appropriate beams and the most appropriate MCS, the terminal device transmits the UL traffic (data signals or control signals) (Step S28).

The SRS configuration meant for beam management and the SRS configuration meant for CSI acquisition include the information for setting the frequency resources and the time resources that should be used in the SRS transmission. The SRS configuration meant for CSI acquisition can also include the information indicating the most appropriate TX beams identified in the beam management. In that case, the terminal device becomes able to transmit the CSI-SRS using the most appropriate TX beams.

Although the BM-SRS and the CSI-SRS have the fundamentally same structure, there are differences in the conditions related to the frequency resources and the time resources that should be used in the transmission. For example, since the beam management is aimed at identifying the most appropriate beams, the BM-SRS can have a narrow frequency bandwidth. Moreover, for the purpose of beam tracking in which the beams are made to follow the movement of the terminal device, it is desirable that the BM-SRS is transmitted in a periodic manner. On the other hand, since the CSI acquisition is aimed at identifying the most appropriate MCS, it is desirable that the frequency bandwidth of the CSI-SRS covers the frequency bandwidth used in the transmission of the UL traffic. Moreover, when the UL traffic is transmitted in a periodic manner, it is desirable that the CSI-SRS too is transmitted in a periodic manner. On the other hand, when the UL traffic is transmitted in a sporadic manner, it is sufficient if the CST-SRS is transmitted in an aperiodic manner in tune with the transmission of the UL traffic.

(2) Periodic Transmission of SRS

The SRS may be transmitted in a periodic manner, or may be transmitted in an aperiodic manner.

The periodic transmission of the SRS is typically performed based on the semi-static setting. For example, when the periodicity for the SRS transmission is set in a semi-static manner using the RRC (Radio Resource Control), the terminal device keeps on periodically transmitting the SRS to the base station in a semi-permanent manner.

The aperiodic SRS transmission is typically performed based on the dynamic setting. For example, every time the timing for the SRS transmission is dynamically set according to the control channel or the system information, the terminal device performs the SRS transmission at the set timing.

(Link Direction Configuration)

In the NR, the adaption of the frequency division duplex (FDD) or the time division duplex (TDD) is being studied. In the FDD, the UL and the DL are operated in mutually different frequency bands. On the other hand, in the TDD, the UL and the DL are operated in the same frequency band but using different time resources.

In the case of the FDD, since the UL communication is possible at any given point of time, the terminal device can transmit the SRS at arbitrary timings. Thus, in the case of the FDD, the periodic transmission of the SRS as well as the aperiodic transmission of the SRS can be achieved with ease.

In the case of the TDD, the UL communication is possible only in the time resources that enable the UL communication. Hence, the terminal device needs to transmit the SRS only in the time resources enabling the UL communication. However, since the SRS transmission period does not necessarily arrive in the time resources enabling UL communication, it may become difficult to perform periodic SRS transmission.

In Case of LTE

In the LTE, such difficulty does not arise. That is because, in the LTE, the positions of the time resources that enable the UL communication are fixed in the TDD method. That point is explained below in detail.

The communication system of the LTE is classified into FD-LTE in which the FDD is adapted as the complex communication system, and TD-LTE in which the TDD is adapted as the complex communication system. The FD-LTE as well as the TD-LTE has the frame format in which a single radio frame (having the duration of 10 msec) is made of 10 sub-frames each having the duration of 1 msec. In the FD-LTE, the link direction does not vary in the same frequency band. In contrast, in the TD-LTE, the link direction may vary in units of sub-frames.

Figure 6:
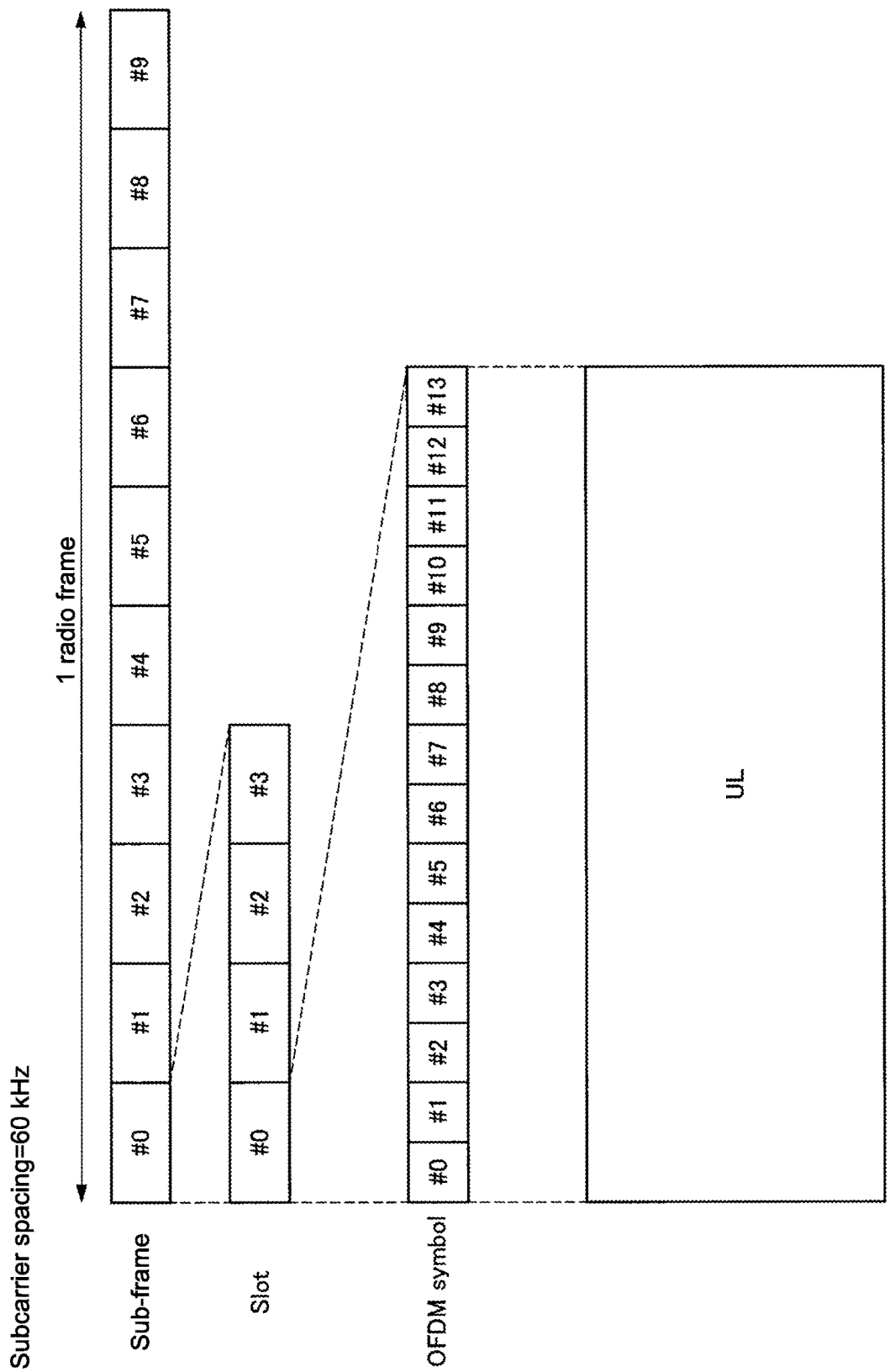
FIG. 6 is a diagram illustrating an exemplary configuration of UL slots in the NR.

In the TD-LTE, regarding each radio frame, the set of sub-frame units in the link direction (i.e., the combination of 10 sub-frames in the link direction) is called a link direction configuration (or a UL-DL configuration). In the standard specification related to the LTE, seven types of link direction configurations, from a configuration 0 to a configuration 6 illustrated in FIG. 6, are defined.

FIG. 2 is a diagram illustrating the standard specification of the link direction configurations in the LTE. As illustrated in FIG. 2, a single radio frame includes 10 sub-frames (#0 to #9). Each sub-frame has the duration of 1 msec, and each radio frame has the duration of 10 msec. The link direction is set in the units of sub-frames. With reference to FIG. 2, the sub-frames labelled as "D" have the link direction in the downlink direction and are called downlink sub-frames. Similarly, the sub-frames labelled as "U" have the link direction in the uplink direction and are called uplink sub-frames. Moreover, the sub-frames labelled as "S" represent special sub-frames unique to the TD-LTE. The downlink signals transmitted from the base station reach the terminal device with a delay. The terminal device takes into account the delay of the uplink signals reaching the base station, and transmits the uplink signals prior to the timings of the uplink sub-frames of the base station. A special sub-frame is inserted at each timing of switching from a downlink sub-frame to an uplink sub-frame, and fulfils the role of a buffer period for ensuring that the timing of receiving downlink signals does not overlap with the timing of transmitting uplink signals in the terminal device. A special sub-frame includes a downlink pilot time slot in which download signals are received by the UE; includes a guard period; and includes an uplink pilot timeslot in which uplink signals are transmitted by the UE.

According to the link direction configurations in the LTE, regarding each configuration, at least a single uplink sub-frame is included in a single radio frame. Thus, the SRS periodicity can be set based on the link direction configurations in such a way that the SRS transmission period arrives in the uplink sub-frames. According to the standard specification of the LTE, the SRS periodicity can be set by referring to Table 1 given below.

TABLE 1

Standard specification of LTE related to periodic SRS transmission (According to 3GPP TS36.213)

| SRS Configuration Index (I_SRS) | SRS periodicity (T_SRS) | SRS Sub-frame Offset (T_Offset) |
|---|---|---|
| 10-14 | 5 ms | I_SRS-10 |
| 15-24 | 10 ms | I_SRS-15 |
| 25-44 | 20 ms | I_SRS-25 |
| 45-84 | 40 ms | I_SRS-45 |
| 85-164 | 80 ms | I_SRS-85 |
| 165-324 | 160 ms | I_SRS-165 |
| 325-644 | 320 ms | I_SRS-325 |

In Table 1, the following information is held in a corresponding manner: indexes, SRS transmission periods, and sub-frame offsets representing the starting points of the transmission periods. For example, in the case of the configuration 5 illustrated in FIG. 2, with reference to the sub-frame #2 that is an uplink sub-frame, the setting can be done to transmit the SRS in the periods of 10 ms. More specifically, in the case of the configuration 5 illustrated in FIG. 2, the sub-frame #2 is an uplink frame. Hence, in order to set the SRS periodicity to 10 ms, for example, I_SRS is set to 17 based on Table 1. As a result, the terminal device becomes able to perform the SRS transmission from the sub-frame #2 in the periods of 10 ms.

In Case of NR

Frame Configuration

In the NR too, in an identical manner to the LTE, a single radio frame includes 10 sub-frames (#0 to #9). Each sub-frame has the duration of 1 msec, and a single radio frame has the duration of 10 msec.

On the other hand, in the NR, unlike in the LTE, one or more slots are included in a single sub-frame, and the number of slots included in a single sub-frame vary according to the subcarrier spacing. According to the standard specification of the NR being studied, the correspondence relationship between the subcarrier spacing and the slot setting is defined as given below in Table 2.

TABLE 2

Standard specification of NR related to slots (According to 3GPP Draft TS38.211)

| Subcarrier spacing | OFDM symbol count in one slot | Slot count in one radio frame | Slot count in one sub-frame |
|---|---|---|---|
| 15 kHz | 14 | 10 | 1 |
| 30 kHz | 14 | 20 | 2 |
| 60 kHz | 14 | 40 | 4 |
| 120 kHz | 14 | 80 | 8 |
| 240 kHz | 14 | 160 | 16 |
| 480 kHz | 14 | 320 | 32 |

Table 2 is a table indicating, for each subcarrier spacing, the number of OFDM (Orthogonal Frequency Division Multiplexing) symbols included in a single slot; the number of slots included in a single radio frame; and the number of slots included in a single sub-frame. As illustrated in Table 2, the number of OFDM symbols in a single slot is constant regardless of the subcarrier spacing. On the other hand, the number of slots included in a single subcarrier increases in proportion to an increase in the subcarrier spacing. As a result, the number of slots included in a single radio frame also increases in proportion to an increase in the subcarrier spacing. As an example, explained below with reference to FIGS. 3 to 5 are frame configurations based on Table 2.

Figure 3:
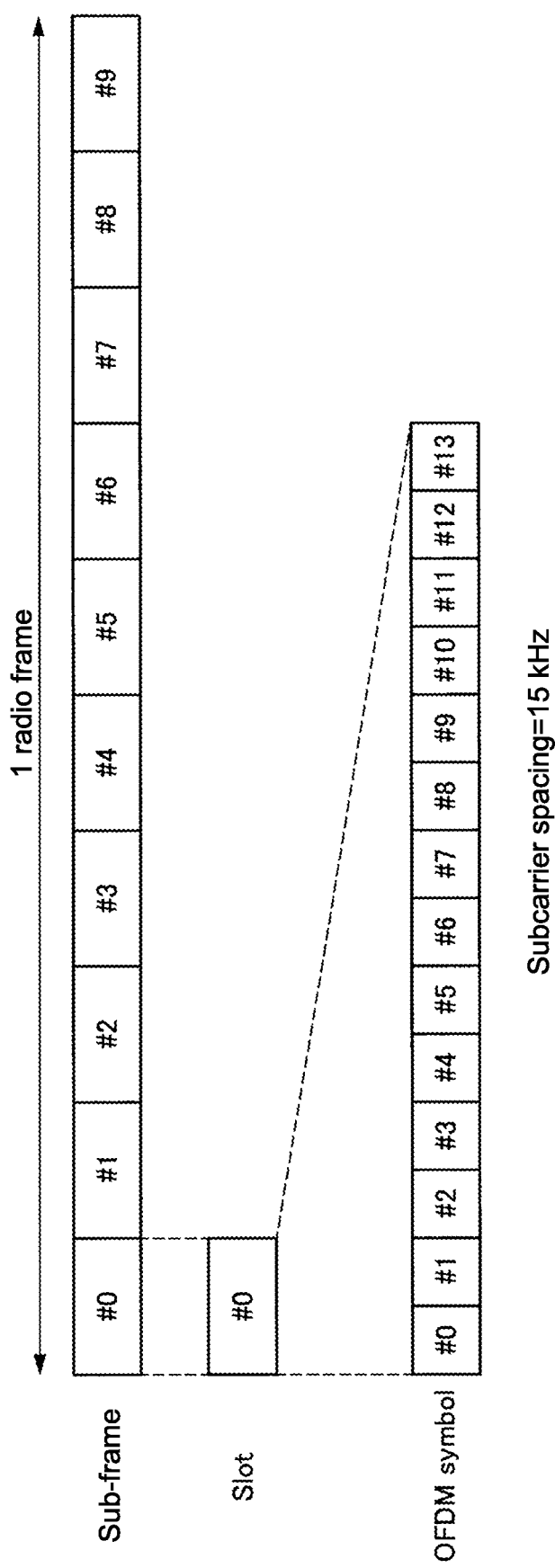
FIG. 3 is a diagram illustrating a frame configuration in the case in which the subcarrier spacing in the NR is equal to 15 kHz.

FIG. 3 is a diagram illustrating a frame configuration in the case in which the subcarrier spacing in the NR is equal to 15 kHz. As illustrated in FIG. 3, a single radio frame includes 10 sub-frames (#0 to #9). A single sub-frame (#0) includes a single slot (#0), and thus a single radio frame includes 10 slots. A single slot (#0) includes 14 OFDM symbols (#0 to #13).

Figure 4:
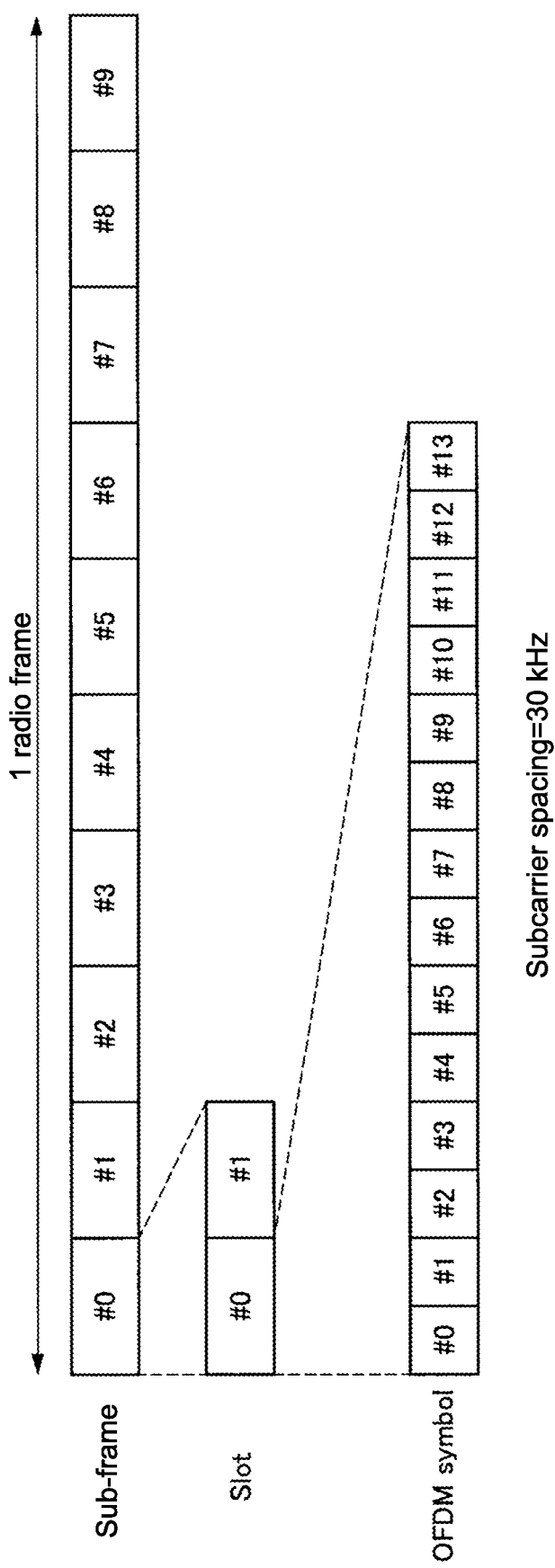
FIG. 4 is a diagram illustrating a frame configuration in the case in which the subcarrier spacing in the NR is equal to 30 kHz.

FIG. 4 is a diagram illustrating a frame configuration in the case in which the subcarrier spacing in the NR is equal to 30 kHz. As illustrated in FIG. 4, a single radio frame includes 10 sub-frames (#0 to #9). A single sub-frame (#0) includes two slots (#0 and #1), and thus a single radio frame includes 20 slots. A single slot (#0) includes 14 OFDM symbols (#0 to #13).

Figure 5:
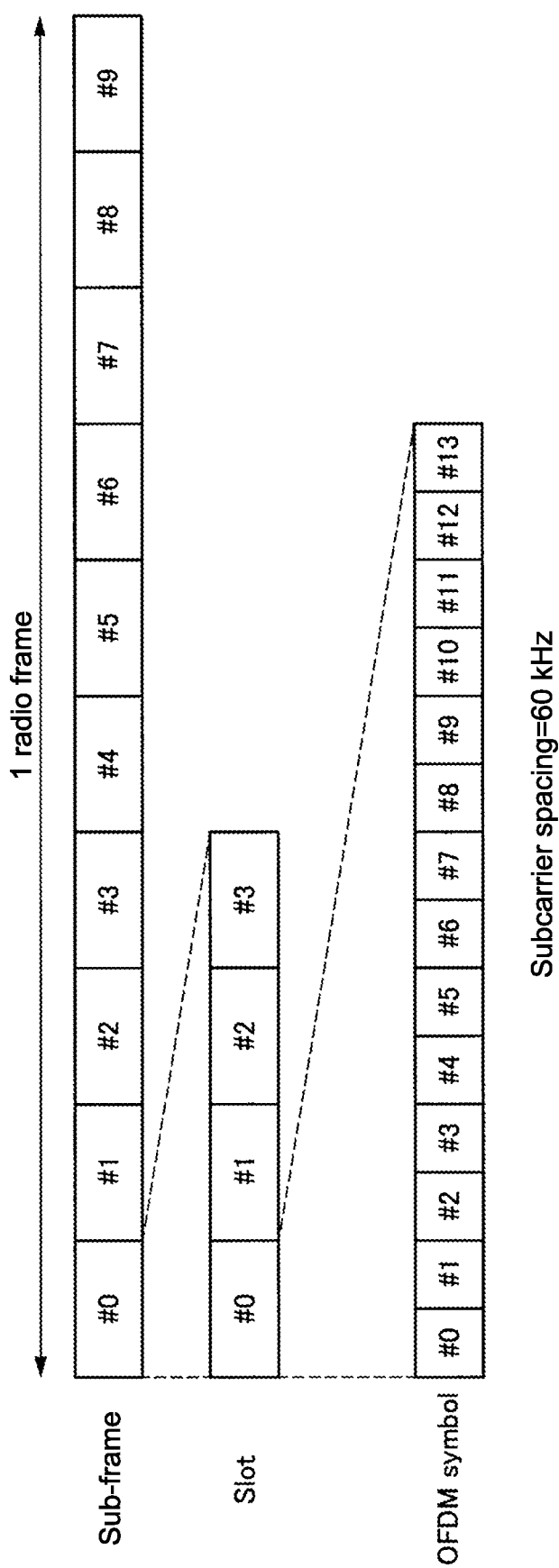
FIG. 5 is a diagram illustrating a frame configuration in the case in which the subcarrier spacing in the NR is equal to 60 kHz.

FIG. 5 is a diagram illustrating a frame configuration in the case in which the subcarrier spacing in the NR is equal to 60 kHz. As illustrated in FIG. 5, a single radio frame includes 10 sub-frames (#0 to #9). A single sub-frame (#0) includes four slots (#0 to #3), and thus a single radio frame includes 40 slots. A single slot (#0) includes 14 OFDM symbols (#0 to #13).

Meanwhile, the subcarrier spacing is set in a static or semi-static manner and is assumed to be not changed frequently.

Setting in Link Direction

In the NR, the link direction is changed on a slot-by-slot basis. In the NR, as illustrated in Table 3, a plurality of types of slots having different link directions is defined.

TABLE 3

Types of slots in NR

| Type of slot | Explanation |
|---|---|
| All OFDM symbol is UL | All OFDM symbols in one slot have link direction in UL direction. |
| All OFDM symbol is DL | All OFDM symbols in one slot have link direction in DL direction. |
| DL and UL | Link direction of OFDM symbols in one slot is switched from DL direction to UL direction. There are one or two switching points for switching from DL direction to UL direction. |
| Other = unknown | Terminal cannot recognize whether link direction is DL direction or UL direction. Treated as indefinite value. |

According to Table 3, such slots are defined in which the link direction of all OFDM symbols included therein is in the UL direction. Hereinafter, such slots are referred to as UL slots. FIG. 6 is a diagram illustrating an exemplary configuration of UL slots in the NR. In the example illustrated in FIG. 6, the subcarrier spacing is equal to 60 kHz, and a single sub-frame includes four slots. As illustrated in FIG. 6, all of the 14 OFDM symbols (#0 to #13) included in the UL slot (#0) have the link direction in the UL direction. Hereinafter, the OFDM symbols having the link direction in the UL direction are also referred to as UL symbols.

Figure 7:
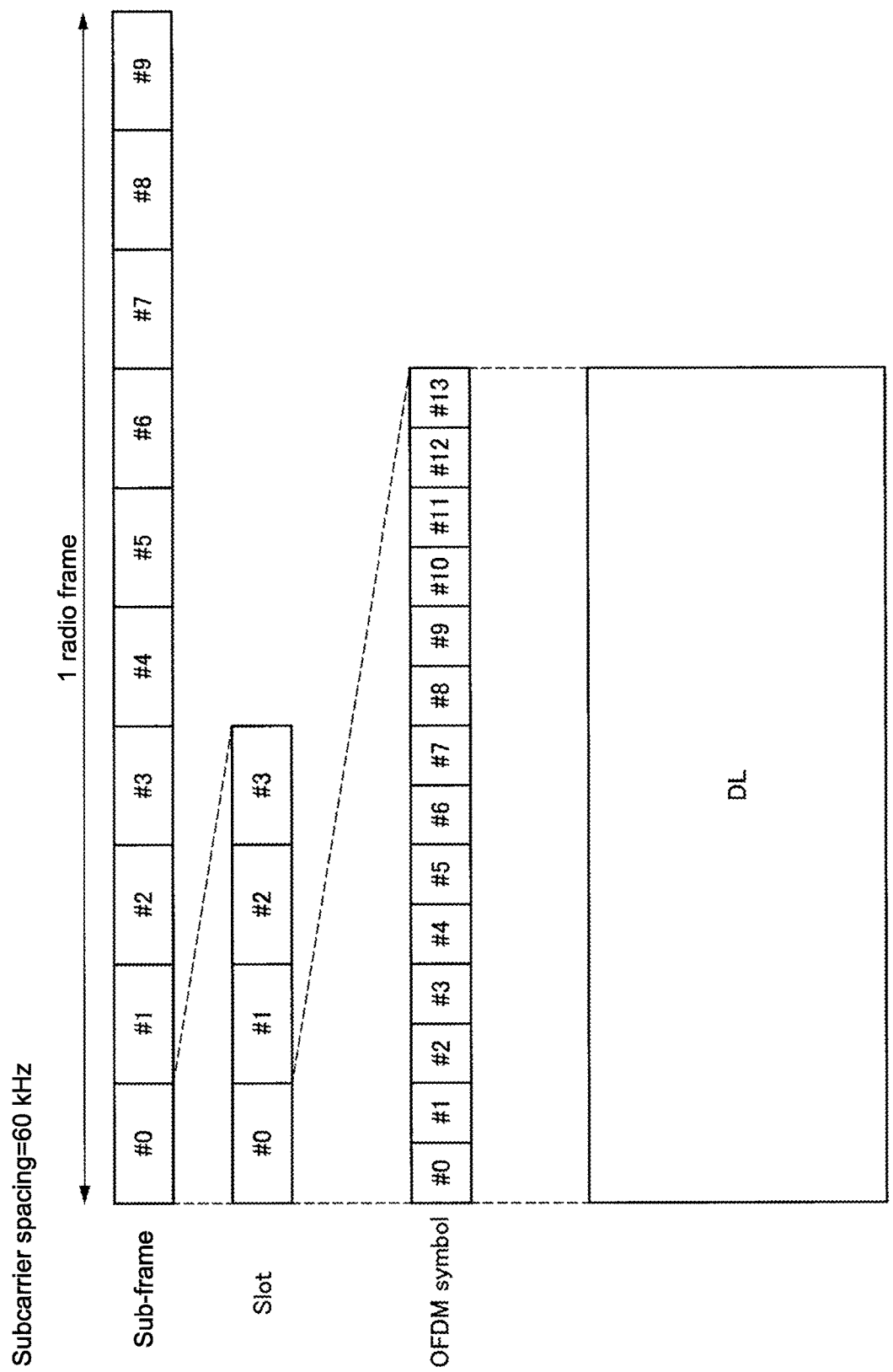
FIG. 7 is a diagram illustrating an exemplary configuration of DL slots in the NR.

According to Table 3, such slots are defined in which the link direction of all OFDM symbols included therein is in the DL direction. Hereinafter, such slots are referred to as DL slots. FIG. 7 is a diagram illustrating an exemplary configuration of DL slots in the NR. In the example illustrated in FIG. 7, the subcarrier spacing is equal to 60 kHz, and a single sub-frame includes four slots. As illustrated in FIG. 7, all of the 14 OFDM symbols (#0 to #13) included in the DL slot (#0) have the link direction in the DL direction. Hereinafter, the OFDM symbols having the link direction in the DL direction are also referred to as DL symbols.

Figure 8:
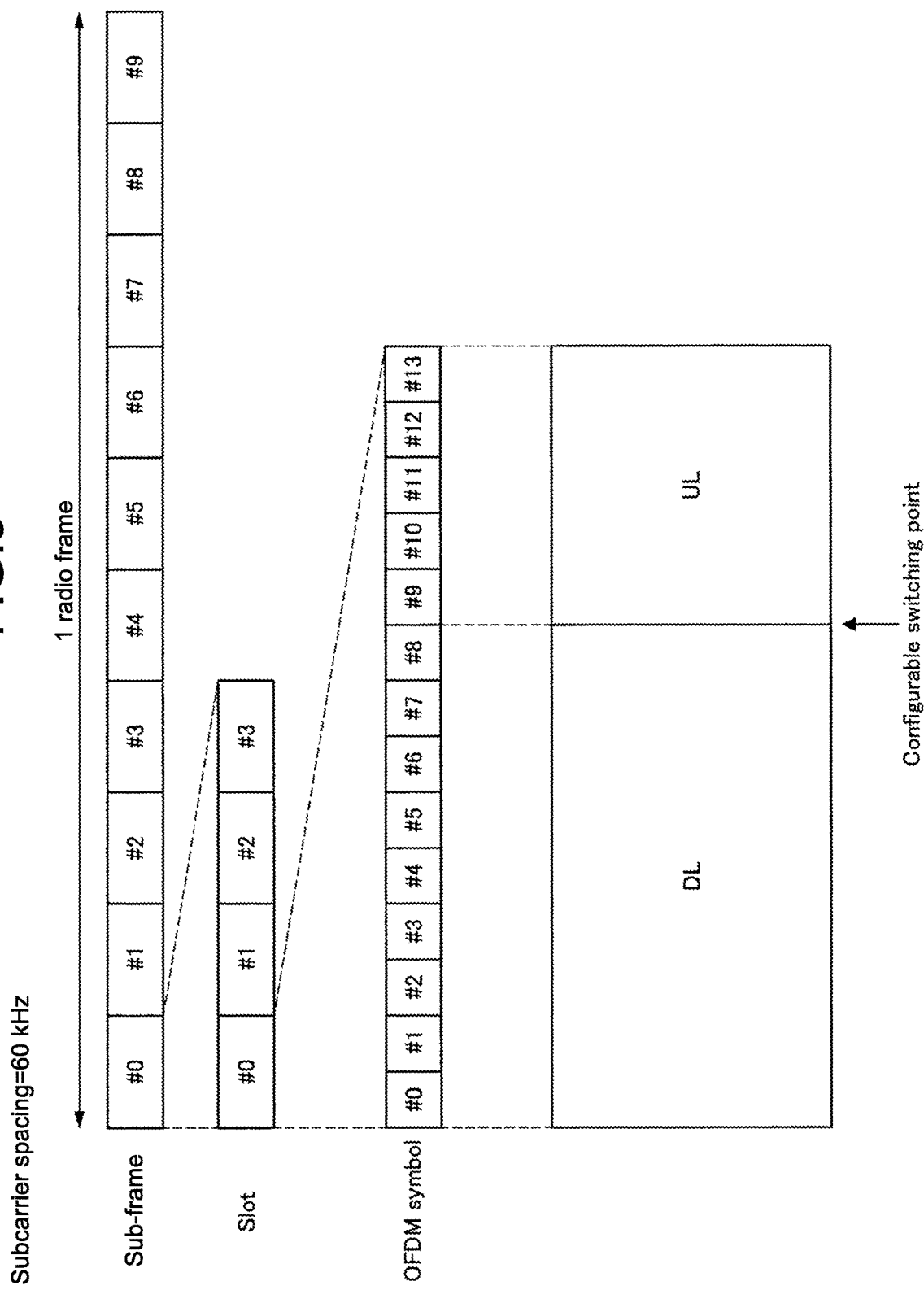
FIG. 8 is a diagram illustrating an exemplary configuration of DL-UL slots in the NR.

According to Table 3, such slots are defined in which the link direction of the OFDM symbols included therein changes from the DL direction to the UL direction. Hereinafter, such slots also referred to as DL-UL slots. FIG. 8 is a diagram illustrating an exemplary configuration of the DL-UL slots in the NR. In the example illustrated in FIG. 8, the subcarrier spacing is equal to 60 kHz, and a single sub-frame includes four slots. As illustrated in FIG. 8, of the 14 OFDM symbols (#0 to #13) included in the DL slot (#0), the first nine OFDM symbols (#0 to #8) have the link direction in the DL direction and the last five OFDM symbols (#9 to #13) have the link direction in the UL direction. Meanwhile, the switching point can be set in an arbitrary manner, and it is also possible to set two switching points.

According to Table 3, such slots are defined in which the link direction of the OFDM symbols is not clear. Hereinafter, such slots are referred to as unknown slots. The terminal device cannot use unknown slots in the UL transmission. If the base station dynamically sets the link direction of some or all of the unknown slots to the UL direction using the SFI (described later), then the terminal device can use those slots in the UL transmission.

In the NR, as the link direction configuration, the types of the slots illustrated in Table 3 are set along with the switching point in the case of the DL-UL slots. The base station uses the upper layer signaling such as RRC signaling and sets the link direction configuration in the terminal device in a semi-static manner. The link direction configuration set in a semi-static manner is also referred to as a semi-static link direction configuration.

Moreover, in the NR, it is also possible to dynamically set the link direction of one or more slots. The base station dynamically sets the link direction of the slots using DL control signals of the PDCCH (Physical Downlink Control Channel) or using system information (for example, MIB (Master Information Block) or SIB (System Information Block). The link direction configuration that is set in a dynamic manner is also referred to as a dynamic link direction configuration.

For example, in the NR, the PDCCH includes the SFI (Slot Format Indicator). The SFI is equivalent to the dynamic link direction configuration. The base station performs DL transmission of the PDCCH, which includes the SFI, using one or more slots; and the terminal device resets the link direction configuration based on the received SFI. That is, the semi-static link direction configuration gets overwritten by the dynamic link direction configuration. That point is explained below in detail with reference to FIG. 9.

Figure 9:
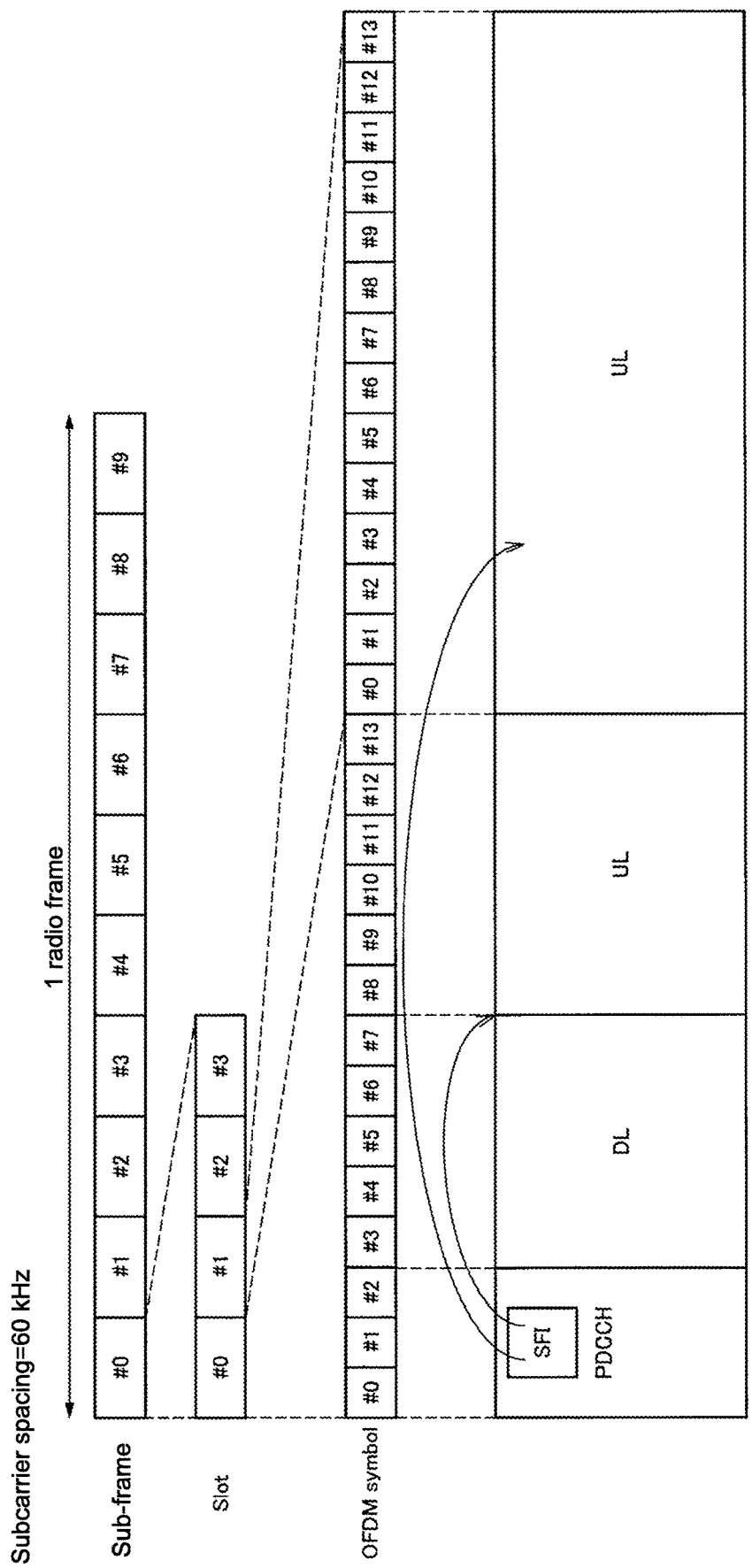
FIG. 9 is a diagram for explaining an example of the dynamic link direction configuration in the NR.

FIG. 9 is a diagram for explaining an example of the dynamic link direction configuration in the NR. In the example illustrated in FIG. 9, the subcarrier spacing is equal to 60 kHz, and a single sub-frame includes four slots. The slots #0 and #1 are assumed to be set as the DL slots according to the semi-static link direction configuration. As illustrated in FIG. 9, in the first three OFDM symbols (#0 to #2) of the slot #0, the PDCCH including the SFI is DL-transmitted. The SFI includes information for setting the ninth OFDM symbol (#8) of the slot #0 as the link direction switching point, and includes information for setting the slot

1 as the UL slot. In that case, as illustrated in FIG. 9, regarding the OFDM symbols (#8 to #13) from the ninth OFDM symbol (#8) onward of the slot #0, the link direction is changed to the UL direction; and the slot #1 represents the UL slot. Meanwhile, since the DL symbol is not included in the UL slot, as illustrated in FIG. 9, in the case of resetting the target slot as the UL slot using the SFI, it is desirable that the SFI is DL-transmitted in a slot arriving earlier than the target slot.

OFDM Symbols Required in SRS Transmission

In the NR, the SRS is transmitted using a single OFDM symbol, or using two successive OFDM symbols, or using four successive OFDM symbols. Typically, the SRS is transmitted using the rear-end OFDM symbol or a latter-half OFDM symbol. That point is explained below with reference to FIGS. 10 to 13.

Figure 10:
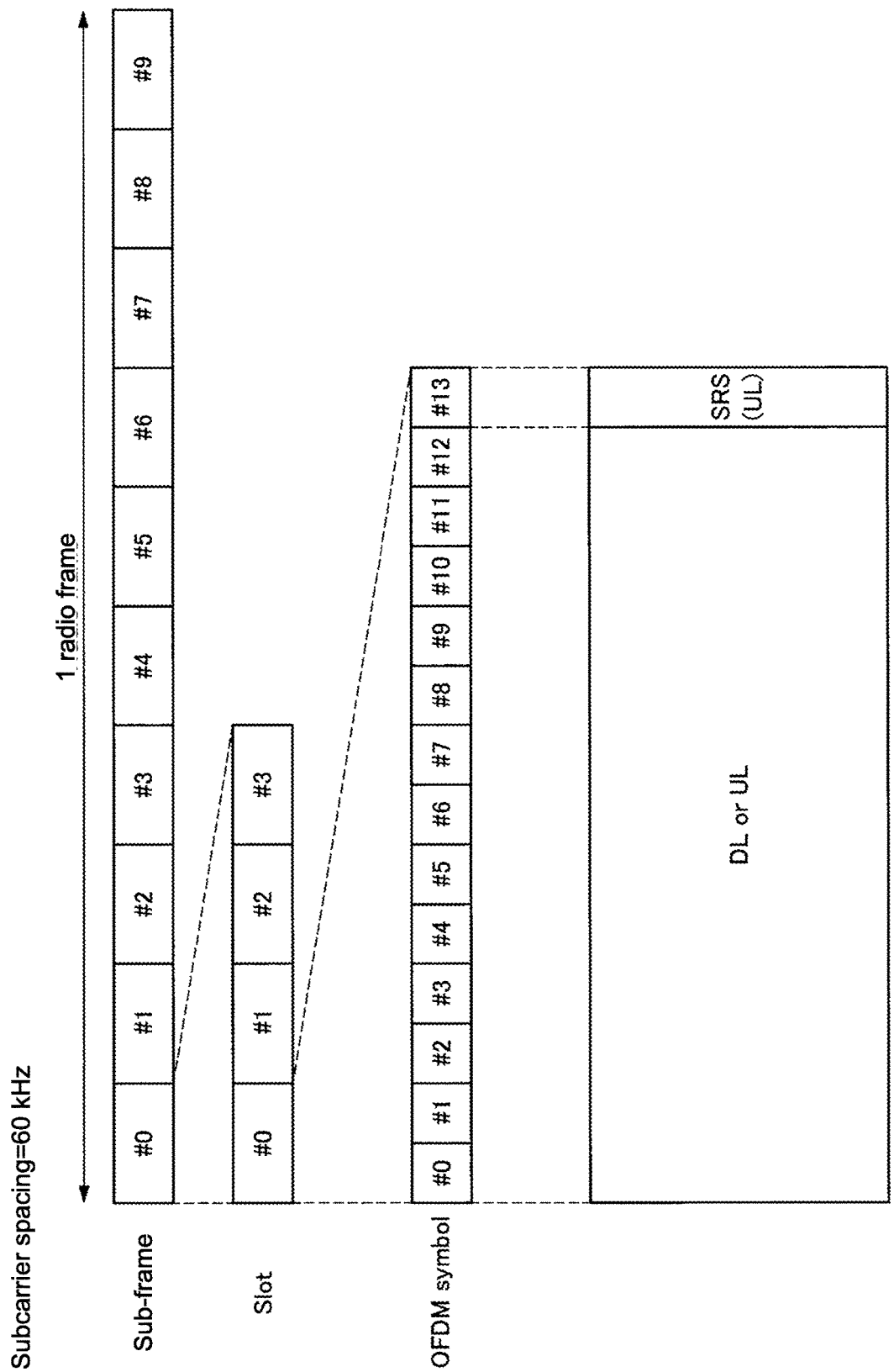
FIG. 10 is a diagram illustrating an example of the OFDM symbol used in the SRS transmission in the NR.

FIG. 10 is a diagram illustrating an example of the OFDM symbol used in the SRS transmission in the NR. In the example illustrated in FIG. 10, the subcarrier spacing is equal to 60 kHz, and a single sub-frame includes four slots. Of the 14 OFDM symbols (#0 to #13) included in the slot #0, the first 13 OFDM symbols (#0 to #12) have the link direction in the DL direction or the UL direction, and at least the last OFDM symbol (#13) has the link direction in the UL direction. In the example illustrated in FIG. 10, when a single UL symbol is used for the SRS, the SRS is transmitted using the last OFDM symbol (#13) having the link direction in the UL direction.

Figure 11:
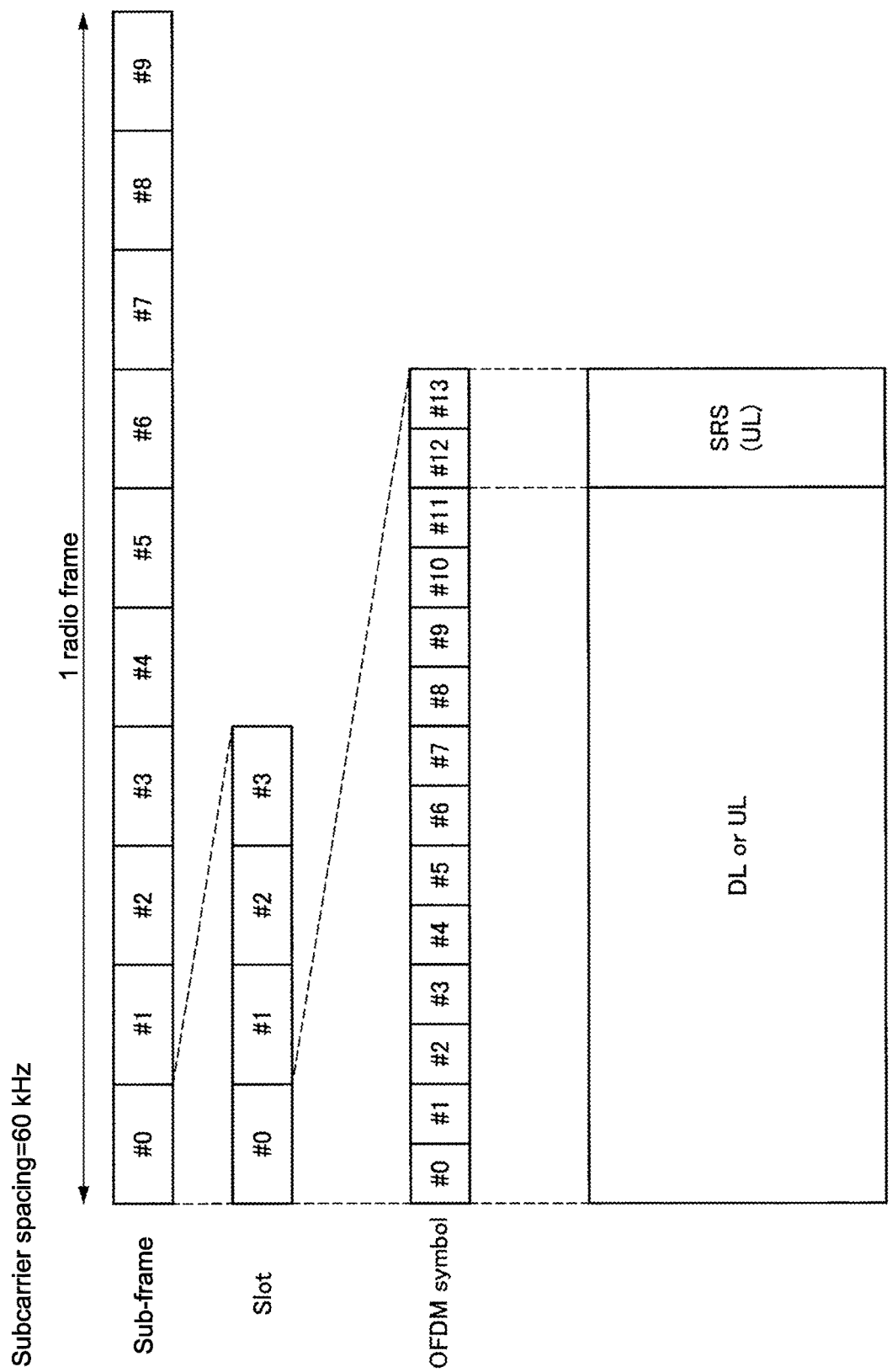
FIG. 11 is a diagram illustrating an example of the OFDM symbol used in the SRS transmission in the NR.

FIG. 11 is a diagram illustrating an example of the OFDM symbols used in the SRS transmission in the NR. In the example illustrated in FIG. 11, the subcarrier spacing is equal to 60 kHz, and a single sub-frame includes four slots. Of the 14 OFDM symbols (#0 to #13) included in the slot #0, the first 12 OFDM symbols (#0 to #11) have the link direction in the DL direction or the UL direction, and at least the last two OFDM symbols (#12 and #13) have the link direction in the UL direction. In the example illustrated in FIG. 11, when two UL symbols are used for the SRS, the SRS is transmitted using the last two OFDM symbols (#12 and #13) having the link direction in the UL direction.

Figure 12:
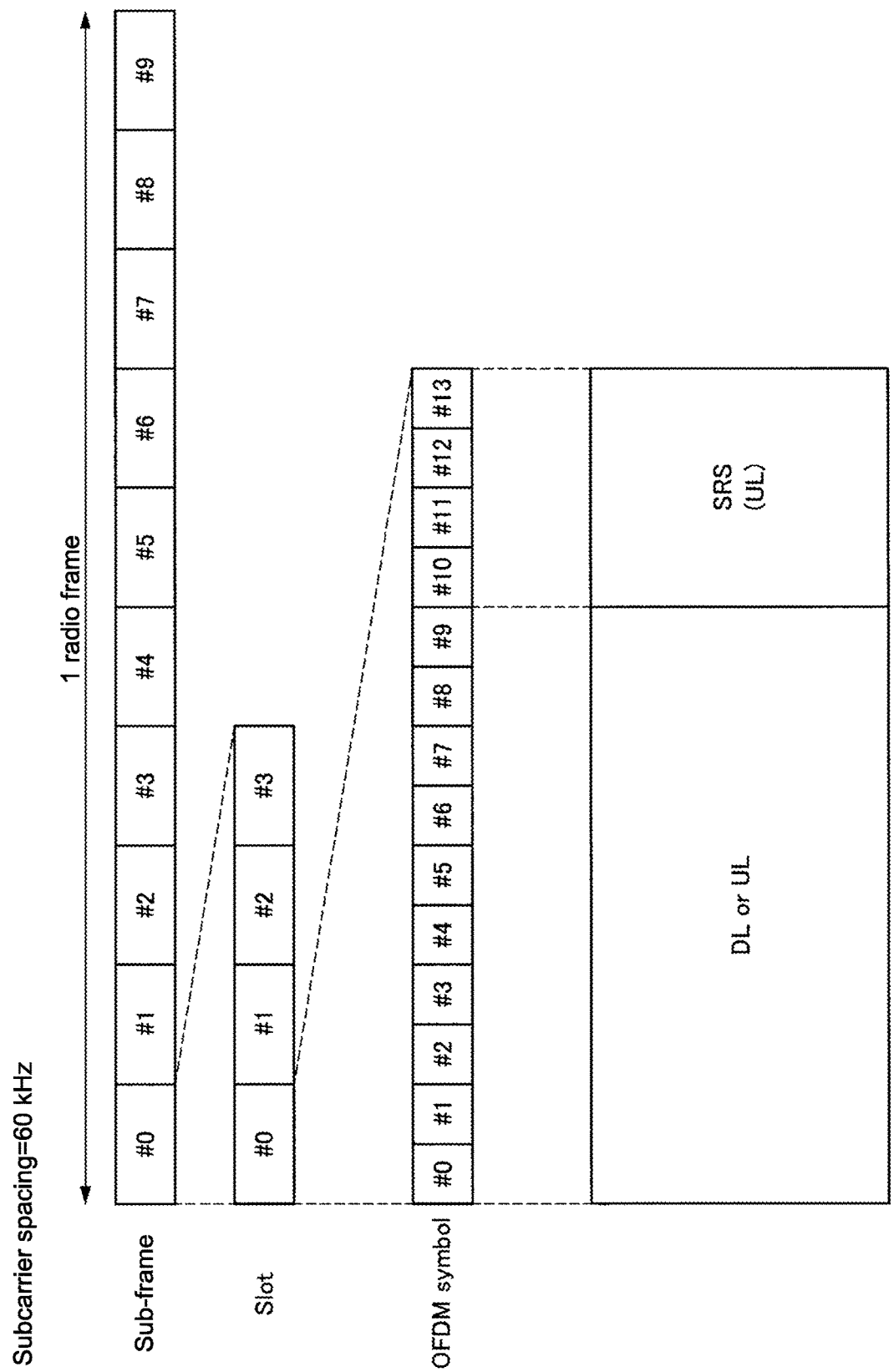
FIG. 12 is a diagram illustrating an example of the OFDM symbol used in the SRS transmission in the NR.

FIG. 12 is a diagram illustrating an example of the OFDM symbols used in the SRS transmission in the NR. In the example illustrated in FIG. 12, the subcarrier spacing is equal to 60 kHz, and a single sub-frame includes four slots. Of the 14 OFDM symbols (#0 to #13) included in the slot #0, the first 10 OFDM symbols (#0 to #9) have the link direction in the DL direction or the UL direction, and at least the last four OFDM symbols (#10 to #13) have the link direction in the UL direction. In the example illustrated in FIG. 12, when four UL symbols are used for the SRS, the SRS is transmitted using the last four OFDM symbols (#10 to #13) having the link direction in the UL direction.

Herein, it is desirable that the number of UL symbols is either equal to or greater than the number of UL symbols used in the SRS transmission as illustrated in FIGS. 10 to 12. That is because, if the number of symbols included in a slot is smaller than the number of symbols used in the SRS transmission, it becomes difficult to perform the SRS transmission in that slot.

Moreover, there are times when it is desirable that the number of symbols included in a slot is equal to or greater than the sum of the number of UL symbols used in the SRS transmission and a predetermined number. Herein, the predetermined number is set for the purpose of adjusting the positions of the UL symbols used in the SRS transmission. That is, there are times when the number of UL symbols required in the SRS transmission is greater than the UL symbols actually used in the SRS transmission. The explanation for that case is given below with reference to FIG. 13.

Figure 13:
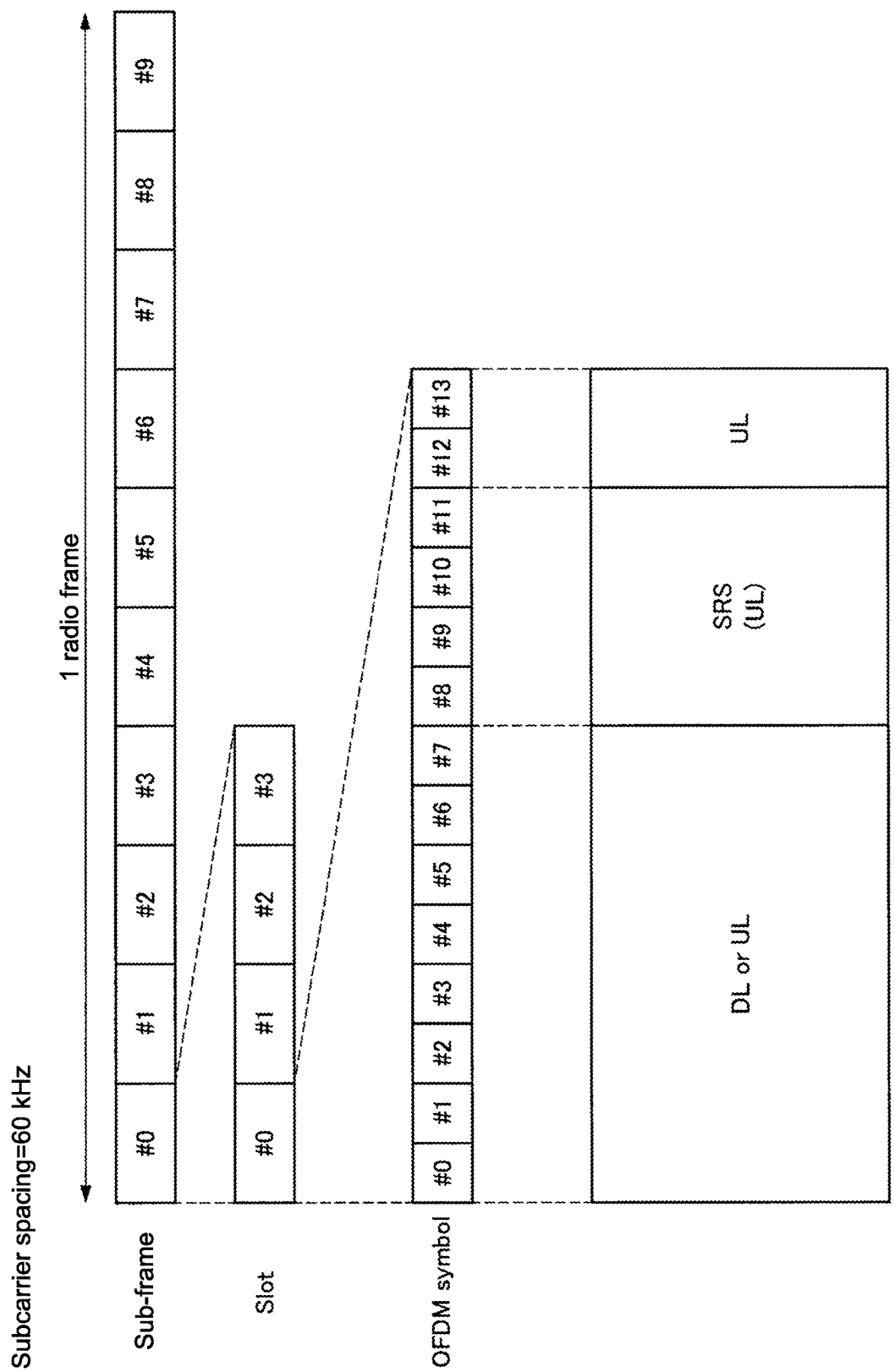
FIG. 13 is a diagram illustrating an example of the OFDM symbol used in the SRS transmission in the NR.

FIG. 13 is a diagram illustrating an example of the OFDM symbols used in the SRS transmission in the NR. In the example illustrated in FIG. 13, the subcarrier spacing is equal to 60 kHz, and a single sub-frame includes four slots. Of the 14 OFDM symbols (#0 to #13) included in the slot #0, the first eight OFDM symbols (#0 to #7) have the link direction in the DL direction or the UL direction, and the last six OFDM symbols (#8 to #13) have the link direction in the UL direction. In the example illustrated in FIG. 13, when four UL symbols are used for the SRS, of the last six OFDM symbols (#8 to #13), the SRS is transmitted using the first four OFDM symbols (#8 to #11). Meanwhile, the SRS transmission position is not limited to this example, and the SRS can be transmitted using any four successive UL symbols from among the six UL symbols (#8 to #13). The remaining UL symbols that are not used in the SRS transmission function as, for example, a margin period that is meant for preventing collision with the signals transmitted in other neighboring OFDM symbols or for transmitting other UL signals.

(4) Differences Between LTE and NR in Regard to SRS

First Difference

The first difference is related to the configuration of radio frames. In the LTE, the number of slots included in a single sub-frame is fixed. On the other hand, in the NR, the number of slots included in a single sub-frame is variable. Depending on the enhanced degree of freedom in the frame configuration in the NR, the level of difficulty in the periodic SRS transmission goes on increasing.

Second Difference

The second difference is related to the degree of freedom in the semi-static link direction configuration. In the LTE, seven types of link direction configurations are defined and, in each of the seven types of link direction configurations, at least a single radio frame includes a single uplink sub-frame. However, in the NR, not only the link direction configuration is set in the units of slots, but the link directions of the slots can be set in a flexible manner. Hence, for example, there are times when all slots included in a single radio frame are set as DL slots, so that UL transmission cannot be performed in that radio frame. Since the SRS cannot be transmitted in such a radio frame, the periodic SRS transmission may get hindered.

Third Difference

The third difference is related to the presence or absence of the dynamic link direction configuration. In the LTE, one of the seven types of link direction configurations is set in a semi-static manner. On the other hand, in the NR, the semi-static link direction configuration can get overwritten by the dynamic setting. Hence, even if it is possible to perform the periodic SRS transmission using a UL slot set in a semi-static manner, that UL slot may get dynamically reset to be a DL slot and the SRS periodic transmission may get hindered.

Fourth Difference

The fourth difference is related to the SRS transmission position. In the LTE, the SRS is transmitted using only the last one UL symbol. On the other hand, in the NR, the number of UL symbols used in the SRS transmission is not limited to one, and the SRS transmission position in a plurality of successive UL symbols is also arbitrary.

(5) Technical Problems

In the application concerned, in regard to the first to fourth differences explained above, a technology is proposed for solving the technical problems explained below.

First Problem

The first problem is related to the first difference explained earlier. In order to achieve the SRS periodic transmission, it is desirable that a mechanism is provided that is in accordance with the degree of freedom of the frame configuration in the NR.

Second Problem

The second problem is related to the second difference explained earlier. In order to achieve the SRS periodic transmission, it is desirable that a mechanism is provided that is in accordance with the degree of freedom of the semi-static link direction configuration.

The third problem is related to the third difference explained earlier. In order to achieve the periodic SRS transmission, it is desirable that a mechanism is provided that is in accordance with the degree of freedom of the dynamic link direction configuration.

The fourth problem is related to the fourth difference explained earlier. In order to achieve the periodic SRS transmission, it is desirable that a mechanism is provided that is in accordance with the degree of freedom of the number and the positions of UL symbols used in the SRS transmission.

The following explanation is given about a system according to an embodiment of the application concerned that enables solving the technical problems explained above.

2. Configuration Example

2.1. System Configuration Example

Figure 14:
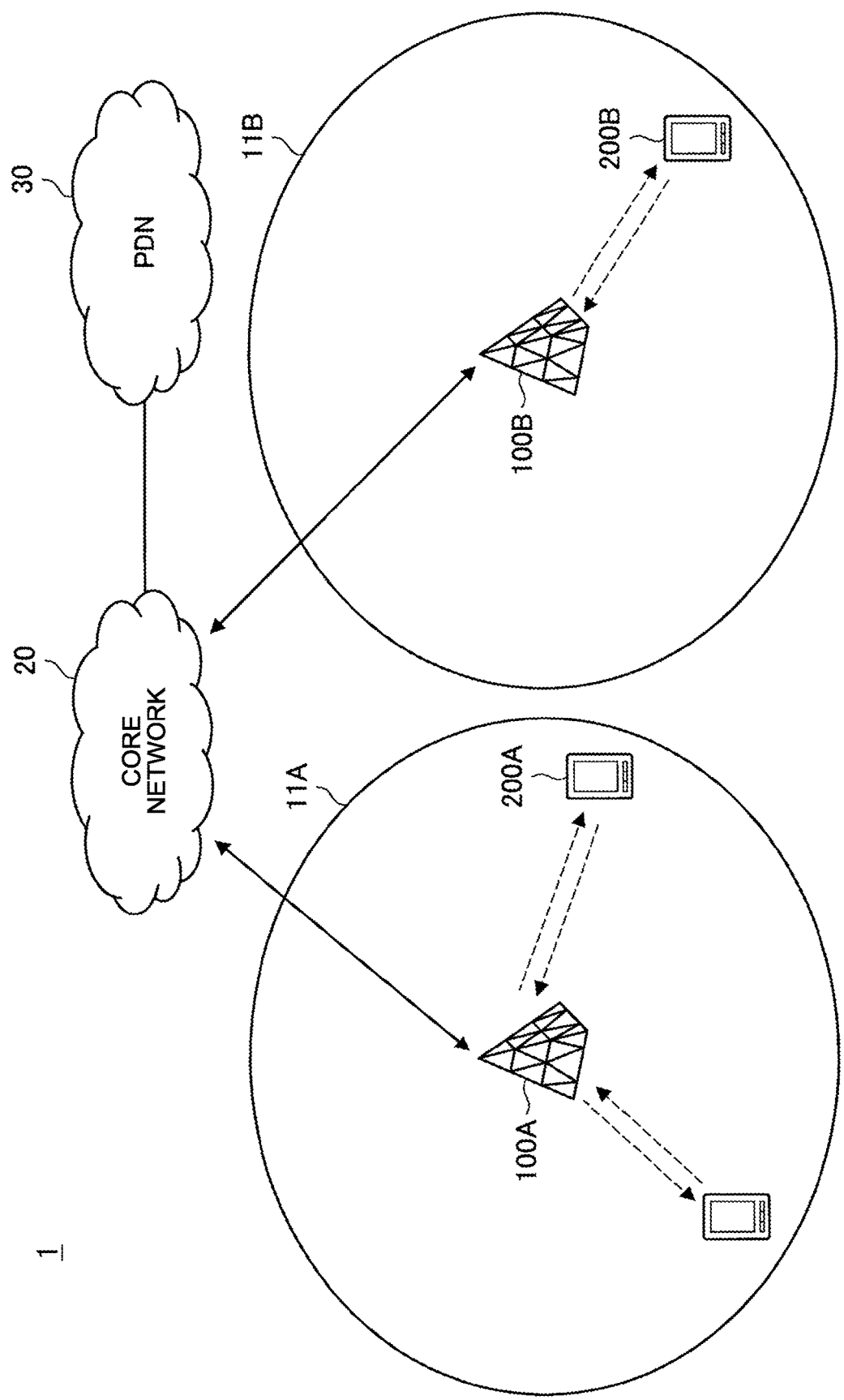
FIG. 14 is a diagram illustrating an exemplary overall configuration of a system according to an embodiment.

FIG. 14 is a diagram illustrating an exemplary overall configuration of a system 1 according to the present embodiment. As illustrated in FIG. 14, the system 1 includes base stations 100 (100A and 100B), terminal devices 200 (200A and 200B), a core network 20, and a PDN (Packet Data Network) 30.

The base stations 100 operate cells 11 and provide radio services to one or more terminal devices located inside the cells 11. For example, the base station 100A provides radio services to the terminal device 200A, and the base station 100B provides radio services to the terminal device 200B. The cells 11 can be operated according to an arbitrary radio communication system such as the LTE or the NR (New Radio). The base stations 100 are connected to the core network 20. Moreover, the core network 20 is connected to the PDN 30.

The core network 20 can include, for example, the MME (Mobility Management Entity), the S-GW (Serving gateway), the P-GW (PDN gateway), the PCRF (Policy and Charging Rule Function), and the HSS (Home Subscriber Server). The MME represents a control node that deals with the signals of the control plane, and manages the movement state of the terminal device. The S-GW represents a control node that deals with the signals of the user plane, and represents a gateway device for switching the transfer path of user data. The P-GW represents a control node that deals with the signals of the user plane, and represents a gateway device serving as a connection point between the core network 20 and the PDN 30. The PCR represents a control node that performs control regarding the policy, such as the QoS (Quality of Service), and the charging with respect to the bearer. The HSS represents a control node that deals with subscriber data and performs service control.

The terminal device 200 performs radio communication with the base station 100 under the control of the base station 100. The terminal device 200 can be what is called a user equipment (UE). For example, the terminal device 200 transmits UL signals to the base station 100, and receives downlink DL signals from the base station 100.

Particularly, in the present embodiment, the base station 100 and the terminal device 200 communicate with each other according to the TDD method.

2.2. Configuration Example of Base Station

Figure 15:
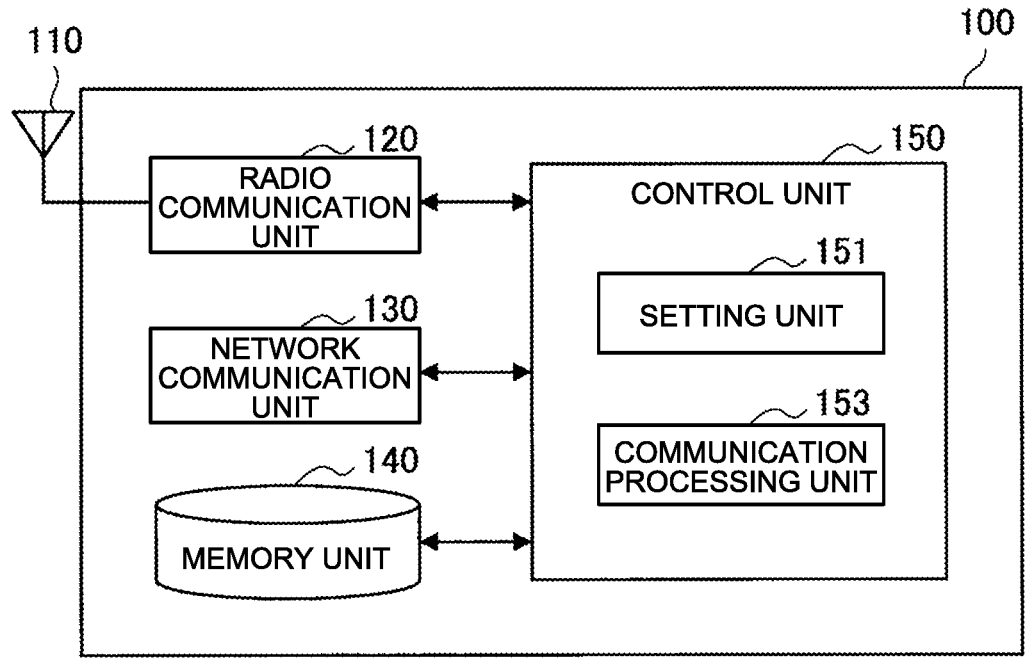
FIG. 15 is a block diagram illustrating an exemplary configuration of a base station according to the present embodiment.

FIG. 15 is a block diagram illustrating an exemplary configuration of the base station 100 according to the present embodiment. With reference to FIG. 15, the base station 100 includes an antenna unit 110, a radio communication unit 120, a network communication unit 130, a memory unit 140, and a control unit 150.

(1) Antenna Unit 110

The antenna unit 110 radiates, as radio waves into the space, signals output from the radio communication unit 120. Moreover, the antenna unit 110 converts the radio waves present in the space into signals, and outputs those signals to the radio communication unit 120.

(2) Radio Communication Unit 120

The radio communication unit 120 transmits and receives signals. For example, the radio communication unit 120 transmits downlink signals to a terminal device, and receives uplink signals from a terminal device.

(3) Network Communication Unit 130

The network communication unit 130 sends and receives information. For example, the network communication unit 130 sends information to other nodes and receives information from other nodes. For example, the other nodes include other base stations and other core network nodes.

(4) Memory Unit 140

The memory unit 140 is used to temporarily or permanently store programs and a variety of data meant to be used in the operations of the base station 100.

(5) Control Unit 150

The control unit 150 controls the overall operations of the base station 100, and provides various functions of the base station 100. The control unit 150 includes a setting unit 151 and a communication processing unit 153.

The setting unit 151 has the function of performing setting related to the communication with the terminal device 200. For example, the setting unit 151 sets the configuration related to the link directions in the terminal device 200, and sends the configuration to the terminal device 200. Moreover, the setting unit 151 sets the SRS-related configuration in the terminal device 200, and sends the configuration to the terminal device 200.

The communication processing unit 153 has the function of performing a communication operation with the terminal device 200. For example, the communication processing unit 153 receives the SRS from the terminal device 200 and measures it, and performs beam management and CSI acquisition based on the measurement result.

The control unit 150 can further include other constituent elements other than the constituent elements explained above. That is, the control unit 150 can be configured to perform other operations other than the operations of the constituent elements explained above.

2.3. Configuration Example of Terminal Device

Figure 16:
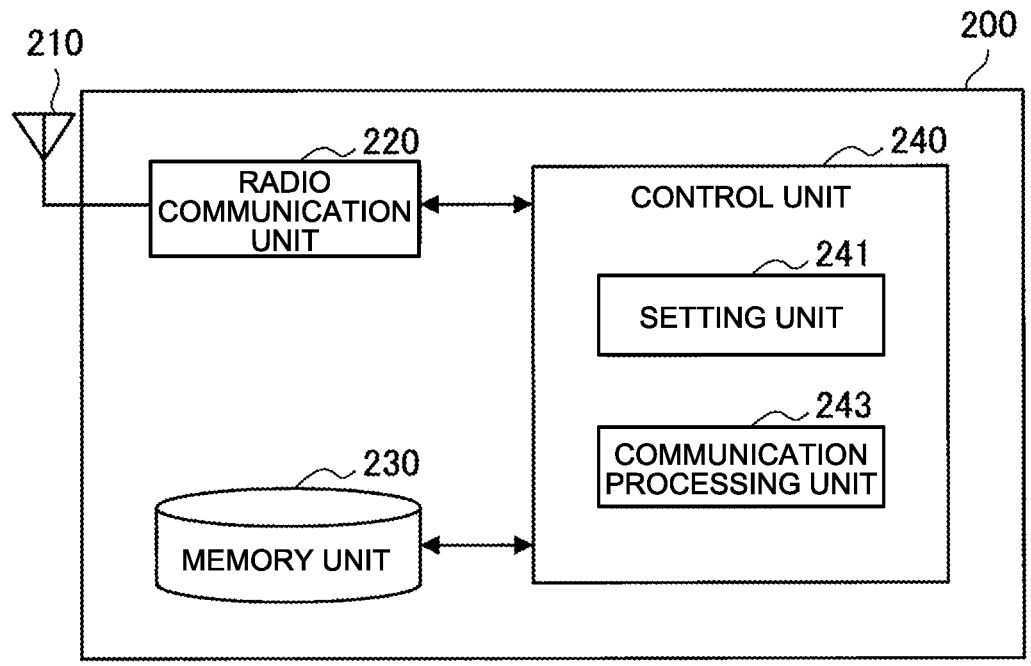
FIG. 16 is a block diagram illustrating an exemplary configuration of a terminal device according to the present embodiment.

FIG. 16 is a block diagram illustrating an exemplary configuration of the terminal device 200 according to the present embodiment. With reference to FIG. 16, the terminal device 200 includes an antenna unit 210, a radio communication unit 220, a memory unit 230, and a control unit 240.

(1) Antenna Unit 210

The antenna unit 210 radiates, as radio waves into the space, signals output from the radio communication unit 220. Moreover, the antenna unit 210 converts the radio waves present in the space into signals, and outputs those signals to the radio communication unit 220.

(2) Radio Communication Unit 220

The radio communication unit 220 transmits and receives signals. For example, the radio communication unit 220 receives downlink signals from a base station, and transmits uplink signals to a base station.

(3) Memory Unit 230

The memory unit 230 is used to temporarily or permanently store programs and a variety of data meant to be used in the operations of the terminal device 200.

(4) Control Unit 240

The control unit 240 controls the overall operations of the terminal device 200, and provides various functions of the terminal device 200. The control unit 240 includes a setting unit 241 and a communication processing unit 243.

The setting unit 241 has the function of performing setting related to the communication with the base station 100. For example, the setting unit 241 receives the configuration related to the link directions from the base station 100, and reflects the configuration in the communication operation. Moreover, the setting unit 241 receives the SRS-related configuration from the base station 100, and reflects the configuration in the communication operation.

The communication processing unit 243 has the function of performing a communication operation with the base station 100. For example, the communication processing unit 243 performs DL communication or UL communication based on the configuration related to the link direction. Moreover, the communication processing unit 243 performs periodic SRS transmission based on the SRS-related configuration; and, in case the periodic transmission is hindered, performs the SRS transmission using a substitute slot.

The control unit 240 can further include other constituent elements other than the constituent elements explained above. That is, the control unit 240 can be configured to perform other operations other than the operations of the constituent elements explained above.

3. Technical Features

In the present embodiment, the resources that should be used in the SRS transmission are set either in a semi-static manner or in a dynamic manner.

The setting information that is transmitted from the base station 100 to the terminal device 200 in a semi-static manner and that is meant for setting the resources, which should be used in the SRS transmission, in a semi-static manner is hereinafter referred to as a semi-static SRS configuration. For example, the semi-static SRS configuration is transmitted using the RRC signaling.

The setting information that is transmitted from the base station 100 to the terminal device 200 in a dynamic manner and that is meant for setting the resources, which should be used in the SRS transmission, in a dynamic manner is hereinafter referred to as a dynamic SRS configuration. For example, the dynamic SRS configuration is transmitted using downlink control signals of the PDCCH (Physical Downlink Control Channel) or the system information (for example, the MIB (Master Information Block) or the SIB (System Information Block)). Particularly, the dynamic SRS configuration can be transmitted using the SFI in the PDCCH.

Meanwhile, when the types of the SRS configuration need not be particularly distinguished from each other, they are collectively referred to as the SRS configuration.

The SRS configuration according to the present embodiment can be used for the purpose of beam management or for the purpose of CSI acquisition.

3.1. Semi-Static SRS Configuration

The base station 100 transmits the semi-static SRS configuration to the terminal device 200. The semi-static configuration is the setting information representing a first resource that is placed on a periodic basis and that should be used in the SRS transmission. Based on the semi-static SRS configuration, the terminal device 200 performs the SRS transmission in the first resource that is set as the resource to be used in the SRS transmission. As a result, the terminal device 200 becomes able to periodically transmit the SRS with the period set by the base station.

Meanwhile, in the first resource set according to the semi-static SRS configuration, the key point to note is that the terminal device 200 is not always able to transmit the SRS. For example, when the first resource is a DL slot, the terminal device 200 cannot transmit the SRS. Moreover, when the semi-static link direction configuration is overwritten by the dynamic link direction configuration (i.e., the SFI) and, for example, if the first resource becomes a DL slot; the terminal device 200 cannot transmit the SRS.

The semi-static SRS configuration includes the information indicating the radio frame in which the first resource is placed, and the information indicating the slots in which the first resource is placed in the radio frame. That is, the setting of the first resource according to the semi-static SRS configuration includes the setting of the positions of the first resource in the units of radio frames, and includes the setting of the positions of the first resource in the units of slots in a radio frame. According to the setting in the units of radio frames, the positions of the first resource are set in broad terms; and, according to the setting in the units of slots, the positions of the first resource are set in detail.

(1) Setting of Positions of First Resource in Units of Radio Frames

The setting of the positions of the first resource in the units of radio frames can be performed by setting the periodicity of the first resource in the units of slot counts included in the radio frames. The slot count included in a radio frame differs according to the subcarrier spacing. Thus, the first resource (more precisely, the radio frame including the first resource) is placed with the periodicity equal to the integral multiple of the number of slots in each radio frame in accordance with the subcarrier spacing. An example of the periodicity of the first resource is given below in Table 4.

TABLE 4

Example of periodicity of first resource

| Subcarrier spacing | Slot count in one radio frame | Slot count in one sub-frame | Candidates for periodicity (units of slots) |
|---|---|---|---|
| 15 kHz | 10 | 1 | 10, 20, 30, 40, 50, . . . |
| 30 kHz | 20 | 2 | 20, 40, 60, 80, . . . |
| 60 kHz | 40 | 4 | 40, 80, 120, . . . |

TABLE 4-continued

Example of periodicity of first resource

| Subcarrier spacing | Slot count in one radio frame | Slot count in one sub-frame | Candidates for periodicity (units of slots) |
|---|---|---|---|
| 120 kHz | 80 | 8 | 80, 160, 240, . . . |
| 240 kHz | 160 | 16 | 160, 320, 480, . . . |
| 480 kHz | 320 | 32 | 320, 640, 960, . . . |

Herein, Table 4 indicates, for each subcarrier spacing, the number of slots included in a single radio frame, the number of slots included in a single sub-frame, and the periodicity of the first resource. As illustrated in Table 4, when the subcarrier spacing is equal to 15 kHz, 10 slots are included in a single radio frame. Moreover, the candidates for the periodicity of the first resource are in the integral multiple of the number of slots included in a single frame, such as 10 slots, 20 slots, 30 slots, 40 slots, and 50 slots. For example, if the periodicity of the first resource is set to 10 slots, then the SRS is transmitted in each radio frame. Alternatively, if the periodicity of the first resource is set to 20 slots, then the SRS is transmitted after every two radio frames (i.e., the SRS is transmitted in alternate radio frames).

The semi-static SRS configuration includes the information indicating the periodicity in the integral multiple of the number of slots in each radio frame in accordance with the subcarrier spacing. As a result, the terminal device 200 becomes able to transmit the SRS with the periodicity in the units of radio frames; such as in each radio frame, after every two radio frames, or after every three radio frames.

(2) Setting of Positions of First Resource in Units of Slots in Radio Frame

The setting of the positions of the first resource in the units of slots in the radio frame is performed by setting, in the units of slots, the positions of the first resource in the radio frames that include the first resource (i.e., the radio frames equivalent to the periodicity of the first resource). Examples of the setting method include a method in which a look-up table is used and a method in which a look-up table is not used. The explanation about those setting methods is given below.

(2.1) Method in which Look-Up Table is Used

The look-up table indicates which of a plurality of slots included in a radio frame represent the first resource. The terminal device 200 performs the SRS transmission in those slots, in a radio frame that includes the first resource, which are set as the first resource according to the look-up table. As a result of using the look-up table, it becomes possible to set the positions of the first resource in detail.

Particularly, the look-up table is desirably configured in such a way that the resources enabling the SRS transmission are set as the first resource based on the semi-static link direction configuration. In that case, since the first resource is placed in the resources enabling the SRS transmission, it becomes possible to perform the periodic SRS transmission. That is, in regard to the second problem explained earlier, the terminal device 200 can periodically transmit the SRS in the resources that are set according to the semi-static link direction configuration as the resources enabling the SRS transmission.

Meanwhile, examples of the resources enabling the SRS transmission include the UL slots. On the other hand, examples of the resources not enabling the SRS transmission include the DL slots and the unknown slots. Moreover, as described later, depending on the number and the positions of the UL symbols, the DL-UL slots may or may not serve as the resources enabling the SRS transmission.

An example of the look-up table is given below in Table 5.

TABLE 5

Example of look-up table in case of subcarrier spacing = 60 kHz

| Slot | Transmission/no transmission of SRS |
|---|---|
| *0 | — |
| *1 | — |
| *2 | SRS transmission |
| *3 | SRS transmission |
| *4 | — |
| *5 | SRS transmission |
|  | — |
| *37 | — |
| *38 | SRS transmission |
| *39 | — |

In Table 4 is illustrated an example of the look-up table in the case in which the subcarrier spacing is equal to 60 kHz. Herein, there are 40 slots included in a single radio frame, and each of the 40 rows in the look-up table illustrated in Table 4 corresponds to a slot included in a single radio frame. The number of rows in the look-up table corresponds to the number of slots included in a single radio frame. For example, if the subcarrier spacing is equal to 480 kHz, the number of rows in the look-up table becomes equal to 320. According to the look-up table illustrated in Table 4, the SRS is transmitted in the second slot (#2), the third slot (#3), the fifth slot (#5), and the 38-th slot (#38).

Regarding the setting of the first resource using a look-up table as described above, an example is explained below with reference to FIG. 17.

Figure 17:
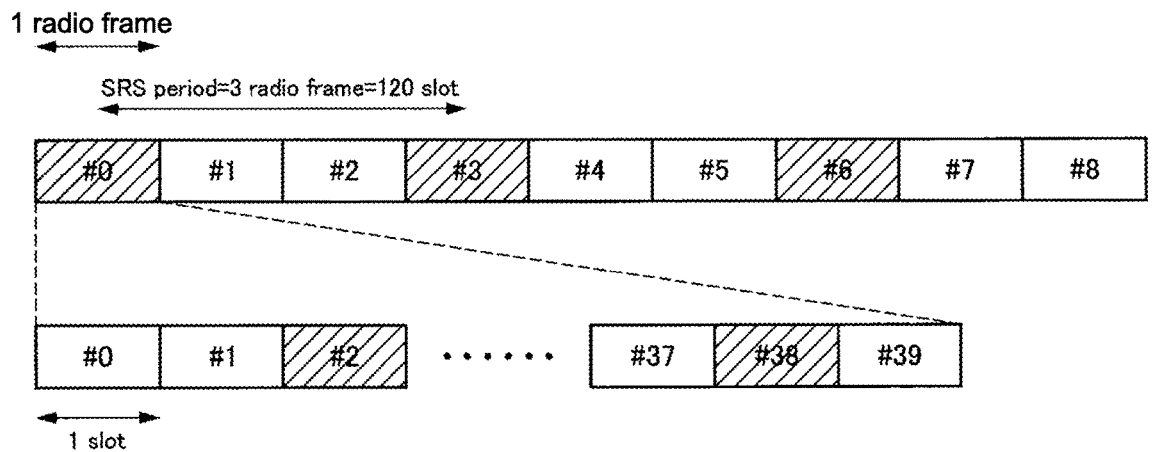
FIG. 17 is a diagram for explaining an example of setting a first resource according to the present embodiment.

FIG. 17 is a diagram for explaining an example of setting the first resource according to the present embodiment. In the example illustrated in FIG. 17, the subcarrier spacing is assumed to be equal to 60 kHz. That is, 40 slots are included in a single radio frame. As illustrated in the upper portion of FIG. 17, if the periodicity of the first resource is set to 120 slots that is thrice the number of slots in each radio frame, then the SRS is transmitted after every three radio frames. More particularly, the SRS is transmitted in the zeroth radio frame (#0), the third radio frame (#3), and the sixth radio frame (#6). Moreover, in a radio frame that includes the first resource, the setting of the specific positions of the first resource is performed using a look-up table illustrated in the lower portion in FIG. 17. According to the look-up table illustrated in the lower portion in FIG. 17, the SRS is transmitted in the second slot (#2), the third slot (#3), the fifth slot (#5), and the 38-th slot (#38).

Till now, the explanation was given about the method of setting the first resource using a look-up table.

The semi-static SRS configuration includes information in which the look-up table is specified as the information for setting the positions of the first resource in a radio frame that includes the first resource. As a result, the terminal device 200 becomes able to periodically transmit the SRS in the slots set by the base station 100.

Meanwhile, the semi-static SRS configuration can also include an actual look-up table. Moreover, the terminal device 200 can store in advance a plurality of candidates for the look-up table, and which of the candidates is to be used can be set according to the semi-static SRS configuration.

(2.2) Method in which Look-Up Table is not Used

The terminal device 200 can recognize the positions of the first resource in the units of slots in a radio frame based on predetermined rules. It is possible to think of various predetermined rules. For example, the first resource can be placed in the slot arriving at the periodicity of a predetermined slot count in a radio frame. Thus, the terminal device 200 can transmit the SRS in the slot arriving at the periodicity of the predetermined slot count in the radio frame including the first resource. Meanwhile, in the case of placing a plurality of first resources in a radio frame, it is desirable that the periodicity of the first resources in the radio frame is the periodicity of the slot count that is smaller than the slot count in each radio frame in accordance with the subcarrier spacing.

The number of slots required for determining the arrival of the periodicity of the first resource can either be counted regardless of the types of the slots or be counted with respect to only the slots enabling the SRS transmission. In the former case, the slots such as the DL slots that do not enable the SRS transmission also get counted. In the latter case, only the slots such as the UL slots that enable the SRS transmission get counted. Each point is explained below in detail.

First Counting Method

The following explanation is given about the case in which the number of slots required for determining the arrival of the periodicity of the first resource is counted regardless of the types of the slots.

FIG. 18 is a diagram for explaining an example of the setting of the first resource according to the present embodiment. In FIG. 18, regarding a plurality of slots included in a particular radio frame, the slot numbers are illustrated in the first level; the semi-static link direction configuration is illustrated in the second level; the semi-static SRS configuration is illustrated in the third level; and whether or not the SRS transmission is actually performed is illustrated in the fourth level. In the second level, the slots labeled as "UL" represent the UL slots. Similarly, in the second level, the slots labeled as "DL" represent the DL slots. Moreover, in the second level, the slots labeled as "DL-UL" represent the DL-UL slots. Furthermore, in the second level, the slots labeled as "unknown" represent the unknown slots. In the third level, the slots labeled as "SRS" represent the slots set as the first resource. Moreover, in the third level, the slots labeled as "–" represent the slots not set as the first resource. In the fourth level, the slots labeled as "SRS" represent the slots in which the SRS is actually transmitted. Moreover, in the fourth level, the slots labeled as "–" represent the slots in which the SRS is not actually transmitted. In the example illustrated in FIG. 18, as illustrated in the third level, the first resource is placed at the periodicity of five slots. More specifically, the first resource is placed in the zeroth slot (#0), the fifth slot (#5), and the 10-th slot (#10). With reference to the second level, all of the slots in which the first resource is placed represent the UL slots in which the SRS can be transmitted. Hence, the terminal device 200 performs the SRS transmission in all set positions of the first resource.

Meanwhile, in the NR, since the degree of freedom of the semi-static link direction configuration is higher than in the LTE, there are times when a slot set as the first resource is a slot such as a DL slot that does not enable the SRS transmission. In that case, an adaptive operation is performed, such as either skipping (i.e., not performing) the SRS transmission in the slot arriving at the set periodicity or skipping the concerned SRS transmission and then performing the SRS transmission in a substitute slot. Given below is the explanation of the examples of the adaptive operation that can be performed by the terminal device 200.

First Example of Adaptive Operation

When the SRS cannot be transmitted in the first resource, the terminal device 200 can skip the SRS transmission in the first resource. In that case, the processing load of the terminal device 200 related to the SRS transmission can be reduced by the amount equal to the skipped SRS transmission. Moreover, since the base station 100 too can skip the reception or the measurement of the SRS in the set first resource, the processing load of the base station 100 can also be reduced by the amount equal to the skipped SRS reception. A specific example of the present example is explained below with reference to FIG. 19.

FIG. 19 is a diagram for explaining an example of the adaptive operation based on the setting of the first resource according to the present embodiment. In FIG. 19, the levels and the labeling of the slots have the same meaning as the meaning with reference to FIG. 18. In the example illustrated in FIG. 19, as illustrated in the third level, the first resource is placed at the periodicity of five slots. More specifically, the first resource is placed in the zeroth slot (#0), the fifth slot (#5), and the 10-th slot (#10). With reference to the second level, from among the slots in which the first resource is placed, the fifth slot (#5) is a DL slot that does not enable the SRS transmission. Hence, as illustrated in the fourth level, the terminal device 200 skips the SRS transmission in the fifth slot (#5).

Second Example of Adaptive Operation

When the SRS transmission in the first resource is skipped as explained above in the first example of the adaptive operation, the terminal device 200 can transmit the SRS in a resource that enables the SRS transmission and that arrives after the skipped first resource. That is, the terminal device 200 performs the SRS transmission in the substitute slot that arrives immediately after the skipped slot. Hence, in this third example, as compared to the first example of the adaptive operation, it becomes possible to alleviate the collapse in the periodicity of the SRS. A specific example of the present example is explained below with reference to FIG. 20.

FIG. 20 is a diagram for explaining an example of the adaptive operation based on the setting of the first resource according to the present embodiment. In FIG. 20, the levels and the labeling of the slots have the same meaning as the meaning with reference to FIG. 18. In the example illustrated in FIG. 20, as illustrated in the third level, the first resource is placed at the periodicity of five slots. More specifically, the first resource is placed in the zeroth slot (#0), the fifth slot (#5), and the 10-th slot (#10). With reference to the second level, from among the slots in which the first resource is placed, the fifth slot (#5) is a DL slot that does not enable the SRS transmission. Moreover, with reference to the second level, the eighth slot (#8) representing a UL slot can be said to be the resource enabling the SRS transmission after the fifth slot (#5). Hence, as illustrated in the fourth level, the terminal device 200 skips the SRS transmission in the fifth slot (#5) and transmits the SRS in the eighth slot (#8).

Third Example of Adaptive Operation

When the number of times for which the SRS transmission is skipped according to the first example of the adaptive operation reaches a predetermined upper limit value, the terminal device 200 can transmit the SRS in a resource that enables the SRS transmission and that arrives after the first resource that was skipped last. That is, when the number of times of skipping reaches the predetermined upper limit value, the terminal device 200 transmits the SRS in the substitute slot that arrives immediately after the slot that was skipped last. Hence, in the present example, as compared to the first example of the adaptive operation, it becomes possible to alleviate the collapse in the periodicity of the SRS. Moreover, in the present example, as compared to the second example of the adaptive operation, since it becomes possible to reduce the SRS transmission count, the processing load of the base station 100 and the terminal device 200 can be reduced. Meanwhile, the terminal device 200 can transmit the SRS in the substitute slots corresponding to the skipping count (for example, equal in number to the skipping count).

Fourth Example of Adaptive Operation

When the SRS transmission is skipped according to the first example of the adaptive operation, the terminal device 200 can transmit the SRS in a resource that arrives after the skipped first resource and that is switched, using a DL control signal, to enable the SRS transmission. For example, when a DL slot is switched to a UL slot using the SFI, the terminal device 200 transmits the SRS in the switched UL slot. Hence, in the present example, the substitute slot can be set in a flexible manner as compared to the other examples. A specific example of the present example is explained below with reference to FIG. 21.

Figure 21:
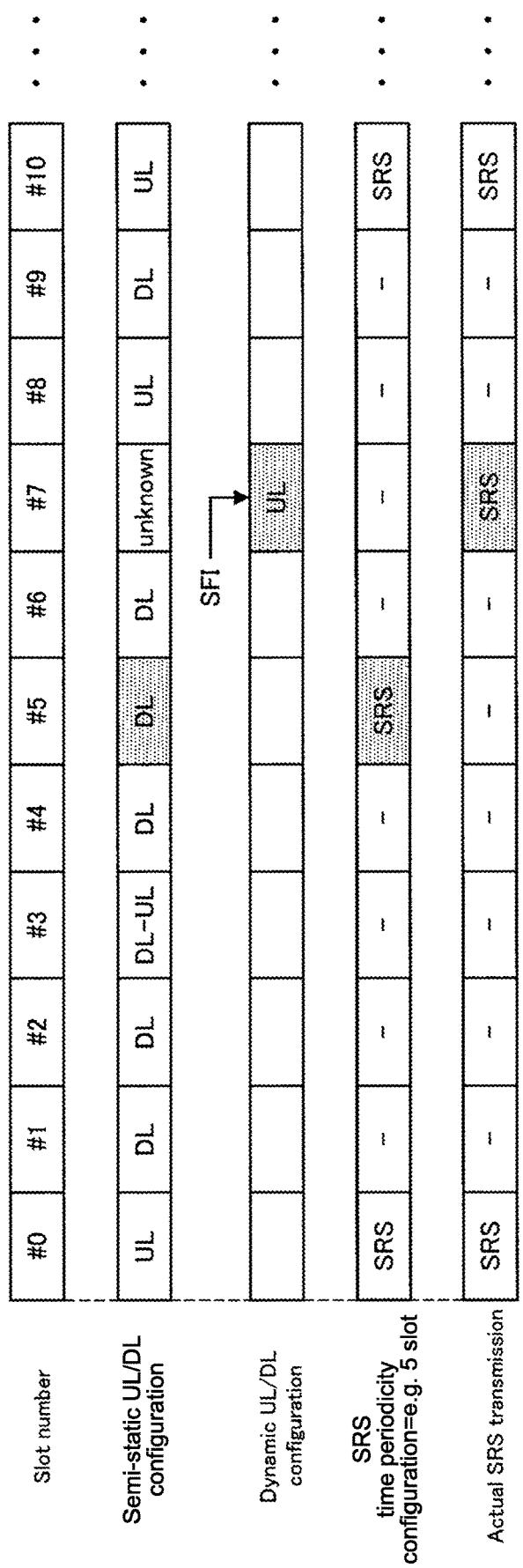
FIG. 21 is a diagram for explaining an example of the adaptive operation based on the setting of the first resource according to the present embodiment.

FIG. 21 is a diagram for explaining an example of the adaptive operation based on the setting of the first resource according to the present embodiment. In FIG. 21, the levels and the labeling of the slots have the same meaning as the meaning with reference to FIG. 18. However, the third level illustrated in FIG. 21 is a new level not illustrated in FIG. 18, and represents the dynamic link direction configuration set according to control signals. In the example illustrated in FIG. 21, as illustrated in the fourth level, the first resource is placed at the periodicity of five slots. More specifically, the first resource is placed in the zeroth slot (#0), the fifth slot (#5), and the 10-th slot (#10). With reference to the second level, from among the slots in which the first resource is placed, the fifth slot (#5) is a DL slot not enabling the SRS transmission. Herein, as illustrated in the third level, the seventh slot (#7) is dynamically switched to be a UL slot, which enables the SRS transmission, from being an unknown slot using the SFI. The SFI is included in, for example, the PDCCH of the sixth slot (#6). Thus, as illustrated in the fifth level, the terminal device 200 skips the SRS transmission in the fifth slot (#5) and then transmits the SRS in the seventh slot (#7).

Till now, the explanation was given about the examples of the adaptive operation.

When the first counting method is implemented, the semi-static SRS configuration includes the information indicating the number of slots that indicate the periodicity of the first resource in a radio frame. Moreover, the semi-static SRS configuration includes the information indicating the adaptive operation to be implemented and the setting information related to that adaptive operation. For example, when the third example of the adaptive operation is to be implemented, the semi-static SRS configuration includes the information indicating the upper limit value of the skipping count.

Second Counting Method

The following explanation is given about the case in which the number of slots required for determining the arrival of the periodicity of the first resource is counted with respect to the slots such as the UL slots enabling the SRS transmission.

In this case, the first resource is placed in the slots that correspond to the periodicity of the slot count of the slots enabling transmission of the SRS in a radio frame. Moreover, the upper limit value of the SRS transmission count in each radio frame can also be set. In other words, the upper limit value of the number of first resources in each radio frame can also be set. As a result, it becomes possible to prevent unnecessary transmission of the SRS. An example of the configurations according to the present example is given below in Table 6.

TABLE 6

Example of configuration according to second counting method

| Configuration | periodicity | Repetition |
| --- | --- | --- |
| 0 | 2 | 3 |
| 1 | 5 | 10 |
| 2 | 7 | 5 |
| 3 | 2 | 10 |

Herein, Table 6 is a table indicating the periodicity and the repetitive transmission count for each configuration. For example, in the case of the configuration 0, the SRS is transmitted after every two UL slots (i.e., in alternate UL slots) in a particular radio frame and, when the SRS is transmitted for three times, the SRS transmission in that radio frame is ended. With reference to Table 7 given below, the explanation is given about an example of the transmission/no transmission of the SRS in the case in which the configuration 0 is implemented.

TABLE 7

Example of transmission/no transmission of SRS in case of subcarrier spacing = 60 kHz

| Slot numbers in one radio frame | UL/DL setting | UL slot numbers in one radio frame | Transmission/no transmission of SRS |
| --- | --- | --- | --- |
| *0 | DL | | |
| *1 | UL | 0 | SRS |
| *2 | UL | 1 | |
| *3 | UL | 2 | SRS |
| *4 | DL | | |
| *5 | UL | 3 | |
| *6 | UL | 4 | SRS |
| *7 | UL | 5 | |
| *8 | UL | 6 | — |
| ... | ... | ... | ... |
| *39 | DL | | |

In Table 7 is illustrated an example in which, for each slot in a particular radio frame, the following information is given: the slot number, the link direction, the UL slot number in that radio frame, and the transmission/no transmission of the SRS in the case of implementing the configuration 0. With reference to the configuration 0 illustrated in Table 6, the SRS is transmitted after every two UL slots. Thus, as illustrated in Table 7, since the first slot (#1) is the zeroth UL slot, the initial SRS is transmitted. Since the third slot (#3) is the second UL slot, the second SRS is transmitted. Since the sixth slot (#6) is the fourth UL slot, the third SRS is transmitted. Moreover, with reference to the configuration 0 illustrated in Table 6, when the SRS is transmitted for three times, the SRS transmission in that radio frame is ended. Hence, although the eighth slot (#8) is the sixth UL slot, the SRS is not transmitted.

In the case of implementing the second counting method, the semi-static SRS configuration includes the information indicating the periodicity of the first resource in the radio frame and indicating the number of slots enabling the SRS transmission. Moreover, the semi-static SRS configuration includes the information indicating the upper limit value of the SRS transmission count in each radio frame, or indicating the upper limit value of the number of first resources in each radio frame. That is, the semi-static SRS configuration includes the configurations illustrated in Table 6.

Summary

Till now, the explanation was given about the methods in which a look-up table is not used. According to those methods, the terminal device 200 can periodically transmit the SRS even without using a look-up table. More specifically, in regard to the second problem explained earlier, the terminal device 200 can periodically transmit the SRS in the resources enabling the SRS transmission as set according to the semi-static link direction configuration. Meanwhile, in the methods in which a look-up table is not used, no look-up table is sent from the base station 100 to the terminal device 200. Thus, as compared to the case in which a look-up table is used, the methods in which a look-up table is not used enable achieving reduction in the processing load of the base station 100 and the terminal device 200 and enable achieving reduction in the communication load related to the transmission and reception of the semi-static SRS configuration.

Particularly, in the first counting method, the counting for determining the arrival of the periodicity of the first resource is performed regardless of the types of the slots. Hence, as compared to the second counting method, it becomes possible to alleviate the collapse in the periodicity of the first resource. For example, in the first counting method, when the first example of the adaptive operation is implemented, the slots enabling the SRS transmission are identical in any radio frame. In contrast, in the second counting method, depending on the positions of the slots enabling the SRS transmission, the positions of the slots in which the SRS is transmitted may significantly vary.

In the second counting method, since the resource enabling the SRS transmission is set as the first resource; as compared to the first counting method, the processing load can be reduced because it is not necessary to perform an adaptive operation.

3.2. SRS Configuration for Each Bandwidth Part

In the NR, the component carrier can have a plurality of bandwidth parts. In that case, it is possible to set different subcarrier spacing for each bandwidth part. That is, for each bandwidth part, there can be a different number of slots included in a single sub-frame.

In that regard, in the present embodiment, in each of a plurality of bandwidth parts included in the component carrier, the first resource is periodically placed based on the number of slots in each radio frame in accordance with the subcarrier spacing of that bandwidth part.

More specifically, the setting of the positions of the first resource in the units of radio frames is performed based on the number of slots in each radio frame in accordance with the subcarrier spacing of the bandwidth part. For example, the first resource is placed with the periodicity equal to the integral multiple of the number of slots in each radio frame in accordance with the subcarrier spacing of the bandwidth part.

Moreover, the setting of the positions of the first resource in the units of slots in a radio frame is performed based on the number of slots in each radio frame in accordance with the subcarrier spacing of the bandwidth part. For example, a look-up table is set for each bandwidth part, and it has the number of rows in accordance with the subcarrier spacing of the bandwidth part.

In view of the placement of the first resource for each bandwidth part, the SRS configuration is set for each bandwidth part. More specifically, the semi-static SRS configuration includes, for each of a plurality of bandwidth parts, the information indicating the radio frames in which the first resource is placed and the information indicating the slots in which the first resource is placed in each radio frame. Meanwhile, in each of a plurality of bandwidth parts, the first resource can have a different periodicity.

Based on the SRS configuration, the terminal device 200 transmits the SRS in the first resource that is periodically placed for each bandwidth part. As a result, in regard to the first problem explained earlier, the terminal device 200 can periodically transmit the SRS in accordance with the frame configuration.

Given below is the explanation of a specific example of a semi-static SRS configuration in the case in which a plurality of bandwidth parts is included in the component carrier.

In Case of Method in which Look-Up Table is Used

Figure 22:
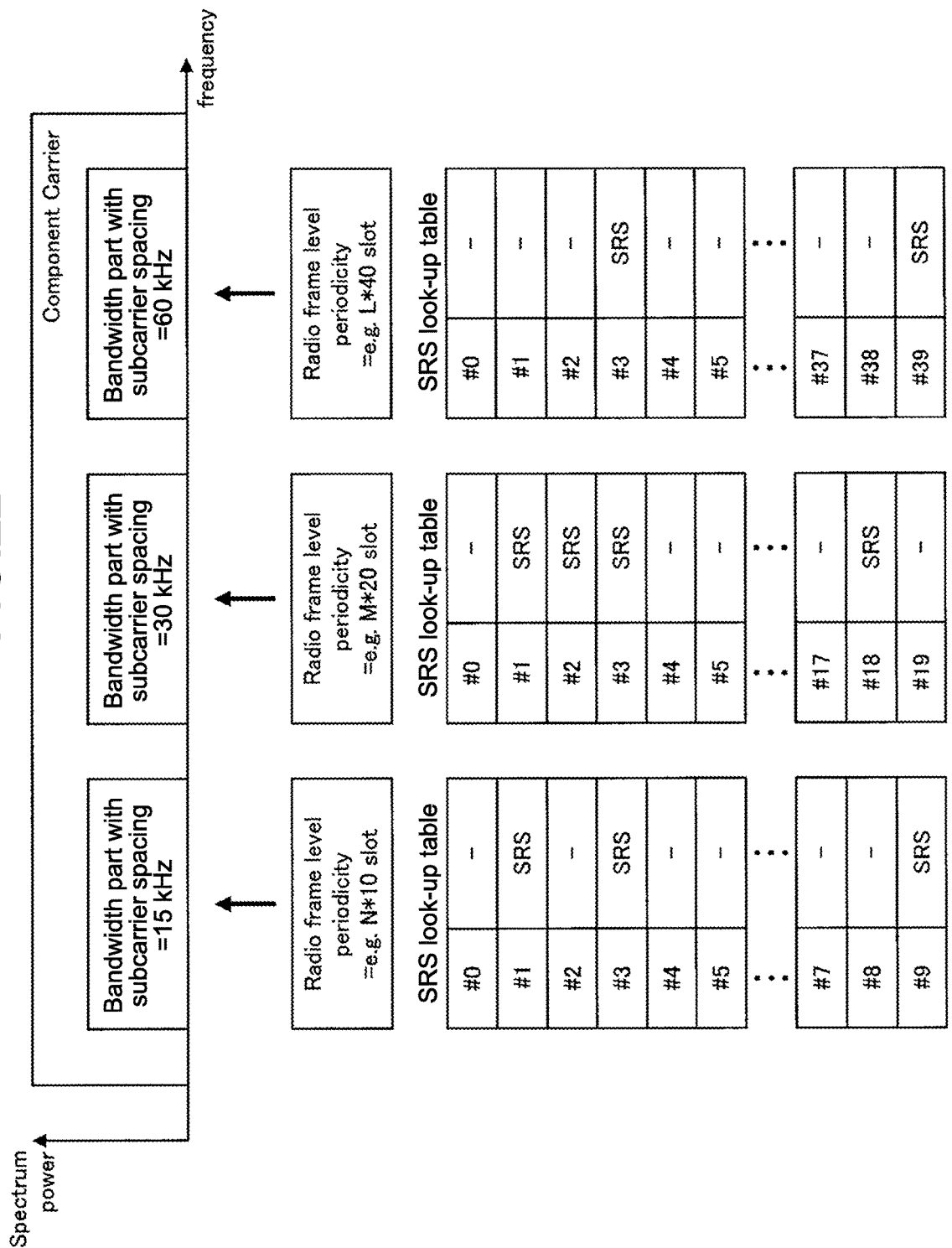
FIG. 22 is a diagram for explaining an example of a semi-static SRS configuration according to the present embodiment.

FIG. 22 is a diagram for explaining an example of the semi-static SRS configuration according to the present embodiment. In FIG. 22 is illustrated an example in which the setting of the positions of the first resource in the units of slots in a radio frame is performed by implementing the method in which a look-up table is used. As illustrated in FIG. 22, the component carrier includes a first bandwidth part with the subcarrier spacing equal to 15 kHz, a second bandwidth part with the subcarrier spacing equal to 30 kHz, and a third bandwidth part with the subcarrier spacing equal to 60 kHz.

Accordingly, in each of the three bandwidths, according to the semi-static SRS configuration, the positions of the first resource are set in the units of radio frames, and the positions of the first resource are set in the units of slots in the radio frames. Moreover, look-up tables are set to be used for the three bandwidths.

When the subcarrier spacing is equal to 15 kHz, there are 10 slots in each radio frame. Thus, as illustrated in FIG. 22, in the first bandwidth part, the first resource is placed after every N×10 number of slots. That is, the SRS is transmitted after every N number of radio frames. Moreover, as illustrated in FIG. 22, there are 10 rows in the look-up table used for the first bandwidth part.

When the subcarrier spacing is equal to 30 kHz, there are 20 slots in each radio frame. Thus, as illustrated in FIG. 22, in the second bandwidth part, the first resource is placed after every M×20 number of slots. That is, the SRS is transmitted after every M number of radio frames. Moreover, as illustrated in FIG. 22, there are 20 rows in the look-up table used for the second bandwidth part.

When the subcarrier spacing is equal to 60 kHz, there are 40 slots in each radio frame. Thus, as illustrated in FIG. 22, in the third bandwidth part, the first resource is placed after every L×40 number of slots. That is, the SRS is transmitted after every L number of radio frames. Moreover, as illustrated in FIG. 22, there are 40 rows in the look-up table used for the third bandwidth part.

In Case of Method in which Look-Up Table is not Used

Figure 23:
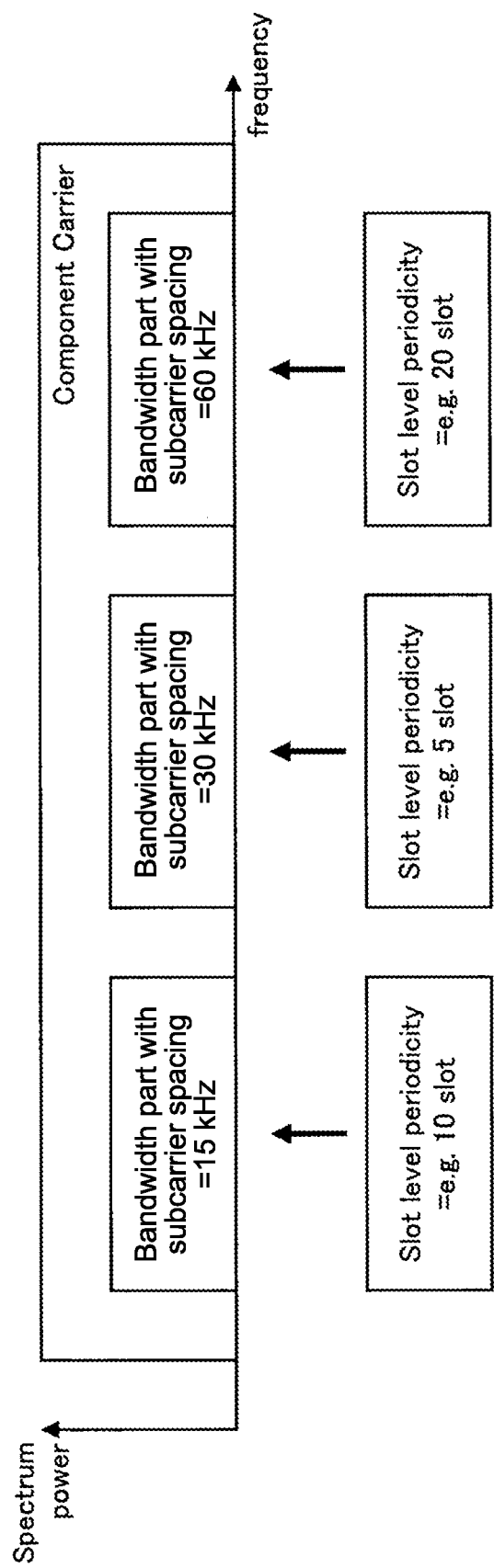
FIG. 23 is a diagram for explaining an example of the semi-static SRS configuration according to the present embodiment.

FIG. 23 is a diagram for explaining an example of the semi-static SRS configuration according to the present embodiment. In FIG. 23 is illustrated an example in which the setting of the positions of the first resource in the units of slots in a radio frame is performed by implementing the method in which a look-up table is not used. As illustrated in FIG. 23, the component carrier includes a first bandwidth part with the subcarrier spacing equal to 15 kHz, a second bandwidth part with the subcarrier spacing equal to 30 kHz, and a third bandwidth part with the subcarrier spacing equal to 60 kHz. Accordingly, in each of the three bandwidths, according to the semi-static SRS configuration, the positions of the first resource are set in the units of radio frames, and the positions of the first resource is set in the units of slots in each radio frame.

As illustrated in FIG. 23, in the first bandwidth part, in a radio frame corresponding to the periodicity of the first resource, the first resource is placed after every 10 slots. In the second bandwidth part, in a radio frame corresponding to the periodicity of the first resource, the first resource is placed after every five slots. In the third bandwidth part, in a radio frame corresponding to the periodicity of the first resource, the first resource is placed after every 20 slots.

3.3. Determination of SRS Transmittability of in DL-UL Slot

As described above, the UL slots can serve as the resources enabling the SRS transmission. Moreover, depending on the number and the positions of the UL symbols, the DL-UL slots may or may not serve as the resources enabling the SRS transmission. That point is explained below in detail.

If the number of successive symbols enabling uplink communication in a slot is equal to or greater than the number of symbols required in the SRS transmission, then the terminal device 200 recognizes that slot as the slot enabling the SRS transmission. That is, if the number of successive UL slots included in a slot is equal to or greater than the number of OFDM symbols required in the SRS transmission, then the terminal device 200 recognizes that slot as the resource enabling the SRS transmission. As described above, the OFDM symbols required in the SRS transmission can include the UL symbols used in the SRS transmission and the UL symbols that function as the margin period explained earlier with reference to FIG. 13.

Moreover, the terminal device 200 can also take into consideration the positions of the successive UL slots. In that case, when the last OFDM symbol in a slot is a UL symbol and when the number of successive UL symbols including that last UL symbol is equal to or greater than the number of OFDM symbols required in the SRS transmission, the terminal device 200 recognizes that slot as the resource enabling the SRS transmission.

For example, assume that four UL symbols are required in the SRS transmission. In that case, in the slot (#0) having the configuration illustrated in FIG. 10, since the number of successive UL slots at the end is one, the terminal device 200 recognizes that slot as the slot not enabling the SRS transmission. On the other hand, in the slot (#0) having the configuration illustrated in FIG. 12, since the number of successive UL slots at the end is four, the terminal device 200 recognizes those slots as the slots enabling the SRS transmission.

In the DL-UL slots recognized as the slots enabling the SRS transmission, the terminal device 200 can transmit the SRS based on the SRS configuration. Since the SRS transmission becomes possible not only in the UL slots but also in the DL-UL slots, it leads to an increase in the resources enabling the SRS transmission. As a result, it becomes possible to alleviate the collapse in the periodicity of the SRS.

As described above, in regard to the fourth problem explained earlier, the terminal device 200 can determine the SRS transmittability in the DL-UL slots in accordance with the degree of freedom of the number and the positions of the UL symbols used in the SRS transmission.

Figure 24:
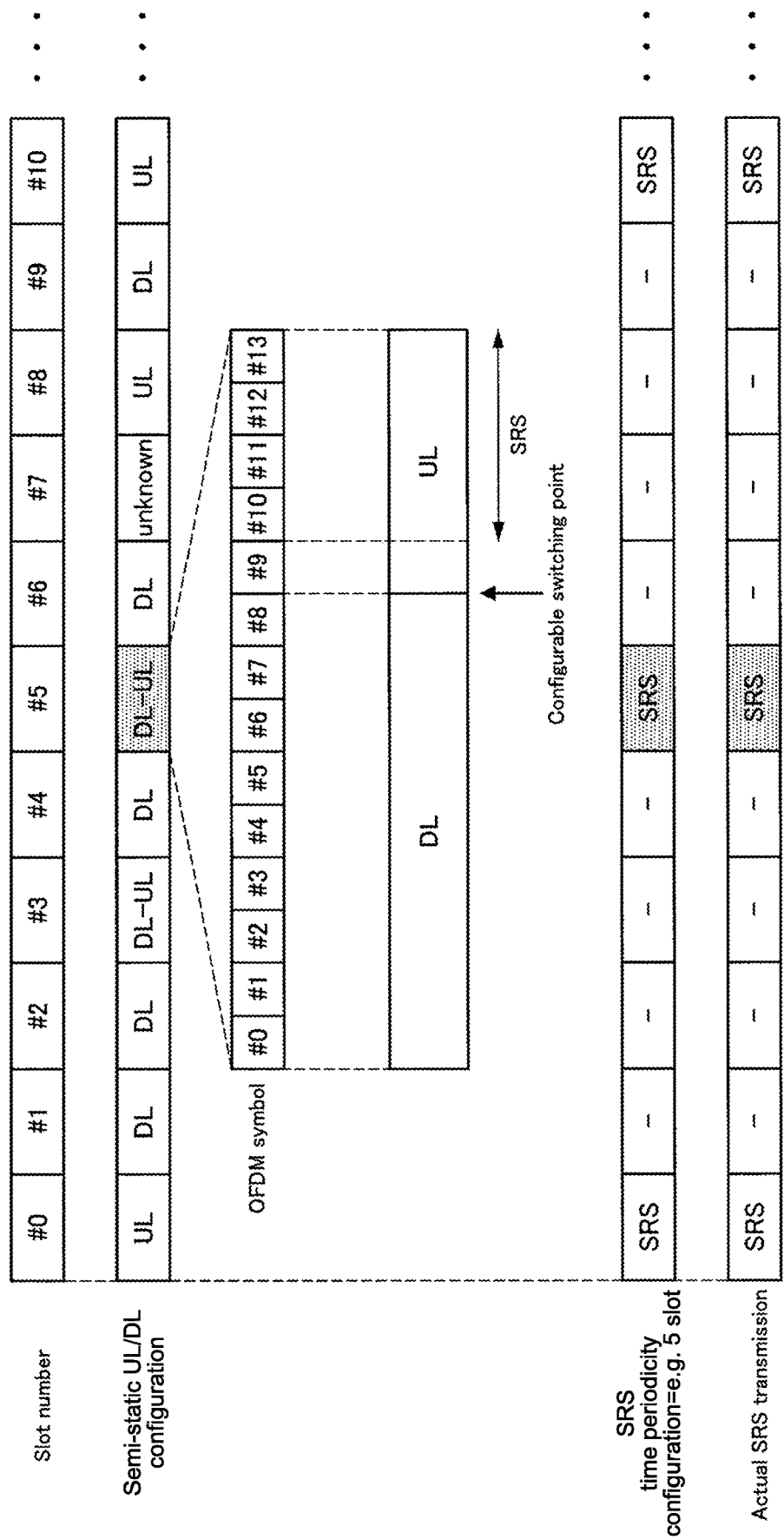
FIG. 24 is a diagram for explaining an example of the determination of SRS transmittability regarding a DL-UL slot according to the present embodiment.
Figure 25:
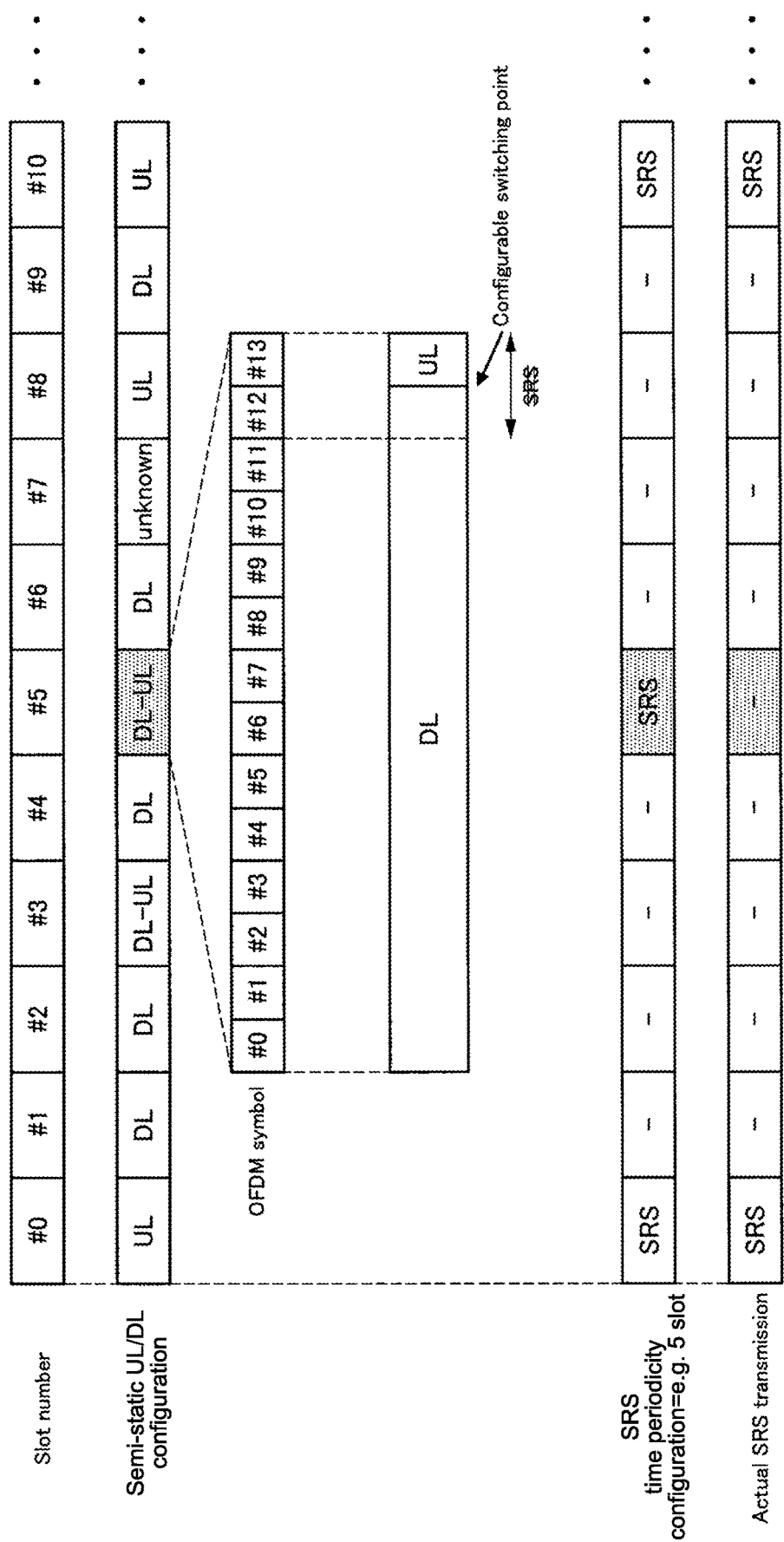
FIG. 25 is a diagram for explaining an example of the determination of SRS transmittability regarding a DL-UL slot according to the present embodiment.

Explained below with reference to FIGS. 24 and 25 are specific examples of the determination of transmittability regarding the DL-UL slots.

FIG. 24 is a diagram for explaining an example of the determination of SRS transmittability regarding a DL-UL slot according to the present embodiment. In FIG. 24, the slot numbers of a plurality of slots included in a particular radio frame are illustrated in the first level; the semi-static link direction configurations are illustrated in the second level; the semi-static SRS configurations are illustrated in the third level; and the presence or absence of actual SRS transmission is illustrated in the fourth level. Herein, the levels have the same meaning as the meaning with reference to FIG. 18. In between the second and third levels, the link direction configuration of each OFDM symbol in the fifth slot (#5), which is a DL-UL slot, is illustrated. In the DL-UL slot (#5), the first nine OFDM symbols (#0 to #8) have the link direction in the DL direction, and the last five OFDM symbols (#9 to #13) have the link direction in the UL direction. If it is assumed that four UL symbols are required in the SRS transmission, on account of having five successive UL slots at the end of the DL-UL slot (#5), the terminal device 200 recognizes the DL-UL slot (#5) as the slot enabling the SRS transmission. According to the semi-static SRS configuration illustrated in the third level, the UL-DL slot (#5) is set as the first resource. Hence, as illustrated in the fourth level, the terminal device 200 transmits the SRS in the DL-UL slot (#5).

FIG. 25 is a diagram for explaining an example of the determination of SRS transmittability regarding a DL-UL slot according to the present embodiment. In FIG. 25, the levels, the labeling of the slots, and the labeling of the OFDM symbols have the same meaning as the meaning with reference to FIG. 24. In the fifth slot (#5) representing a DL-UL slot, the first 13 OFDM symbols (#0 to #12) have the link direction in the DL direction, and the last OFDM symbol (#13) has the link direction in the UL direction. If it is assumed that two UL symbols are required for the SRS transmission, since the number of successive UL slots at the end of the DL-UL slot (#5) is only one, the terminal device 200 recognizes the DL-UL slot (#5) as the slot that does not enable the SRS transmission. According to the semi-static SRS configuration illustrated in the third level, the DL-UL slot (#5) is set as the first resource. However, since the DL-UL slot (#5) is recognized as the slot that does not enable the SRS transmission, the terminal device 200 skips the SRS transmission in the DL-UL slot (#5) as illustrated in the fourth level.

3.4. Dealing with Dynamic Link Direction Configuration

In the NR, the semi-static link direction configuration may get overwritten by the dynamic link direction configuration. In that regard, when the SRS transmittability in the first resource is switched using a DL control signal, the terminal device 200 controls the SRS transmission according to that switch. More specifically, using a DL control signal such as the SFI, when a slot set as the first resource is switched to be a slot enabling the SRS transmission or to be a slot not enabling the SRS transmission, the terminal device 200 controls the SRS transmission according to that switch. As a result, in regard to the third problem explained earlier, the terminal device 200 can deal with the case in which the semi-static link direction configuration is overwritten with the dynamic link direction configuration.

(1) First-Type Switching

When the switching performed using the DL control signal results in enabling the SRS transmission in the first resource, the terminal device 200 transmits the SRS in the first resource. More specifically, when the slot that is set as the first resource is switched from the slot not enabling the SRS transmission to the slot enabling the SRS transmission, the terminal device 200 transmits the SRS in that slot. Herein, the switching source is a DL slot, an unknown slot, or a DL-UL slot that is recognized as the resource not enabling the SRS transmission. The switching destination is a UL slot or a DL-UL slot that is recognized as the resource enabling the SRS transmission. It is possible to have an arbitrary combination of the switching source and the switching destination. In any switching combination, the terminal device 200 becomes able to transmit, in the first resource, the SRS that was not originally transmittable. That enables maintaining the periodicity of the SRS. Explained below with reference to FIG. 26 is a specific example of the case in which a slot that is set as the first resource is switched from being an unknown slot to be a UL slot.

Figure 26:
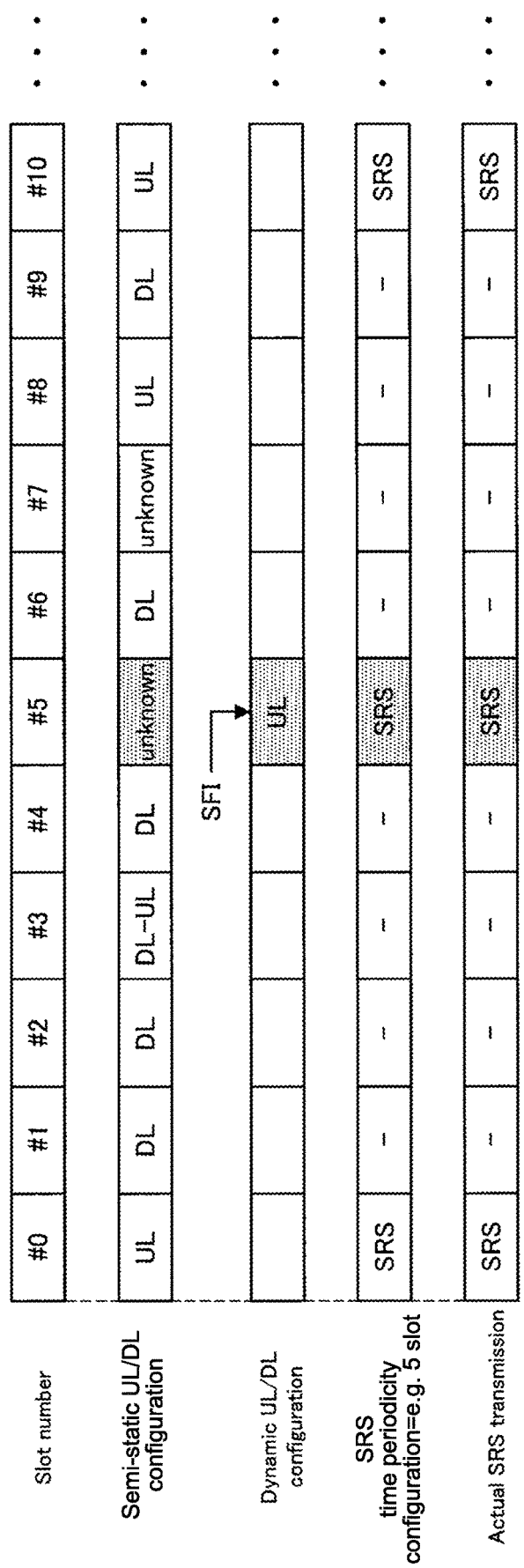
FIG. 26 is a diagram for explaining an example of the SRS transmission control that is based on the dynamic link direction configuration according to the present embodiment.

FIG. 26 is a diagram for explaining an example of the SRS transmission control that is based on the dynamic link direction configuration according to the present embodiment. In FIG. 26, the level and the labeling of the slots have the same meaning as the meaning with reference to FIG. 21. As illustrated in the fourth level in FIG. 26, the first resource is placed at the periodicity of five slots. More specifically, the first resource is placed in the zeroth slot (#0), the fifth slot (#5), and the 10-th slot (#10). With reference to the second level, from among the slots in which the first resource is placed, the fifth slot (#5) is an unknown slot that does not enable the SRS transmission. However, as illustrated in the third level, the fifth slot (#5) is dynamically switched, using the SFI, from being an unknown slot to be a UL slot that enables the SRS transmission. Meanwhile, the SFI is included in, for example, the PDCCH of the fourth slot (#4). Hence, as illustrated in the fifth level, the terminal device 200 transmits the SRS in the fifth slot (#5).

(2) Second-Type Switching

When the switching performed using the DL control signal results in making the SRS non-transmittable in the first resource, the terminal device 200 skips the SRS transmission in that first resource. More specifically, when the slot that is set as the first resource is switched from the slot enabling the SRS transmission to the slot not enabling the SRS transmission, the terminal device 200 skips the SRS transmission in that slot. Herein, the switching source is a UL slot or a DL-UL slot that is recognized as the resource enabling the SRS transmission. The switching destination is a DL slot, an unknown slot, or a DL-UL slot that is recognized as the resource not enabling the SRS transmission. It is possible to have an arbitrary combination of the switching source and the switching destination. Explained below with reference to FIG. 27 is a specific example of the case in which the slot that is set as the first resource is switched from being a UL slot to be a DL slot.

Figure 27:
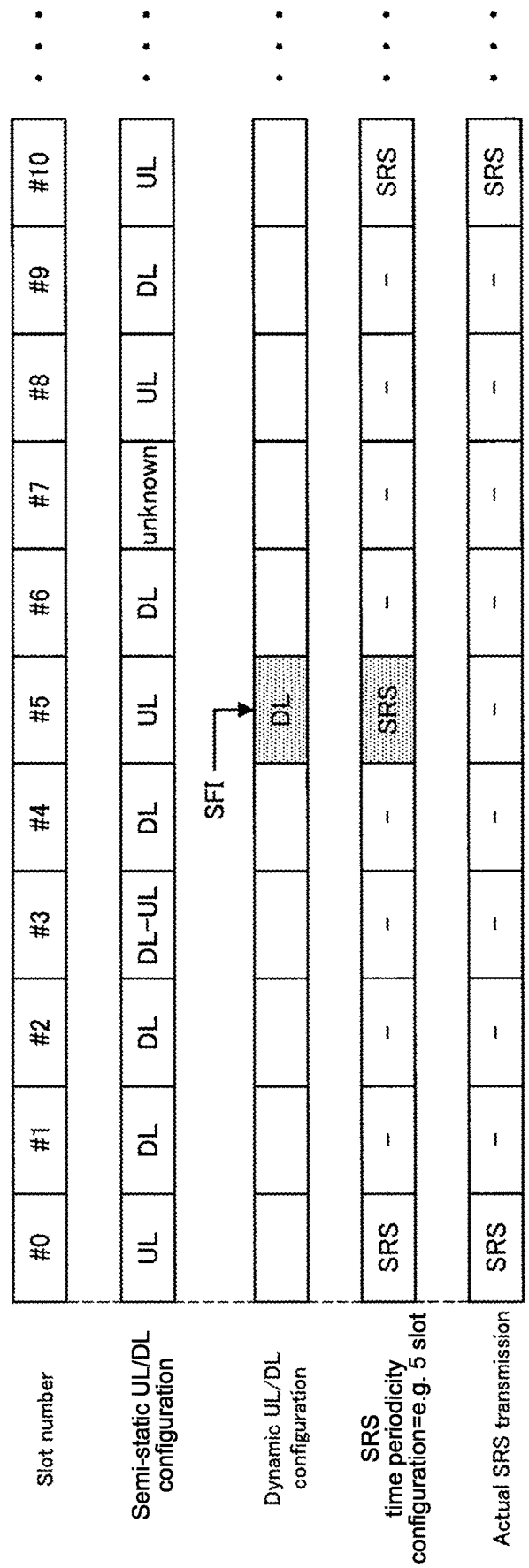
FIG. 27 is a diagram for explaining an example of the SRS transmission control that is based on the dynamic link direction configuration according to the present embodiment.

FIG. 27 is a diagram for explaining an example of the SRS transmission control that is based on the dynamic link direction configuration according to the present embodiment. In FIG. 27, the level and the labeling of the slots have the same meaning as the meaning with reference to FIG. 21. As illustrated in the fourth level in FIG. 27, the first resource is placed at the periodicity of five slots. More specifically, the first resource is placed in the zeroth slot (#0), the fifth slot (#5), and the 10-th slot (#10). With reference to the second level, from among the slots in which the first resource is placed, the fifth slot (#5) is a UL slot that enables the SRS transmission. However, as illustrated in the third level, the fifth slot (#5) is dynamically switched, using the SFI, from being a UL slot to be a DL slot that does not enable the SRS transmission. Meanwhile, the SFI is included in, for example, the PDCCH of the fourth slot (#4). Thus, as illustrated in the fifth level, the terminal device 200 skips the SRS transmission in the fifth slot (#5).

SRS Transmission Using Substitute Slot

The terminal device 200 not only can skip the SRS transmission in the first resource, but can also transmit the SRS in a substitute slot. As a result of the SRS transmission performed in a substitute slot, it becomes possible to alleviate the collapse in the periodicity of the SRS attributed to the dynamic switching of the link direction using the SFI.

The selection of the substitute slot can be performed in an identical manner to the adaptive operation performed in the method in which a look-up table is not used. For example, in an identical manner to the second example of the adaptive operation, when the SRS transmission in the first resource is skipped using the SFI, the terminal device 200 can transmit the SRS in the resource that arrives after the skipped first resource and that enables the SRS transmission. Alternatively, in an identical manner to the third example of the adaptive operation, when the number of times for which the SRS transmission in the first resource is skipped using the SFI reaches a predetermined upper limit value, the terminal device 200 can transmit the SRS in the resource that arrives after the first resource which was skipped last and that enables the SRS transmission. Still alternatively, in an identical manner to the fourth example of the adaptive operation, when the SRS transmission in the first resource is skipped, the terminal device 200 can transmit the SRS in the resource that arrives after the skipped first resource and that is switched, using a DL control signal, to enable the SRS transmission.

Regarding Second Counting Method

The following explanation is given about the case in which the setting of the positions of the first resource in the units of slots in a radio frame in the semi-static SRS configuration is performed according to the method of not using a look-up table and in which the second counting method is implemented. As explained earlier too, in the second counting method, the number of slots required for determining the arrival of the periodicity of the first resource is counted with respect to the slots such as the UL slots that enable the SRS transmission.

In the case of implementing the second counting method, the terminal device 200 reflects the SFI-based switching and counts the number of slots required for determining the arrival of the periodicity of the first resource. As a result, even when the second counting method is implemented, the SRS can be adaptively transmitted in accordance with the SFI-based switching.

More specifically, a slot in which the SRS becomes transmittable due to the SFI-based switching is treated as the slot to be counted in the second counting method. That is, the slots to be counted for determining the arrival of the periodicity of the first resource include the slots that are switched, using the SFI, to enable the SRS transmission. Hence, in order to determine the arrival of the periodicity of the first resource, the terminal device 200 counts the slots that enable the SRS transmission in the semi-static link configuration as well as counts the slots in which the SRS becomes transmittable due to the SFI-based switching.

On the other hand, a slot in which the SRS becomes non-transmittable due to the SFI-based switching is treated as the slot not to be counted in the second counting method. That is, the slots to be counted for determining the arrival of the periodicity of the first resource do not include the slots that are switched, using the SFI, to not enable the SRS transmission. Hence, from the slots enabling the SRS transmission in the semi-static link configuration, the terminal device 200 excludes the slots in which the SRS becomes non-transmittable due to the SFI-based switching, and then counts the number of slots for determining the arrival of the periodicity of the first resource.

(3) Dynamic SRS Configuration

The dynamic SRS configuration can be set according to the dynamic link direction configuration. The base station 100 transmits the downlink control signals including the dynamic SRS configuration to the terminal device 200, and then the terminal device 200 performs operations according to that dynamic SRS configuration.

The dynamic SRS configuration includes the information indicating the manner of dealing with the dynamic link direction configuration. For example, in regard to the second-type switching, the dynamic SRS configuration can include the information indicating whether or not the SRS transmission should be performed using a substitute slot and the information about setting the method for selecting the substitute slot. Moreover, in regard to the second-type switching, the dynamic SRS configuration can include the information indicating whether or not to reflect the SFI-based switching in the second counting method.

Moreover, the dynamic SRS configuration can also include the setting information meant for setting a second resource (i.e., a substitute slot) to be used in place of the first resource for the SRS transmission. In that case, the terminal device 200 transmits the SRS in the second resource that is set. Herein, it is possible to think of various methods for setting the second resource. For example, the second resource can be set using the slot number in a radio frame, or can be set using the offset of the first resource. Moreover, as compared to the fourth example of the adaptive operation, the setting of the second resource according to the dynamic SRS configuration has a higher degree of freedom in terms of making it possible to set the slots to be used as the second resource.

The dynamic SRS configuration can be associated with the dynamic link direction configuration. For example, the SFI can include the dynamic link direction configuration and the dynamic SRS configuration. In that case, since simply the signaling count is reduced, it results in the reduction in the communication load of the base station 100 and the terminal device 200. For example, the SFI can include the information for instructing the switching of the link direction to disable the SRS transmission in the first resource, and can include the information meant for setting the second resource. In that case, the terminal device 200 can skip the SRS transmission in the first resource based on the SFI, and can transmit the SRS in the second resource.

Figure 28:
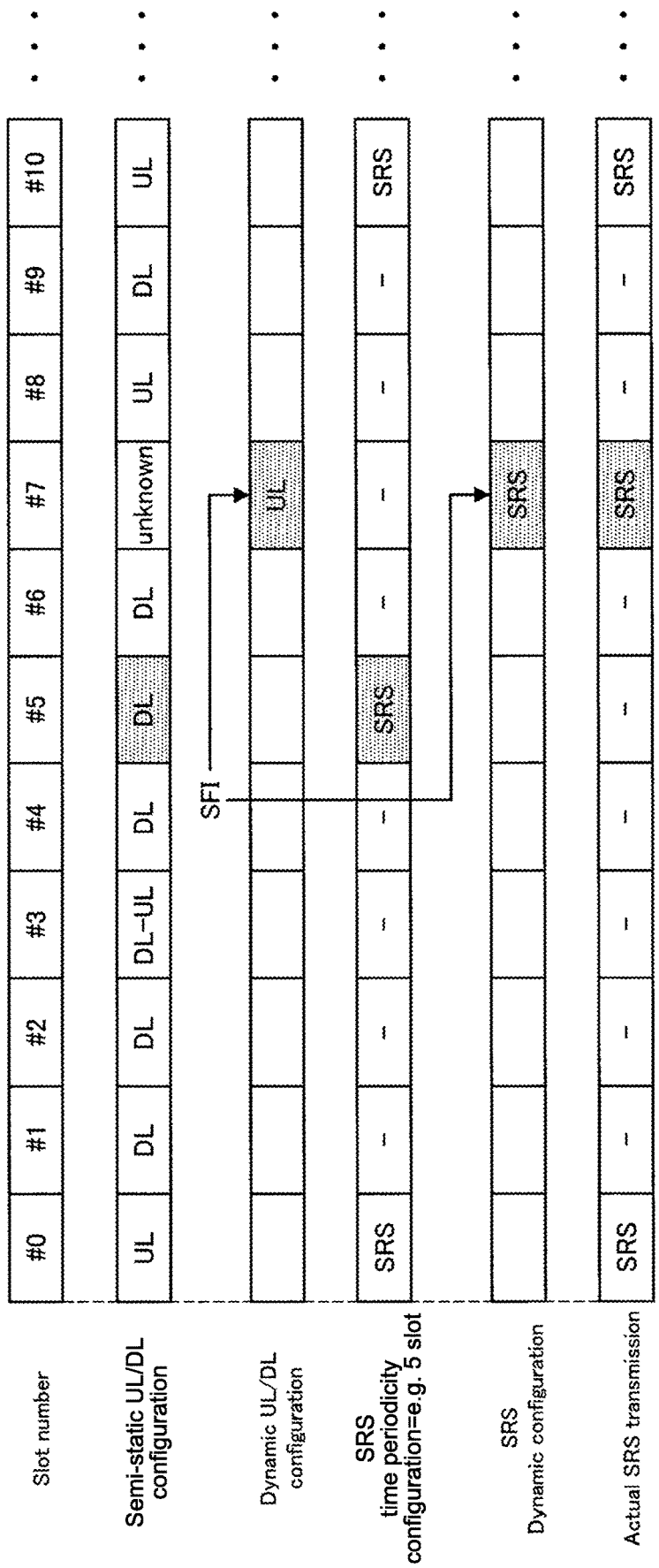
FIG. 28 is a diagram for explaining an example of the SRS transmission control that is based on the dynamic link direction configuration according to the present embodiment.

Explained below with reference to FIG. 28 is a specific example of the case in which the SRS is transmitted in the second resource based on the dynamic SRS configuration.

FIG. 28 is a diagram for explaining an example of the SRS transmission control that is based on the dynamic link direction configuration according to the present embodiment. In FIG. 28, the levels and the labeling of the slots have the same meaning as the meaning with reference to FIG. 26. However, the fifth level illustrated in FIG. 28 is a new level not illustrated in FIG. 26, and represents the dynamic SRS configuration. The slot that is labeled as "SRS" in the fifth level is the slot set as the second resource according to the dynamic SRS configuration. As illustrated in the fourth level in FIG. 28, the first resource is placed at the periodicity of five slots. More specifically, the first resource is placed in the zeroth slot (#0), the fifth slot (#5), and the 10-th slot (#10). With reference to the second level, from among the slots in which the first resource is placed, the fifth slot (#5) is an unknown slot not enabling the SRS transmission. On the other hand, as illustrated in the third level, the seventh slot (#7) is dynamically switched from being an unknown slot to be a UL slot, which enables the SRS transmission, using the SFI. Meanwhile, the SFI is included in, for example, the PDCCH of the fourth slot (#4). Moreover, with reference to the fifth level, the seventh slot (#7) is dynamically set as the second resource using the SFI. Hence, as illustrated in the sixth level, the terminal device 200 skips the SRS transmission in the fifth slot (#5), and transmits the SRS in the seventh slot (#7) that is dynamically set as the second resource.

3.5. Flow of Operations

The flow of SRS-related operations performed in the system 1 according to the present embodiment is as explained earlier with reference to FIG. 1. In the following explanation, from among the SRS-related operations, the operations that are particularly related to the semi-static SRS configuration and the dynamic SRS configuration are explained below with reference to FIG. 29.

Figure 29:
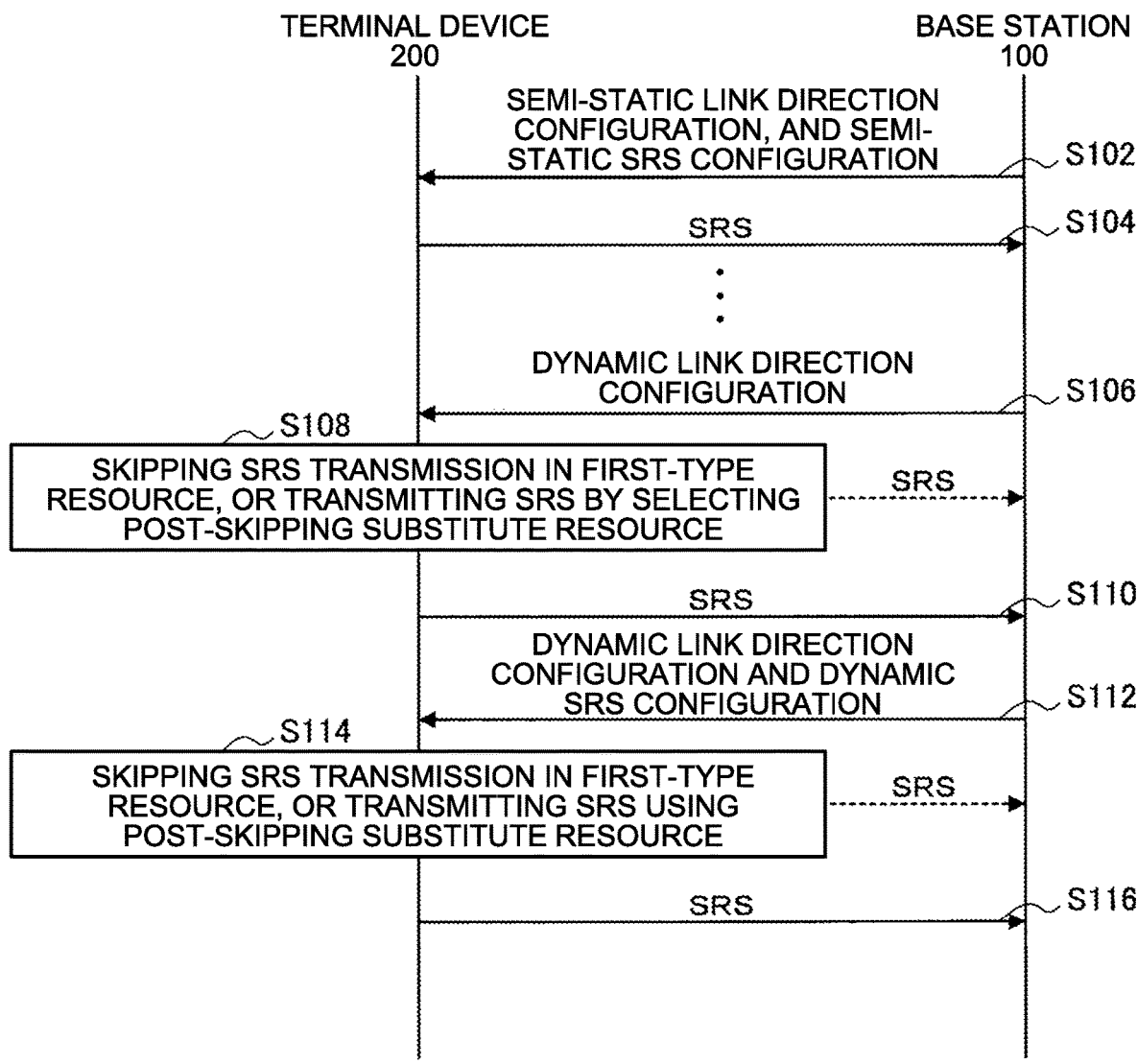
FIG. 29 is a sequence diagram illustrating an exemplary flow of a control operation performed for periodic SRS transmission in the system according to the present embodiment.

FIG. 29 is a sequence diagram illustrating an exemplary flow of the control operation performed for periodic SRS transmission in the system 1 according to the present embodiment. As illustrated in FIG. 29, the present sequence involves the base station 100 and the terminal device 200.

As illustrated in FIG. 29, firstly, the base station 100 sends the semi-static link direction configuration and the semi-static SRS configuration to the terminal device 200 (Step S102). The semi-static SRS configuration includes at least the information indicating the first resource that is periodically placed in each of a plurality of bandwidth parts included in the component carrier. Then, based on the semi-static link direction configuration and the semi-static SRS configuration, the terminal device 200 periodically transmits the SRS using the first resource that is set (Step S104).

Subsequently, the base station 100 sends the dynamic link direction configuration to the terminal device 200 (Step S106). According to the dynamic link direction configuration, if the SRS becomes non-transmissible in the first resource, the terminal device 200 skips the SRS transmission in the first resource or transmits the SRS by selecting a post-skipping substitute resource (Step S108). After the radio frame that is targeted in the dynamic link direction configuration, the terminal device 200 periodically transmits the SRS using the first resource in an identical manner to Step S104 (Step S110).

Then, the base station 100 sends the dynamic link direction configuration and the dynamic SRS configuration to the terminal device 200 (Step S112). According to the dynamic link direction configuration, if the SRS becomes non-transmittable in the first resource, the terminal device 200 skips the SRS transmission in the first resource or transmits the SRS using the post-skipping second resource set according to the dynamic SRS configuration (Step S114). After the radio frame that is targeted in the dynamic link direction configuration and the dynamic SRS configuration, the terminal device 200 periodically transmits the SRS using the set first resource in an identical manner to Step S104 (Step S116).

4. Application Examples

The technology disclosed in the application concerned can be applied in various products. For example, each base station 100 can be implemented as an eNB (evolved Node B) of either the macro eNB type or the small eNB type. A small eNB, such as a pico eNB, or a micro eNB, or a home (femto) eNB, can be an eNB covering smaller cells than macro cells. Alternatively, each base station 100 can be implemented as a base station of some other type such as NodeB or BTS (Base Transceiver Station). The base station 100 can include the main body (base station device) that controls the radio communication, and include one or more RRHs (Remote Radio Heads) placed at different locations than the main body. Still alternatively, various types of terminals (described later) can be configured to execute, temporarily or permanently, the base station function, and operate as the base stations 100.

Meanwhile, for example, each terminal device 200 can be implemented as a smartphone, a tablet PC (Personal Computer), a portable game terminal, a mobile device such as a portable-type/dongle-type mobile router or a digital camera, or an in-vehicle terminal such as a car navigation device. Alternatively, the terminal devices 200 can be implemented as terminals performing M2M (Machine To Machine) communication (also called MTC (Machine Type Communication) terminals). Still alternatively, the terminal devices 200 can be radio communication modules (for example, integrated circuit modules configured using a single die) installed on terminals.

4.1. Application Example Related to Base Station

First Application Example

Figure 30:
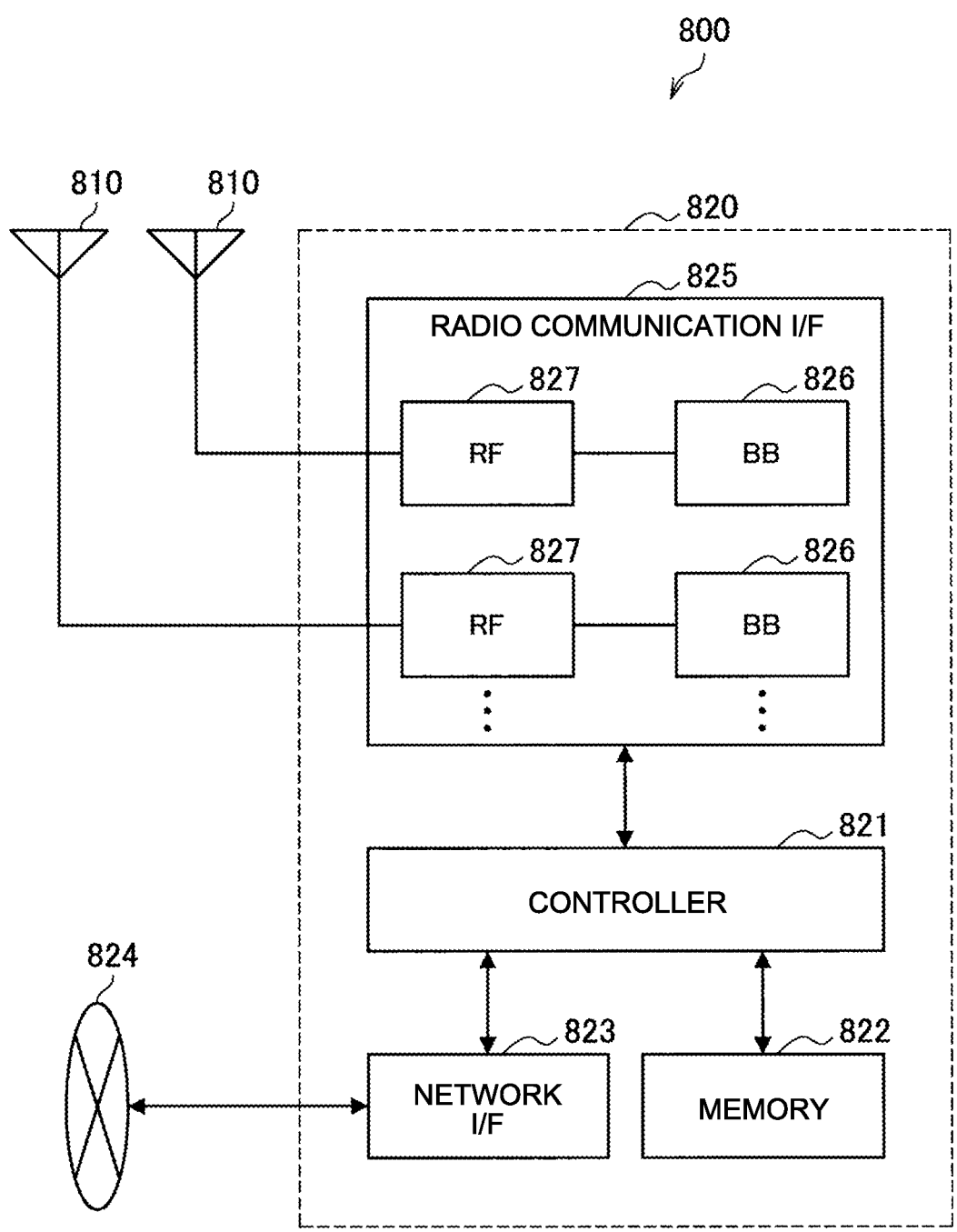
FIG. 30 is a block diagram illustrating a first example of a schematic configuration of an eNB.

FIG. 30 is a block diagram illustrating a first example of a schematic configuration of the eNB in which the technology disclosed in the application concerned is applicable. An eNB 800 includes one or more antennas 810 and a base station device 820. The antennas 810 can be connected to the base station device 820 by RF cables.

Each antenna 810 includes one or more antenna elements (for example, a plurality of antenna elements constituting a MIMO antenna), and is used by the base station device 820 in transmitting and receiving radio signals. The eNB 800 includes a plurality of antennas 810 as illustrated in FIG. 30, and each antenna 810 corresponds to, for example, one of a plurality of frequency bands used by the eNB 800. Meanwhile, in the example illustrated in FIG. 30, although the eNB 800 includes a plurality of antennas 810, it can alternatively include only a single antenna 810.

The base station device 820 includes a controller 821, a memory 822, a network interface 823, and a radio communication interface 825.

The controller 821 can be, for example, a CPU or a DSP, and implements various functions of the upper layer of the base station device 820. For example, the controller 821 generates data packets from the data present in the signals processed by the radio communication interface 825, and transfers the generated data packets via the network interface 823. Moreover, the controller 821 can generate bundled packets by bundling the data received from a plurality of baseband processors, and transfer the bundled packets. Furthermore, the controller 821 can have logical functions for performing control such as radio resource control, radio bearer control, mobility management, admission control, and scheduling. That control can be performed in coordination with the surrounding eNBs or core network nodes. The memory 822 includes a RAM and a ROM, and is used to store programs executed by the controller 821 and to store a variety of control data (such as a terminal list, transmission power data, and scheduling data).

The network interface 823 is a communication interface for connecting the base station device 820 to a core network 824. The controller 821 can communicate with core network nodes and the other eNBs via the network interface 823. In that case, the eNB 800 can be connected to the core network nodes and the other eNBs by a logical interface (such as an S1 interface or an X2 interface). The network interface 823 can be a wired communication interface, or can be a radio communication interface for radio backhauling. When the network interface 823 is a radio communication interface, it can perform radio communication using higher frequency bands than the frequency bands used by the radio communication interface 825.

The radio communication interface 825 supports any one cellular communication method such as the LTE (Long Term Evolution) or the LTE-Advanced, and provides radio connection via the antennas 810 to the terminals located inside the cell of the eNB 800. Typically, the radio communication interface 825 can include a baseband (BB) processor 826 and an RF circuit 827. The BB processor 826 can perform, for example, encoding/decoding, modulation/demodulation, and multiplexing/inverse multiplexing; and performs a variety of signal processing for each layer (for example, L1, MAC (Medium Access Control), RLC (Radio Link Control), and PDCP (Packet Data Convergence Protocol)). The BB processor 826 can include, in place of the controller 821, some or all of the logical functions mentioned earlier. The BB processor 826 can be a module including a memory for storing a communication control program, a processor for executing that program, and related circuits; and the functions of the BB processor 826 can be changed by updating the communication control program. Alternatively, the module can be a card or a blade that is inserted in a slot of the base station device 820, or can be a chip installed on the card or the blade. The RF circuit 827 can include a mixer, a filter, and an amplifier; and transmits and receives radio signals via the antennas 810.

The radio communication interface 825 includes a plurality of BB processors 826 as illustrated in FIG. 30, and each BB processor 826 can correspond to, for example, one of a plurality of frequency bands used by the eNB 800. Moreover, the radio communication interface 825 includes a plurality of RF circuits 827 as illustrated in FIG. 30, and each RF circuit 827 can correspond to, for example, one of a plurality of antenna elements. In FIG. 30 is illustrated the example in which the radio communication interface 825 includes a plurality of BB processors 826 and a plurality of RF circuits 827. However, alternatively, the radio communication interface 825 can include a single BB processor 826 or a single RF circuit 827.

In the eNB 800 illustrated in FIG. 30, one or more constituent elements of the control unit 150 explained with reference to FIG. 15 (i.e., the setting unit 151 and/or the communication processing unit 153) can be implemented in the radio communication interface 825. Alternatively, at least some of the constituent elements can be installed in the controller 821. As an example, in the eNB 800, a module including either some part of the radio communication interface 825 (for example, the BB processor 826) or the entire radio communication interface 825 and/or the controller 821 can be installed, and the abovementioned one or more constituent elements can be implemented in that module. In that case, the module can store therein a program meant for making the processor function as the abovementioned one or more constituent elements (in other words, a program meant for executing the operations of the abovementioned one or more constituent elements in the processor), and can execute that program. As another example, the program meant for making the processor function as the abovementioned one or more constituent elements can be installed in the eNB 800, and the radio communication interface 825 (for example, the BB processor 826) and/or the controller 821 can execute that program. As described above, the eNB 800, or the base station device 820, or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the eNB 800 illustrated in FIG. 30, the radio communication unit 120 that is explained with reference to FIG. 15 can be implemented in the radio communication interface 825 (for example, the RF circuit 827). Furthermore, the antenna unit 110 can be implemented in the antenna 810. Moreover, the network communication unit 130 can be implemented in the controller 821 and/or the network interface 823. Furthermore, the memory unit 140 can be implemented in the memory 822.

Second Application Example

Figure 31:
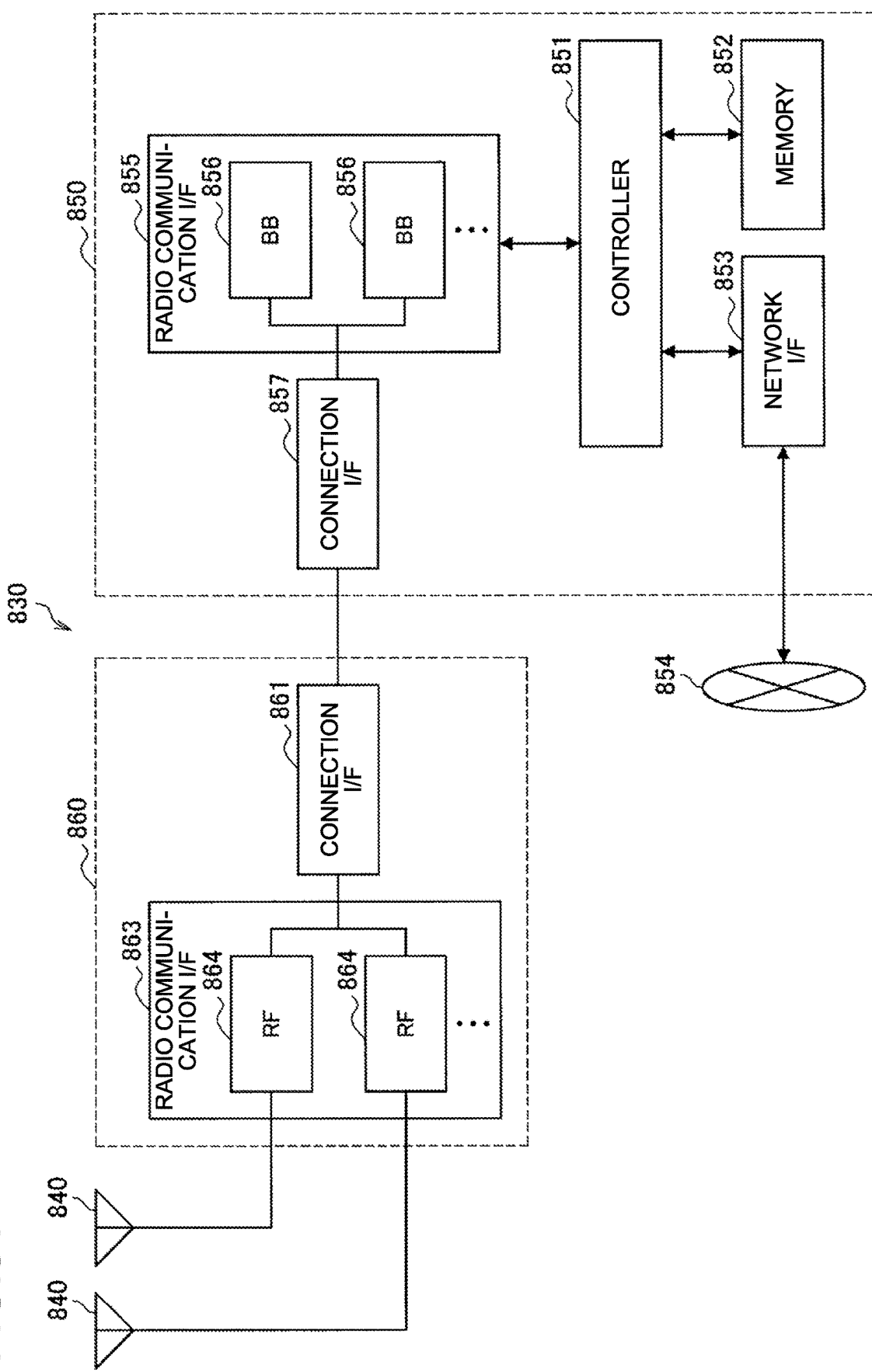
FIG. 31 is a block diagram illustrating a second example of a schematic configuration of the eNB.

FIG. 31 is a block diagram illustrating a second example of a schematic configuration of the eNB in which the technology disclosed in the application concerned is applicable. An eNB 830 includes one or more antennas 840, a base station device 850, and an RRH 860. Each antenna 840 is connected to the RRH 860 by an RF cable. Moreover, the base station device 850 and the RRH 860 can be connected to each other by a high-speed line such as an optical fiber cable.

Each antenna 840 includes one or more antenna elements (for example, a plurality of antenna elements constituting a MIMO antenna), and is used by the RRH 860 in transmitting and receiving radio signals. The eNB 830 includes a plurality of antennas 840 as illustrated in FIG. 31, and each antenna 840 corresponds to, for example, one of a plurality of frequency bands used by the eNB 830. Meanwhile, in the example illustrated in FIG. 31, although the eNB 830 includes a plurality of antennas 840, it can alternatively include only a single antenna 840.

The base station device 850 includes a controller 851, a memory 852, a network interface 853, a radio communication interface 855, and a connection interface 857. The controller 851, the memory 852, and the network interface 853 are identical to the controller 821, the memory 822, and the network interface 823, respectively, explained with reference to FIG. 30.

The radio communication interface 855 supports any one cellular communication method such as the LTE or the LTE-Advanced, and provides radio connection via the RRH 860 and the antennas 840 to the terminals located inside the sector corresponding to the RRH 860. Typically, the radio communication interface 855 can include a BB processor 856. The BB processor 856 is identical to the BB processor 826 explained with reference to FIG. 30, except for the fact that the BB processor 856 is connected to an RF circuit 864 of the RRH 860 via the connection interface 857. The radio communication interface 855 includes a plurality of BB processors 856 as illustrated in FIG. 31, and each BB processor 856 can correspond to, for example, one of a plurality of frequency bands used by the eNB 830. Meanwhile, in the example illustrated in FIG. 31, although the radio communication interface 855 includes a plurality of BB processors 856, it can alternatively include only a single BB processor 856.

The connection interface 857 is meant for connecting the base station device 850 (the radio communication interface 855) to the RRH 860. The connection interface 857 can be a communication module for enabling communication in the abovementioned high-speed line connecting the base station device 850 (the radio communication interface 855) and the RRH 860.

The RRH 860 includes a connection interface 861 and a radio communication interface 863.

The connection interface 861 is an interface for connecting the RRH 860 (the radio communication interface 863) to the base station device 850. The connection interface 861 can be a communication module enabling communication in the high-speed line.

The radio communication interface 863 transmits and receives radio signals via the antenna 840. Typically, the radio communication interface 863 can include the RF circuit 864. The RF circuit 864 can include a mixer, a filter, and an amplifier; and transmits and receives radio signals via the antennas 840. The radio communication interface 863 includes a plurality of RF circuits 864 as illustrated in FIG. 31, and each RF circuit 864 can correspond to, for example, one of a plurality of antenna elements. Meanwhile, in the example illustrated in FIG. 31, although the radio communication interface 863 includes a plurality of RF circuits 864, it can alternatively include only a single RF circuit 864.

In the eNB 830 illustrated in FIG. 31, one or more constituent elements included in the control unit 150 explained with reference to FIG. 15 (i.e., the setting unit 151 and/or the communication processing unit 153) can be implemented in the radio communication interface 855 and/or the radio communication interface 863. Alternatively, at least some of the constituent elements can be installed in the controller 851. As an example, in the eNB 830, a module including either some part of the radio communication interface 855 (for example, the BB processor 856) or the entire radio communication interface 855 and/or the controller 851 can be installed, and the abovementioned one or more constituent elements can be implemented in that module. In that case, the module can store therein a program meant for making the processor function as the abovementioned one or more constituent elements (in other words, a program meant for executing the operations of the abovementioned one or more constituent elements in the processor), and can execute that program. As another example, the program meant for making the processor function as the abovementioned one or more constituent elements can be installed in the eNB 830, and the radio communication interface 855 (for example, the BB processor 856) and/or the controller 851 can execute that program. As described above, the eNB 830, the base station device 850, or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the eNB 830 illustrated in FIG. 31, the radio communication unit 120 that is explained with reference to FIG. 15 can be implemented in the radio communication interface 863 (for example, the RF circuit 864). Furthermore, the antenna unit 110 can be implemented in the antenna 840. Moreover, the network communication unit 130 can be implemented in the controller 851 and/or the network interface 853. Furthermore, the memory unit 140 can be implemented in the memory 852.

4.2. Application Example Related to Terminal Device

First Application Example

Figure 32:
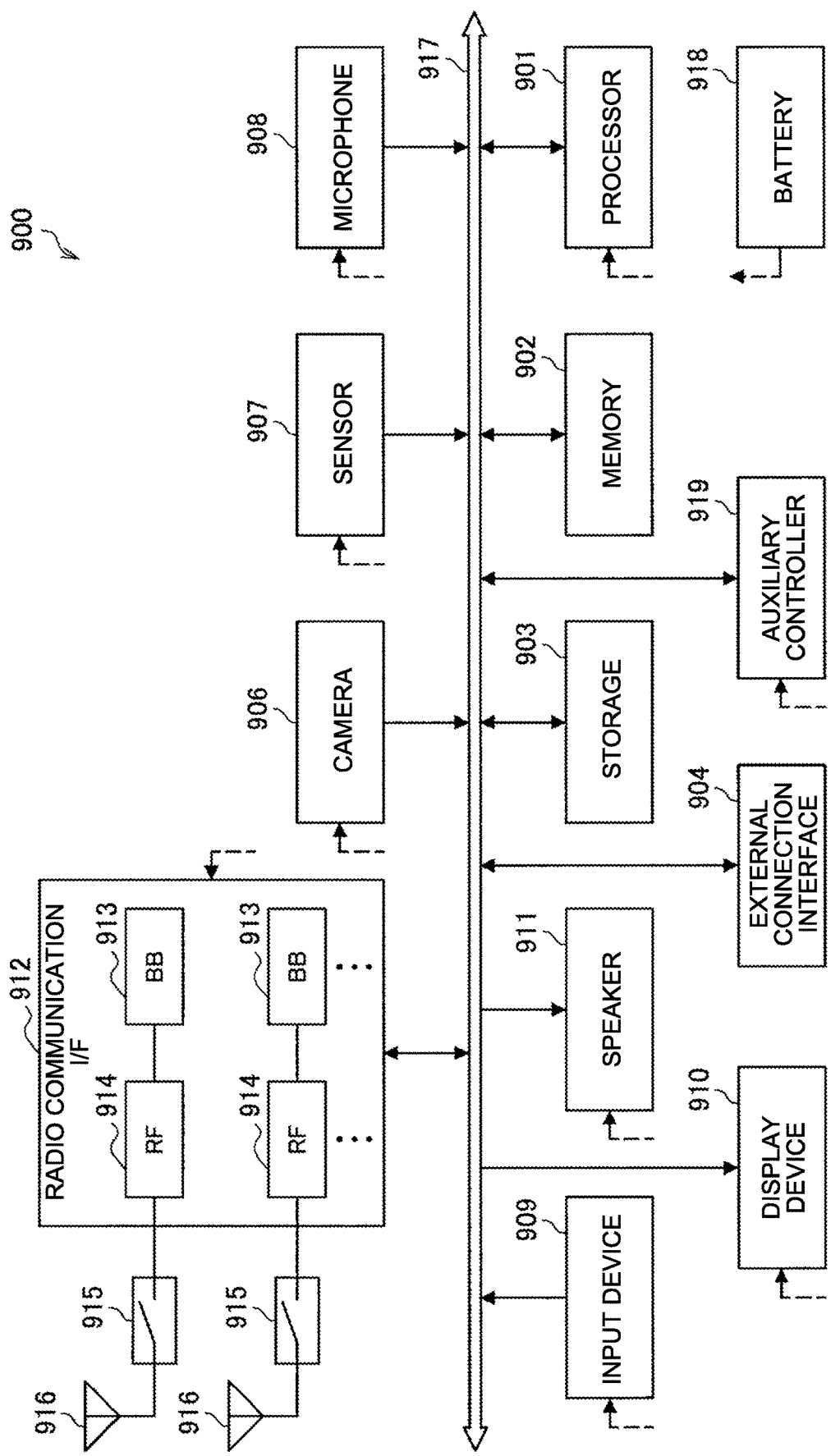
FIG. 32 is a block diagram illustrating an example of a schematic configuration of a smartphone.

FIG. 32 is a block diagram illustrating an example of a schematic configuration of a smartphone 900 in which the technology disclosed in the application concerned is applicable. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 can be, for example, a CPU or an SoC (System on Chip), and controls the functions of the application layer and the other layers of the smartphone 900. The memory 902 includes a RAM and a ROM, and is used to store the programs executed by the processor 901 and to store data. The storage 903 can include a memory medium such as a semiconductor memory or a hard disk. The external connection interface 904 is an interface for connecting an external device, such as a memory card or a USB (Universal Serial Bus) device, to the smartphone 900.

The camera 906 includes an imaging device such as a CCD (Charge Coupled Device) or a CMOS (Complementary Metal Oxide Semiconductor), and generates captured images. The sensor 907 can include a group of sensors such as a positioning sensor, a gyro sensor, a geomagnetic sensor, and an acceleration sensor. The microphone 908 converts the sounds input to the smartphone 900 into sound signals. The input device 909 includes, for example, a touch sensor for detecting a touch on the screen of the display device 910, a keypad, a keyboard, and buttons or switches; and receives operations and information input from the user. The display device 910 has a screen such as a liquid crystal display (LCD) or an organic light emitting diode (OLED), and displays output images of the smartphone 900. The speaker 911 converts the sound signals, which are output from the smartphone 900, into sound.

The radio communication interface 912 supports any one cellular communication method such as the LTE or the LTE-Advanced, and implements radio communication. Typically, the radio communication interface 912 can include a BB processor 913 and an RF circuit 914. The BB processor 913 can perform, for example, encoding/decoding, modulation/demodulation, and multiplexing/inverse multiplexing; and performs a variety of signal processing for radio communication. The RF circuit 914 can include a mixer, a filter, and an amplifier; and transmits and receives radio signals via the antennas 916. Meanwhile, the radio communication interface 912 can be a one-chip module in which the BB processor 913 and the RF circuit 914 are integrated. Moreover, the radio communication interface 912 can include a plurality of BB processors 913 and a plurality of RF circuits 914 as illustrated in FIG. 32. Meanwhile, in the example illustrated in FIG. 32, although the radio communication interface 912 includes a plurality of BB processor 913 and a plurality of RF circuits 914, it can alternatively include only a single BB processor 913 or only a single RF circuit 914.

Moreover, in addition to supporting the cellular communication method, the radio communication interface 912 can also support other types of radio communication methods such as the near field communication method, the proximity radio communication method, and the wireless LAN (Local Area Network) method. In that case, the radio communication interface 912 can include the BB processors 913 and the RF circuits 914 separately for each radio communication method.

Each antenna switch 915 switches the connection destinations of the antennas 916 among a plurality of circuits included in the radio communication interface 912 (for example, the circuits meant for different radio communication methods).

Each antenna 916 includes one or more antenna elements (for example, a plurality of antenna elements constituting a MIMO antenna), and is used by the radio communication interface 912 in transmitting and receiving radio signals. The smartphone 900 can include a plurality of antennas 916 as illustrated in FIG. 32. Meanwhile, in the example illustrated in FIG. 32, although the smartphone 900 includes a plurality of antennas 916, it can alternatively include only a single antenna 916.

Moreover, the smartphone 900 can include the antennas 916 separately for each radio communication method. In that case, the antenna switch 915 can be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies electrical power to each block of the smartphone 900, which is illustrated in FIG. 32, via a power supply line that is partially illustrated in FIG. 32 using dashed lines. The auxiliary controller 919 implements the minimum required functions of the smartphone 900 in, for example, the sleep mode.

In the smartphone 900 illustrated in FIG. 32, one or more constituent elements included in the control unit 240 explained with reference to FIG. 16 (i.e., the setting unit 241 and/or the communication processing unit 243) can be implemented in the radio communication interface 912. Alternatively, at least some of the constituent elements can be installed in the processor 901 or the auxiliary controller 919. As an example, in the smartphone 900, a module including either some part of the radio communication interface 912 (for example, the BB processor 913) or the entire radio communication interface 912, the processor 901, and/or the auxiliary controller 919 can be installed; and the abovementioned one or more constituent elements can be implemented in that module. In that case, the module can store therein a program meant for making the processor function as the abovementioned one or more constituent elements (in other words, a program meant for executing the operations of the abovementioned one or more constituent elements in the processor), and can execute that program. As another example, the program meant for making the processor function as the abovementioned one or more constituent elements can be installed in the smartphone 900; and the radio communication interface 912 (for example, the BB processor 913), the processor 901, and/or the auxiliary controller 919 can execute that program. As described above, the smartphone 900 or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the smartphone 900 illustrated in FIG. 32, the radio communication unit 220 that is explained with reference to FIG. 16 can be implemented in the radio communication interface 912 (for example, the RF circuit 914). Furthermore, the antenna unit 210 can be implemented in the antenna 916. Moreover, the memory unit 230 can be implemented in the memory 902.

Second Application Example

Figure 33:
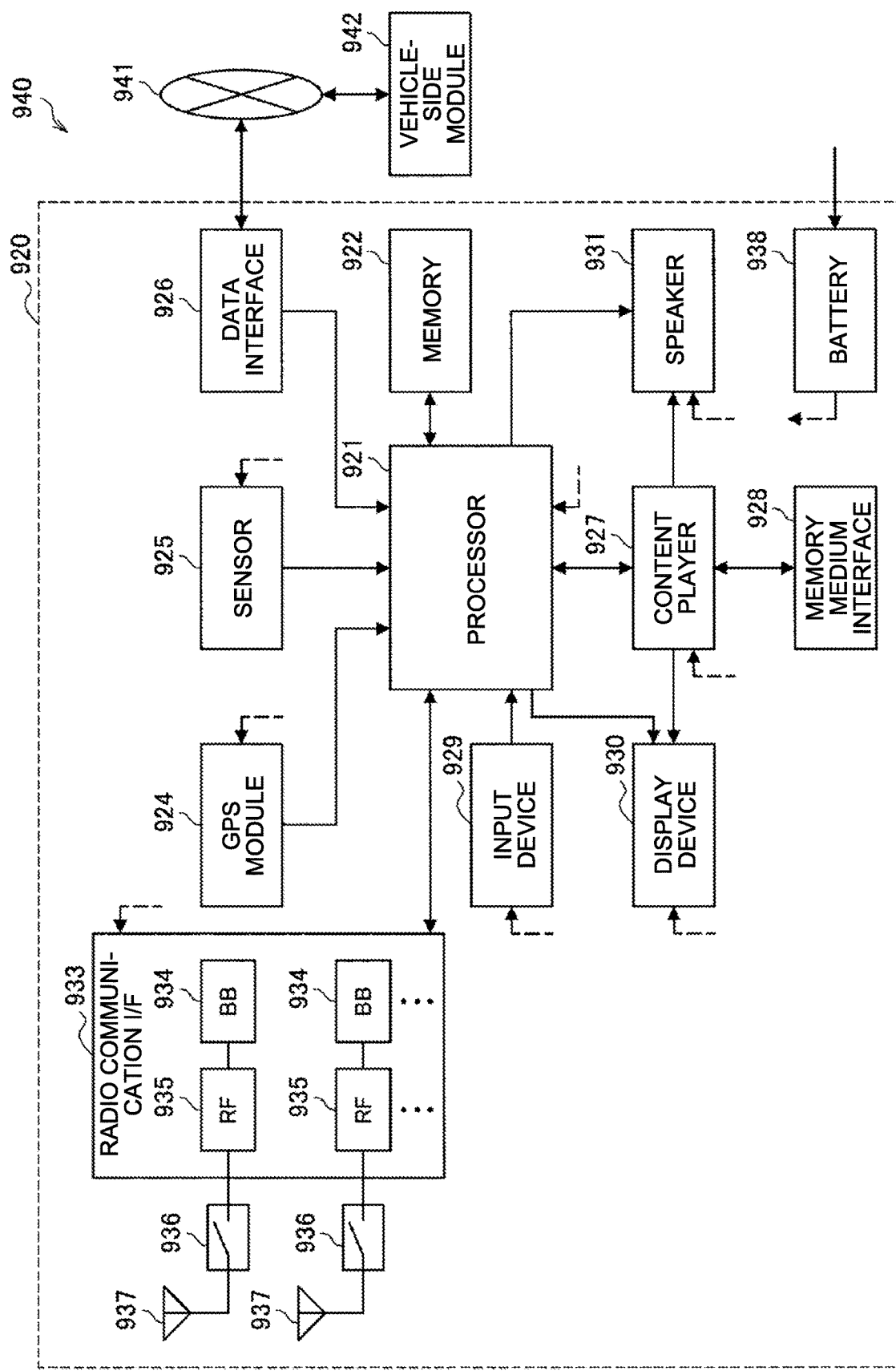
FIG. 33 is a block diagram illustrating an example of a schematic configuration of a car navigation device.

FIG. 33 is a block diagram illustrating an example of a schematic configuration of a car navigation device 920 in which the technology disclosed in the application concerned is applicable. The car navigation device 920 includes a processor 921, a memory 922, a GPS (Global Positioning System) module 924, a sensor 925, a data interface 926, a content player 927, a memory medium interface 928, an input device 929, a display device 930, a speaker 931, a radio communication interface 933, one or more antenna switches 936, one or more antennas 937, and a battery 938.

The processor 921 can be, for example, a CPU or an SoC, and controls the navigation function and the other functions of the car navigation device 920. The memory 922 includes a RAM and a ROM, and is used to store the programs executed by the processor 921 and to store data.

The GPS module 924 uses GPS signals received from GPS satellites, and measures the location (for example, the latitude, the longitude, and the altitude) of the car navigation device 920. The sensor 925 can include a group of sensors such as a gyro sensor, a geomagnetic sensor, and a pressure sensor. The data interface 926 is connected to, for example, an in-vehicle network 941 via a terminal (not illustrated), and obtains data such as vehicle speed data generated in the vehicle.

The content player 927 reproduces the contents stored in a memory medium (such as a CD or a DVD) that is inserted in the memory medium interface 928. The input device 929 includes a touch sensor for detecting a touch on the screen of the display device 930, and includes buttons or switches; and receives operations and information input from the user. The display device 930 has a screen such as an LCD or an OLED, and displays a screen of the navigation function or a screen of the reproduced contents. The speaker 911 converts the sounds of the navigation function or the sounds of the reproduced contents.

The radio communication interface 933 supports any one cellular communication method such as the LTE or the LTE-Advanced, and implements radio communication. Typically, the radio communication interface 933 can include a BB processor 934 and an RF circuit 935. The BB processor 934 can perform, for example, encoding/decoding, modulation/demodulation, and multiplexing/inverse multiplexing; and performs a variety of signal processing for radio communication. The RF circuit 935 can include a mixer, a filter, and an amplifier; and transmits and receives radio signals via the antennas 937. Meanwhile, the radio communication interface 933 can be a one-chip module in which the BB processor 934 and the RF circuit 935 are integrated. Moreover, the radio communication interface 933 can include a plurality of BB processors 934 and a plurality of RF circuits 935 as illustrated in FIG. 33. Meanwhile, in the example illustrated in FIG. 33, although the radio communication interface 933 includes a plurality of BB processor 934 and a plurality of RF circuits 935, it can alternatively include only a single BB processor 934 or only a single RF circuit 935.

Moreover, in addition to supporting the cellular communication method, the radio communication interface 933 can also support other types of radio communication methods such as the near field communication method, the proximity radio communication method, and the wireless LAN method. In that case, the radio communication interface 933 can include the BB processors 934 and the RF circuits 935 separately for each radio communication method.

Each antenna switch 936 switches the connection destinations of the antennas 937 among a plurality of circuits included in the radio communication interface 933 (for example, the circuits meant for different radio communication methods).

Each antenna 937 includes one or more antenna elements (for example, a plurality of antenna elements constituting a MIMO antenna), and is used by the radio communication interface 933 in transmitting and receiving radio signals. The car navigation device 920 can include a plurality of antennas 937 as illustrated in FIG. 33. Meanwhile, in the example illustrated in FIG. 33, although the car navigation device 920 includes a plurality of antennas 937, it can alternatively include only a single antenna 937.

Moreover, the car navigation device 920 can include the antennas 937 separately for each radio communication method. In that case, the antenna switch 936 can be omitted from the configuration of the car navigation device 920.

The battery 938 supplies electrical power to each block of the car navigation device 920, which is illustrated in FIG. 33, via a power supply line that is partially illustrated in FIG. 33 using dashed lines. Moreover, the battery 938 stores the electrical power supplied from the vehicle.

In the car navigation device 920 illustrated in FIG. 33, one or more constituent elements included in the control unit 240 explained with reference to FIG. 16 (i.e., the setting unit 241 and/or the communication processing unit 243) can be implemented in the radio communication interface 933. Alternatively, at least some of the constituent elements can be installed in the processor 921. As an example, in the car navigation device 920, a module including either some part of the radio communication interface 933 (for example, the BB processor 934) or the entire radio communication interface 933 and/or the processor 921 can be installed; and the abovementioned one or more constituent elements can be implemented in that module. In that case, the module can store therein a program meant for making the processor function as the abovementioned one or more constituent elements (in other words, a program meant for executing the operations of the abovementioned one or more constituent elements in the processor), and can execute that program. As another example, the program meant for making the processor function as the abovementioned one or more constituent elements can be installed in the car navigation device 920; and the radio communication interface 933 (for example, the BB processor 934) and/or the processor 921 can execute that program. As described above, the car navigation device 920 or the abovementioned module can be provided as a device including the abovementioned one or more constituent elements; and a program meant for making a processor function as the abovementioned one or more constituent elements can be provided. Alternatively, a readable recording medium in which the program is recorded can be provided.

Moreover, in the car navigation device 920 illustrated in FIG. 33, the radio communication unit 220 that is explained with reference to FIG. 16 can be implemented in the radio communication interface 933 (for example, the RF circuit 935). Furthermore, the antenna unit 210 can be implemented in the antenna 937. Moreover, the memory unit 230 can be implemented in the memory 922.

Meanwhile, the technology disclosed in the application concerned can be implemented as an in-vehicle system (or a vehicle) 940 that includes one or more blocks of the car navigation device 920; the in-vehicle network 941; and a vehicle-side module 942. The vehicle-side module 942 generates vehicle data such as the vehicle speed, the engine rotation count, and breakdown information; and outputs the generated data to the in-vehicle network 941.

5. Summary

Till now, an embodiment of the application concerned was described in detail with reference to FIGS. 1 to 33. As described above, the base station 100 according to the present embodiment communicates with the terminal device 200 according to the TDD method, and sends to the terminal device 200 the setting information indicating the first resource that is periodically placed in each of a plurality of bandwidth parts included in the component carrier and that should be used in the transmission of uplink control signals. The terminal device 200 according to the present embodiment communicates with the base station according to the TDD method and transmits uplink control signals based on the setting information. In the NR, for each bandwidth part, the subcarrier spacing and slot count of each radio frame can be different. In that regard, in the present embodiment, not only the first resource is periodically placed for each bandwidth part, the information indicating the placement is sent as the setting information to the terminal device 200. Thus, based on the setting information, the terminal device 200 becomes able to periodically transmit uplink control signals to the base station 100 according to the subcarrier spacing and the slot count of each radio frame. In this way, periodic transmission and reception of UL control signals in the NR is achieved in an appropriate manner.

Moreover, according to the present embodiment, as compared to the aperiodic transmission, transmission requests regarding uplink control signals are not required, thereby enabling efficient transmission of the uplink control signals. Moreover, even when it is not possible to transmit uplink control signals in the first resource, the terminal device 200 can transmit them using a substitute resource. Hence, there is a decrease in the intermittent disconnection in communication attributed to the fact that the periodic transmission of uplink control signals is hindered. For example, the base station 100 can perform beam tracking in a continuous manner. Thus, the present technology enables achieving enhancement in the system throughput. Moreover, in the use case in which low delay and high reliability is required, the present technology can contribute in guaranteeing low delay and high reliability.

Although the application concerned is described above in detail in the form of an embodiment with reference to the accompanying drawings; the technical scope of the application concerned is not limited to the embodiment described above. That is, the application concerned is to be construed as embodying all modifications such as other embodiments, additions, alternative constructions, and deletions that may occur to one skilled in the art that fairly fall within the basic teaching herein set forth. In any form thereof, as long as the functions/effects of the application concerned are achieved, the modifications are included in the scope of the application concerned.

For example, in the embodiment described above, the SRS is given as an example of the UL control signal that is periodically transmitted from the terminal device 200 to the base station 100. However, the present technology is not limited to that example. For example, the present technology can also be applied to the PUCCH (Physical Downlink Control Channel). In 5G, the PUCCH is transmitted using a particular OFDM symbol in a particular slot. That is, when the particular OFDM symbol in the particular slot does not have the link direction in the UL direction, the terminal device 200 cannot transmit the PUCCH. Hence, when the base station 100 performs setting in the terminal device 200 to periodically transmit the PUCCH, regarding the periodic PUCCH transmission, the same issues arise as the issues arising in case of the periodic SRS transmission as explained earlier.

In that regard, the base station 100 can send, to the terminal device 200, the semi-static configuration in which the first resource to be used in the PUCCH transmission is specified. In that case, the terminal device 200 periodically transmits the PUCCH based on that semi-static configuration. Of course, when it is not possible to transmit the PUCCH in the first resource, the terminal device 200 skips the PUCCH transmission or transmits the PUCCH in a post-skipping substitute slot.

Moreover, the base station 100 can send, to the terminal device 200, a dynamic configuration that includes information specifying the second resource which should be used in place of the first resource for the PUCCH transmission. In that case, the terminal device 200 transmits the PUCCH using the second resource that is set in place of the first resource using the dynamic configuration.

Meanwhile, the operations explained with reference to the flowcharts and the sequence diagrams in the present written description need not necessarily be performed in the order illustrated in drawings. That is, some of the operation steps can be performed in parallel. Moreover, additional operation steps can be included, and some of the operation steps can be omitted.

The effects described in the present written description are only explanatory and exemplary, and are not limited in scope. That is, in addition to or in place of the effects described above, the technology disclosed in the application concerned enables achieving other effects that may occur to one skilled in the art.

Note that the following configurations also belong to the technical scope of the present disclosure.

(1)

A terminal device that communicates with a base station using TDD (Time Division Duplex) method, the terminal device comprising:

a control unit that transmits uplink control signal based on setting information indicating a first resource which is periodically placed in each of a plurality of bandwidth parts included in a component carrier and which is to be used in transmission of the uplink control signal.

(2)

The terminal device according to (1), wherein the setting information contains, for each of the plurality of bandwidth parts, information indicating a radio frame in which the first resource is placed and information indicating a slot in which the first resource is placed in the radio frame.

(3)

The terminal device according to (2), wherein the first resource is placed with periodicity equal to integral multiple of number of slots in each radio frame in accordance with subcarrier spacing of the bandwidth parts, and the setting information contains information indicating the periodicity.

(4)

The terminal device according to (2) or (3), wherein the setting information contains information indicating a table that indicates which slots of a plurality of slots included in a radio frame represent the first resource.

(5)

The terminal device according to (2), wherein the first resource is placed in slots arriving at periodicity of a predetermined slot count in a radio frame, and the setting information contains information indicating the periodicity.

(6)

The terminal device according to (5), wherein, when the uplink control signal is not transmittable in the first resource, the control unit skips transmission of the uplink control signal in the first resource.

(7)

The terminal device according to (6), wherein, when transmission of the uplink control signal is skipped, the control unit transmits the uplink control signal in a resource that arrives after the skipped first resource and that enables transmission of the uplink control signal.

(8)

The terminal device according to (6), wherein, when number of times for which transmission of the uplink control signal is skipped reaches predetermined upper limit value, the control unit transmits the uplink control signal in a resource that arrives after the first resource which was skipped last and that enables transmission of the uplink control signal.

(9)

The terminal device according to (6), wherein, when transmission of the uplink control signal is skipped, the control unit transmits the uplink control signal in a resource that arrives after the skipped first resource and that has been switched, using a downlink control signal, to enable transmission of the uplink control signal.

(10)

The terminal device according to (5), wherein number of slots required for determining arrival of the periodicity of the first resource is counted with respect to slots enabling transmission of the uplink control signal.

(11)

The terminal device according to (10), wherein the setting information contains information indicating upper limit value of count of the first resource in each radio frame.

(12)

The terminal device according to (10) or (11), wherein slots to be counted for determining arrival of the periodicity of the first resource include slots that have been switched, using a downlink control signal, to enable transmission of the uplink control signal, and do not include slots that have been switched, using a downlink control signal, to not enable transmission of the uplink control signal.

(13)

The terminal device according to any one of (1) to (12), wherein, as a slot enabling transmission of the uplink control signal, the control unit recognizes a slot in which number of successive symbols enabling uplink transmission is equal to or greater than number of symbols required for transmission of the uplink control signal.

(14)

The terminal device according to any one of (1) to (13), wherein, when transmittability of the uplink control signal in the first resource is switched using a downlink control signal, the control unit controls transmission of the uplink control signal according to the switching.

(15)

The terminal device according to (14), wherein when the uplink control signal becomes transmittable as a result of the switching, the control unit transmits the uplink control signal in the first resource, and when the uplink control signal becomes non-transmittable as a result of the switching, the control unit skips transmission of the uplink control signal in the first resource.

(16)

The terminal device according to (15), wherein, using the downlink control signal, the control unit transmits the uplink control signal in a second resource that is set in place of the first resource for transmission of the uplink control signal.

(17)

A base station that communicates with a terminal device using TDD method, the base station comprising:

a control unit that sends, to the terminal device, setting information indicating a first resource which is periodically placed in each of a plurality of bandwidth parts included in a component carrier and which is to be used in transmission of uplink control signal.

(18)

The base station according to (17), wherein the control unit sends, to the terminal device, downlink control information which contains information for setting a second resource that is to be used in place of the first resource for transmission of the uplink control signal.

(19)

A method implemented in a terminal device that communicates with a base station using TDD method, the method comprising:

sending uplink control signal based on setting information indicating a first resource which is periodically placed in each of a plurality of bandwidth parts included in a component carrier and which is to be used in transmission of the uplink control signal.

(20)

A method implemented in a base station that communicates with a terminal device using TDD method, the method comprising:

sending, to the terminal device, setting information indicating a first resource which is periodically placed in each of a plurality of bandwidth parts included in a component carrier and which is to be used in transmission of uplink control signal.

(21)

A recording medium having a program recorded therein, wherein the program causing a computer to function as:
a control unit that
communicates with a base station using TDD method, and
transmits uplink control signal based on setting information indicating a first resource which is periodically placed in each of a plurality of bandwidth parts included in a component carrier and which is to be used in transmission of the uplink control signal.

(22)

A recording medium having a program recorded therein, wherein the program causing a computer to function as:
a control unit that
communicates with a terminal device using TDD method, and
sends, to the terminal device, setting information indicating a first resource which is periodically placed in each of a plurality of bandwidth parts included in a component carrier and which is to be used in transmission of uplink control signal.

REFERENCE SIGNS LIST 1 system
11 cell
20 core network
30 PDN
100 base station
110 antenna unit
120 radio communication unit
130 network communication unit
140 memory unit
150 control unit
151 setting unit
153 communication processing unit
200 terminal device
210 antenna unit
220 radio communication unit
230 memory unit
240 control unit
241 setting unit
243 communication processing unit

The invention claimed is:

1. A terminal device that communicates with a base station using TDD (Time Division Duplex) method, the terminal device comprising:
a control unit that:
receives setting information from the base station about a semi-static link direction configuration,
configures the setting information indicating a first resource which is periodically placed in each of a plurality of bandwidth parts included in a component carrier, based on a subcarrier spacing of the plurality of the bandwidth parts, and which is to be used in transmission of an uplink control signal, and
transmits the uplink control signal to the base station based on the setting information,
wherein the uplink control signal is a Sounding Reference Signal (SRS), and wherein the setting information is configured by the terminal device in accordance with the semi-static link direction configuration based on a look-up table containing slot positions of the SRS transmission for the subcarrier spacing.

2. The terminal device according to claim 1, wherein the setting information contains, for each of the plurality of bandwidth parts, information indicating a radio frame in which the first resource is placed and information indicating a slot in which the first resource is placed in the radio frame.

3. The terminal device according to claim 2, wherein the first resource is placed with a periodicity equal to an integral multiple of number of slots in each radio frame in accordance with the subcarrier spacing of the plurality of bandwidth parts, and the setting information contains information indicating the periodicity.

4. The terminal device according to claim 2, wherein the setting information contains information indicating a table that indicates which slots of a plurality of slots included in a radio frame represent the first resource.

5. The terminal device according to claim 2, wherein
the first resource is placed in slots arriving at a periodicity of a predetermined slot count in a radio frame, and
the setting information contains information indicating the periodicity.

6. The terminal device according to claim 5, wherein, based on the uplink control signal not being transmittable in the first resource, the control unit skips transmission of the uplink control signal in the first resource.

7. The terminal device according to claim 6, wherein, based on transmission of the uplink control signal being skipped, the control unit transmits the uplink control signal in a resource that arrives after the skipped first resource and that enables transmission of the uplink control signal.

8. The terminal device according to claim 6, wherein, based on a number of times for which transmission of the uplink control signal is skipped reaching a predetermined upper limit value, the control unit transmits the uplink control signal in a resource that arrives after the first resource which was skipped last and that enables transmission of the uplink control signal.

9. The terminal device according to claim 6, wherein, based on a transmission of the uplink control signal being skipped, the control unit transmits the uplink control signal in a resource that arrives after the skipped first resource and that has been switched, using a downlink control signal, to enable transmission of the uplink control signal.

10. The terminal device according to claim 5, wherein a number of slots required for determining an arrival of the periodicity of the first resource is counted with respect to slots enabling transmission of the uplink control signal.

11. The terminal device according to claim 10, wherein the setting information contains information indicating an upper limit value of a count of the first resource in each radio frame.

12. The terminal device according to claim 10, wherein slots to be counted for determining arrival of the periodicity of the first resource include slots that have been switched, using a downlink control signal, to enable transmission of the uplink control signal, and do not include slots that have been switched, using a downlink control signal, to not enable transmission of the uplink control signal.

13. The terminal device according to claim 1, wherein, as a slot enabling transmission of the uplink control signal, the control unit recognizes a slot in which a number of successive symbols enabling uplink transmission is equal to or greater than a number of symbols required for transmission of the uplink control signal.

14. The terminal device according to claim 1, wherein, based on a transmissibility of the uplink control signal in the first resource being switched using a downlink control signal, the control unit controls transmission of the uplink control signal according to the switching.

15. The terminal device according to claim 14, wherein based on the uplink control signal becoming transmittable as a result of the switching, the control unit transmits the uplink control signal in the first resource, and
based on the uplink control signal becoming non-transmittable as a result of the switching, the control unit skips transmission of the uplink control signal in the first resource.

16. The terminal device according to claim 15, wherein, using the downlink control signal, the control unit transmits the uplink control signal in a second resource that is set in place of the first resource for transmission of the uplink control signal.

17. A base station that communicates with a terminal device using TDD method, the base station comprising:
a control unit that transmits, to the terminal device, setting information about a semi-static link direction configuration,
the semi-static link direction configuration enabling the terminal device to configure the setting information indicating a first resource which is periodically placed in each of a plurality of bandwidth parts included in a component carrier, based on a subcarrier spacing of the plurality of bandwidth parts and which is to be used by the terminal device for transmission of an uplink control signal, and
receives the uplink control signal from the terminal device based on the setting information,
wherein the uplink control signal is a Sounding Reference Signal (SRS), and
wherein the setting information is configured by the terminal device in accordance with the semi-static link direction configuration based on a look-up table containing slot positions of the SRS transmission for the subcarrier spacing.

18. The base station according to claim 17, wherein the control unit transmits, to the terminal device, downlink control information which contains information for setting a second resource that is to be used in place of the first resource for transmission of the uplink control signal.

19. A method implemented in a terminal device that communicates with a base station using TDD method, the method comprising:
receiving setting information from the base station about a semi-static link direction configuration;
configuring the setting information indicating a first resource which is periodically placed in each of a plurality of bandwidth parts included in a component carrier, based on a subcarrier spacing of the plurality of bandwidth parts, and which is to be used in transmission of an uplink control signal; and
transmitting the uplink control signal to the base station based on the setting information,
wherein the uplink control signal is a Sounding Reference Signal (SRS), and wherein the setting information is configured by the terminal device in accordance with the semi-static link direction configuration based on a look-up table containing slot positions of the SRS transmission for the subcarrier spacing.

20. A method implemented in a base station that communicates with a terminal device using TDD method, the method comprising:
transmitting, to the terminal device, setting information about a semi-static link direction configuration,
the semi-static link direction configuration enabling the terminal device to configure the setting information indicating a first resource which is periodically placed in each of a plurality of bandwidth parts included in a component carrier, based on a subcarrier spacing of the plurality of bandwidth parts and which is to be used by the terminal device for transmission of an uplink control signal; and
receiving the uplink control signal from the terminal device based on the setting information wherein the uplink control signal is a Sounding Reference Signal (SRS), and wherein the setting information is configured by the terminal device in accordance with the semi-static link direction configuration based on a look-up table containing slot positions of the SRS transmission for the subcarrier spacing.

21. A non-transitory computer readable recording medium having a program recorded therein, wherein the program causing a computer to function as:
a control unit in a terminal device and that communicates with a base station using TDD method,
receives setting information from the base station about a semi-static link direction configuration,
configures the setting information indicating a first resource which is periodically placed in each of a plurality of bandwidth parts included in a component carrier, based on a subcarrier spacing of the plurality of bandwidth parts, and which is to be used in transmission of an uplink control signal, and
transmits the uplink control signal to the base station based on the setting information,
wherein the uplink control signal is a Sounding Reference Signal (SRS), and wherein the setting information is configured by the terminal device in accordance with the semi-static link direction configuration based on a look-up table containing slot positions of the SRS transmission for the subcarrier spacing.

22. A non-transitory computer readable recording medium having a program recorded therein, wherein the program causing a computer to function as:
a control unit in a base station and that communicates with a terminal device using TDD method,
transmits, to the terminal device, setting information about a semi-static link direction configuration,
the semi-static link direction configuration enabling the terminal device to configure the setting information indicating a first resource which is periodically placed in each of a plurality of bandwidth parts included in a component carrier, based on a subcarrier spacing of the plurality of bandwidth parts, and which is to be used by the terminal device for transmission of an uplink control signal, and
receives the uplink control signal from the terminal device based on the setting information,
wherein the uplink control signal is a Sounding Reference Signal (SRS), and
wherein the setting information is configured by the terminal device in accordance with the semi-static link direction configuration based on a look-up table containing slot positions of the SRS transmission for the subcarrier spacing.

* * * * *